United States Patent
Graves et al.

(10) Patent No.: US 9,251,855 B2
(45) Date of Patent: Feb. 2, 2016

(54) EFFICIENT MEDIA PROCESSING

(75) Inventors: Eric J. Graves, Radnor, PA (US); Nils Angquist, San Francisco, CA (US); Giovanni Agnoli, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 398 days.

(21) Appl. No.: 13/111,890

(22) Filed: May 19, 2011

(65) Prior Publication Data
US 2012/0206653 A1   Aug. 16, 2012

Related U.S. Application Data

(60) Provisional application No. 61/443,707, filed on Feb. 16, 2011, provisional application No. 61/437,517, filed on Jan. 28, 2011, provisional application No. 61/443,702, filed on Feb. 16, 2011, provisional application No. 61/443,704, filed on Feb. 16, 2011.

(51) Int. Cl.
*H04N 7/12* (2006.01)
*G11B 27/34* (2006.01)
*H04N 1/00* (2006.01)
(Continued)

(52) U.S. Cl.
CPC *G11B 27/34* (2013.01); *G06F 9/00* (2013.01); *G06F 17/30073* (2013.01); *G11B 27/00* (2013.01); *G11B 27/031* (2013.01); *G11B 27/036* (2013.01); *H04N 1/00822* (2013.01); *H04N 1/4172* (2013.01); *H04N 5/14* (2013.01); *G06F 3/048* (2013.01); *G06F 17/30781* (2013.01); *G11B 27/105* (2013.01); *H04N 5/23245* (2013.01); *H04N 5/343* (2013.01);
(Continued)

(58) Field of Classification Search
USPC .................................................. 718/102–107
See application file for complete search history.

(56) References Cited

U.S. PATENT DOCUMENTS 5,404,316 A   4/1995 Klingler et al.
5,519,828 A   5/1996 Rayner
(Continued)

FOREIGN PATENT DOCUMENTS

EP   0702832   3/1998
WO   WO 2007/120694   10/2007
(Continued)

OTHER PUBLICATIONS

Hwang, Hark-Chin, Soo Y. Chang, and Kangbok Lee. "Parallel machine scheduling under a grade of service provision." Computers & Operations Research 31, No. 12 (2004): 2055-2061.*
(Continued)

*Primary Examiner* — Dave Czekaj
*Assistant Examiner* — Tyler W Sullivan
(74) *Attorney, Agent, or Firm* — Adeli LLP

(57) ABSTRACT

Some embodiments provide a media-editing application. The application includes several image processing destinations for performing operations on video images. The application includes a scheduling engine for scheduling disk read, decode, and graphics processing operations to perform on images to prepare the images for the several destinations. The scheduling engine includes a first set of instructions for scheduling images based on a speed at which a particular one of the several destinations processes the images when none of the destinations require images in real-time. The scheduling engine includes a second set of instructions for scheduling images based on a real-time clock when at least one of the several destinations requires images in real-time.

24 Claims, 59 Drawing Sheets

(51) Int. Cl.

| | | |
|---|---|---|
| *H04N 1/417* | (2006.01) | |
| *G11B 27/031* | (2006.01) | |
| *G11B 27/036* | (2006.01) | |
| *G06F 9/00* | (2006.01) | |
| *G11B 27/00* | (2006.01) | |
| *H04N 5/14* | (2006.01) | |
| *H04N 5/232* | (2006.01) | |
| *H04N 5/343* | (2011.01) | |
| *H04N 19/40* | (2014.01) | |
| *G06F 3/048* | (2013.01) | |
| *G06F 17/30* | (2006.01) | |
| *G11B 27/10* | (2006.01) | |

(52) U.S. Cl.
CPC .......... *H04N 19/40* (2014.11); *H04N 2201/212* (2013.01); *Y10S 707/913* (2013.01)

(56) References Cited

U.S. PATENT DOCUMENTS

| | | | |
|---|---|---|---|
| 5,524,244 A * | 6/1996 | Robinson et al. ............ 717/140 | |
| 5,659,539 A | 8/1997 | Porter et al. | |
| 5,659,792 A | 8/1997 | Walmsley | |
| 5,659,793 A | 8/1997 | Escobar et al. | |
| 5,664,216 A | 9/1997 | Blumenau | |
| 5,682,326 A | 10/1997 | Klingler et al. | |
| 5,781,188 A | 7/1998 | Amiot et al. | |
| 5,826,102 A | 10/1998 | Escobar et al. | |
| 5,892,506 A | 4/1999 | Hermanson | |
| 5,930,446 A | 7/1999 | Kanda | |
| 5,940,573 A | 8/1999 | Beckwith | |
| 5,999,173 A * | 12/1999 | Ubillos ........................ 715/724 | |
| 6,005,621 A | 12/1999 | Linzer et al. | |
| 6,122,411 A | 9/2000 | Shen et al. | |
| 6,134,380 A | 10/2000 | Kushizaki | |
| 6,154,600 A | 11/2000 | Newman et al. | |
| 6,154,601 A | 11/2000 | Yaegashi et al. | |
| 6,161,115 A | 12/2000 | Ohanian | |
| 6,204,840 B1 | 3/2001 | Petelycky et al. | |
| 6,211,869 B1 | 4/2001 | Loveman et al. | |
| 6,229,850 B1 | 5/2001 | Linzer et al. | |
| 6,243,133 B1 | 6/2001 | Spaulding et al. | |
| 6,324,335 B1 | 11/2001 | Kanda | |
| 6,392,710 B1 | 5/2002 | Gonsalves et al. | |
| 6,469,711 B2 | 10/2002 | Foreman et al. | |
| 6,487,565 B1 | 11/2002 | Schechter et al. | |
| 6,539,163 B1 | 3/2003 | Sheasby et al. | |
| 6,542,692 B1 | 4/2003 | Houskeeper | |
| 6,546,188 B1 | 4/2003 | Ishii et al. | |
| 6,573,898 B1 | 6/2003 | Mathur et al. | |
| 6,628,303 B1 | 9/2003 | Foreman et al. | |
| 6,631,240 B1 | 10/2003 | Salesin et al. | |
| 6,665,343 B1 | 12/2003 | Jahanghir et al. | |
| 6,674,955 B2 | 1/2004 | Matsui et al. | |
| 6,714,216 B2 | 3/2004 | Abe | |
| 6,871,161 B2 * | 3/2005 | Laird ........................... 702/182 | |
| 6,904,566 B2 | 6/2005 | Feller et al. | |
| 6,940,518 B2 | 9/2005 | Minner et al. | |
| 6,947,044 B1 | 9/2005 | Kulas | |
| 6,956,574 B1 | 10/2005 | Cailloux et al. | |
| 7,020,381 B1 | 3/2006 | Kato et al. | |
| 7,035,435 B2 | 4/2006 | Li et al. | |
| 7,042,489 B2 * | 5/2006 | Zell et al. ........................ 348/97 | |
| 7,062,107 B1 | 6/2006 | Crosby et al. | |
| 7,103,260 B1 | 9/2006 | Hinson | |
| 7,155,676 B2 | 12/2006 | Land et al. | |
| 7,207,007 B2 | 4/2007 | Moriwake et al. | |
| 7,313,755 B2 | 12/2007 | Rahman et al. | |
| 7,370,335 B1 * | 5/2008 | White et al. .................. 719/328 | |
| 7,383,509 B2 | 6/2008 | Foote et al. | |
| 7,411,590 B1 | 8/2008 | Boyd et al. | |
| 7,434,155 B2 | 10/2008 | Lee | |
| 7,502,139 B2 | 3/2009 | Nishimura | |
| 7,561,160 B2 | 7/2009 | Fukuya | |
| 7,669,130 B2 | 2/2010 | Agarwal et al. | |
| 7,739,299 B2 | 6/2010 | Kii et al. | |
| 7,836,389 B2 | 11/2010 | Howard et al. | |
| 7,885,472 B2 * | 2/2011 | Yamamoto .................... 382/232 | |
| 7,956,930 B2 | 6/2011 | Sullivan | |
| 7,958,507 B2 * | 6/2011 | Santos et al. .................. 718/102 | |
| 8,006,261 B1 * | 8/2011 | Haberman et al. .............. 725/34 | |
| 8,140,953 B1 | 3/2012 | Weaver | |
| 8,418,068 B1 | 4/2013 | Backus et al. | |
| 8,577,683 B2 | 11/2013 | Dewitt | |
| 8,775,480 B2 | 7/2014 | Carson et al. | |
| 8,839,110 B2 | 9/2014 | Wang et al. | |
| 2001/0020953 A1 | 9/2001 | Moriwake et al. | |
| 2001/0033295 A1 | 10/2001 | Phillips | |
| 2001/0036356 A1 | 11/2001 | Weaver et al. | |
| 2001/0040592 A1 | 11/2001 | Foreman et al. | |
| 2002/0023103 A1 | 2/2002 | Gagne | |
| 2002/0081099 A1 | 6/2002 | Tsumagari et al. | |
| 2002/0089540 A1 | 7/2002 | Geier et al. | |
| 2002/0122207 A1 | 9/2002 | Klassen et al. | |
| 2002/0154140 A1 | 10/2002 | Tazaki | |
| 2002/0154156 A1 | 10/2002 | Moriwake et al. | |
| 2003/0002715 A1 | 1/2003 | Kowald | |
| 2003/0016254 A1 | 1/2003 | Abe | |
| 2003/0053685 A1 | 3/2003 | Lestideau | |
| 2003/0088877 A1 | 5/2003 | Loveman et al. | |
| 2003/0117431 A1 | 6/2003 | Moriwake et al. | |
| 2003/0146915 A1 | 8/2003 | Brook et al. | |
| 2004/0001079 A1 | 1/2004 | Zhao et al. | |
| 2004/0056883 A1 | 3/2004 | Wierowski | |
| 2004/0071441 A1 | 4/2004 | Foreman et al. | |
| 2004/0078761 A1 | 4/2004 | Ohanian | |
| 2004/0098379 A1 | 5/2004 | Huang | |
| 2004/0131330 A1 | 7/2004 | Wilkins et al. | |
| 2004/0151469 A1 | 8/2004 | Engholm et al. | |
| 2004/0197084 A1 | 10/2004 | Tagawa et al. | |
| 2004/0201609 A1 | 10/2004 | Obrador | |
| 2004/0233806 A1 | 11/2004 | Kawahara | |
| 2004/0267952 A1 | 12/2004 | He et al. | |
| 2004/0268224 A1 | 12/2004 | Balkus et al. | |
| 2005/0042591 A1 | 2/2005 | Bloom et al. | |
| 2005/0058430 A1 | 3/2005 | Nakamura et al. | |
| 2005/0213833 A1 | 9/2005 | Okada et al. | |
| 2005/0238217 A1 | 10/2005 | Enomoto et al. | |
| 2006/0008247 A1 | 1/2006 | Minami et al. | |
| 2006/0048057 A1 | 3/2006 | Herberger et al. | |
| 2006/0056716 A1 | 3/2006 | Komeno | |
| 2006/0112390 A1 * | 5/2006 | Hamaoka ...................... 718/102 | |
| 2006/0136556 A1 | 6/2006 | Stevens et al. | |
| 2006/0156219 A1 * | 7/2006 | Haot et al. .................... 715/500.1 | |
| 2006/0168521 A1 | 7/2006 | Shimizu et al. | |
| 2007/0053429 A1 | 3/2007 | Jawerth et al. | |
| 2007/0058937 A1 | 3/2007 | Ando et al. | |
| 2007/0154190 A1 | 7/2007 | Gilley et al. | |
| 2007/0189627 A1 | 8/2007 | Cohen et al. | |
| 2007/0189708 A1 | 8/2007 | Lerman et al. | |
| 2007/0234214 A1 | 10/2007 | Lovejoy et al. | |
| 2007/0242085 A1 * | 10/2007 | Weybrew et al. ............. 345/629 | |
| 2007/0262995 A1 | 11/2007 | Tran | |
| 2008/0013916 A1 * | 1/2008 | Sharpe et al. .................. 386/52 | |
| 2008/0072166 A1 | 3/2008 | Reddy | |
| 2008/0079972 A1 * | 4/2008 | Goodwin et al. ............. 358/1.12 | |
| 2008/0184290 A1 | 7/2008 | Tapuska | |
| 2008/0273862 A1 | 11/2008 | Okamoto et al. | |
| 2008/0317431 A1 | 12/2008 | Mishima et al. | |
| 2009/0006437 A1 | 1/2009 | Saito | |
| 2009/0006475 A1 | 1/2009 | Udezue et al. | |
| 2009/0097815 A1 * | 4/2009 | Lahr et al. ...................... 386/52 | |
| 2009/0201316 A1 | 8/2009 | Bhatt et al. | |
| 2009/0232480 A1 | 9/2009 | Jendbro | |
| 2009/0251475 A1 | 10/2009 | Mathur | |
| 2010/0023972 A1 * | 1/2010 | Summers et al. ............... 725/54 | |
| 2010/0050080 A1 | 2/2010 | Libert et al. | |
| 2010/0153395 A1 | 6/2010 | Hannuksela et al. | |
| 2010/0262710 A1 * | 10/2010 | Khatib et al. .................. 709/231 | |
| 2010/0278504 A1 | 11/2010 | Lyons et al. | |
| 2011/0026899 A1 | 2/2011 | Lussier et al. | |
| 2011/0030031 A1 | 2/2011 | Lussier et al. | |
| 2011/0097011 A1 | 4/2011 | Lim et al. | |

(56) References Cited

U.S. PATENT DOCUMENTS

| | | | |
|---|---|---|---|
| 2011/0206351 | A1 | 8/2011 | Givoly |
| 2011/0271127 | A1* | 11/2011 | Thabet et al. ............ 713/320 |
| 2012/0207449 | A1 | 8/2012 | Angquist et al. |
| 2012/0209815 | A1 | 8/2012 | Carson et al. |
| 2012/0209889 | A1 | 8/2012 | Agnoli et al. |
| 2012/0210217 | A1 | 8/2012 | Abbas et al. |

FOREIGN PATENT DOCUMENTS

| | | |
|---|---|---|
| WO | WO 2009/128227 | 10/2009 |
| WO | WO 2009/129252 | 10/2009 |
| WO | WO 2010/106586 | 9/2010 |

OTHER PUBLICATIONS

Docuceur, et al. (Docuceur, J., Elson, J., Howell, J., and Lorch, J., "The Utility Coprocessor: Massively parallel computations from the coffee shop", in USENIX ATC (2010)).*

U.S. Appl. No. 13/111,912, filed May 19, 2011, Agnoli, Giovanni, et al.

U.S. Appl. No. 13/111,903, filed May 19, 2011, Carson, Kenneth M., et al.

U.S. Appl. No. 13/111,895, filed May 19, 2011, Abbas, Gregory B., et al.

U.S. Appl. No. 13/111,892, filed May 19, 2011, Angquist, Nils, et al.

Author Unknown, "Avid Media Composer Editing Guide", Avid, Jun. 2010, 8 pages, Burlington, MA, USA.

Author Unknown, "Apple Announces Final Cut Pro 4," NAB, Apr. 6, 2003, 3 pages, Apple Inc., Las Vegas, NV, USA.

Author Unknown, "Using Adobe Premiere Elements 8 Editor," last updated Aug. 12, 2010, 313 pages, Adobe Systems Incorporated, San Jose, California, USA.

Author Unknown, "Using Adobe Flash CS4 Professional," Updated Mar. 5, 2009, 474 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, Apple Inc., USA.

Brenneis, Lisa, "Final Cut Pro 3 for Macinotsh: Visual QuickPro Guide, " Apr. 2002, 288 pages, Peachpit Press, Berkely, California, USA.

Casares, Juan, et al., "Simplifying Video Editing Using Metadata," Proceedings of Designing Interactive Systems (DIS 2002), Jun. 2002, pp. 157-166, London, Great Britain.

Long, A. Chris, et al., "Video Editing Using Lenses and Semantic Zooming", Human Computer Interaction Institute, Carnegie Mellon University, Month Unknown, 2009, pp. 1-9, Pittsburgh, PA.

Martin, Steve, "Final Cut Express: System Requirements, OS 10.2 or higher", The Ripple Training, Jan. 13, 2003, 8 pages, USA.

Myers, Brad A., et al., "A Multi-View Intelligent Editor for Digital Video Libraries", The First ACM+IEEE Joint Conference on Digital Libraries (JCDL'01), Jun. 24-28, 2001, 10 pages, Roanoke, VA, available at http://www.informedia.cs.cmu.edu/documents/dl2001paper.pdf.

Wang, et al. "MyVideos—A System for Home Video Management", Proceedings of the 10th ACM International Conference on Multimedia '02, Dec. 1-6, 2002, pp. 412-413, Juan-les-Pins, France.

U.S. Appl. No. 14/264,001, filed Apr. 28, 2014, Apple Inc.

* cited by examiner

EFFICIENT MEDIA PROCESSING

CLAIM OF BENEFIT TO PRIOR APPLICATION

This application claims the benefit of U.S. Provisional Application 61/443,707, entitled "Efficient Media Processing", filed Feb. 16, 2011. This application also claims the benefit of U.S. Provisional Application 61/437,517, entitled "Media-Editing Application with Video Segmentation Capabilities and Automatic Background-Render", filed Jan. 28, 2011. This application also claims the benefit of U.S. Provisional Application 61/443,702, entitled "Media-Editing Application with Anchored Timeline", filed Feb. 16, 2011. This application also claims the benefit of U.S. Provisional Application 61/443,704, entitled "Media-Editing Application with Novel Editing Tools", filed Feb. 16, 2011. U.S. Provisional Application 61/443,707 is incorporated herein by reference.

CROSS REFERENCE TO RELATED APPLICATIONS

This Application is related to the following applications: U.S. patent application Ser. No. 13/111,892, filed May 19, 2011; U.S. patent application Ser. No. 13/111,895, filed May 19, 2011; U.S. patent application Ser. No. 13/111,903, filed May 19, 2011; and U.S. patent application Ser. No. 13/111,912, filed May 19, 2011.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media editing application. In so doing, the computer generates a graphical interface whereby designers digitally manipulate graphical representations of the media content to produce a desired result.

In many cases, the import process for importing video into the application may be an extremely time-intensive process. Various operations will be performed on the video, and each of these operations requires separate processing. For large amounts of media, this can take significant amounts of time.

BRIEF SUMMARY

Some embodiments of the invention provide a media-editing application that performs one or more destination operations on a media file (e.g., video files, audio files, etc.) in parallel upon import of the media file. Rather than performing fully separate processing for each operation, the media-editing application performs certain image preparation operations (e.g., disk read, decode, format conversions) only once whenever possible, then sends the same image data to the different destination operations.

In some embodiments, the media-editing application is an application that enables a user to create a composite media presentation from a set of media files. Through a graphical user interface (GUI) of the application, the user specifies the manner in which the media files are composited to create the composite presentation. In addition, through this GUI, the user can command the application to import one or more media files (e.g., from a camera, from an external drive, from an internal drive, etc.). Upon instructions from the user (i.e., through the media-editing application GUI) or as an automatic response to the detection of the media files in an external storage, the application copies the media files to a particular media storage location on a particular storage device. Some embodiments create a particular folder within the folder structure of the storage device for a set of imported media files (i.e., the media files imported at a particular time) and store a copy of the imported files in this particular folder at time of import.

In some embodiments, upon import of a media file, the images of the media file are automatically sent to one or more destinations for processing. At time of import, these destinations may include encoding operations and analysis operations. Some embodiments store one or more versions of an imported media file in encoded formats that are particularly suitable for editing. For example, the application might store a high-resolution encoded version and a low-resolution encoded version of a media file, in addition to the original copy (which may also be encoded in a different format).

In some embodiments, when a user indicates that he wants to import one or more media files, the application presents the user with a set of options that enable the user to select operations for the application perform on the imported media. These operations may include the high and low-resolution encoding, various video analysis operations (e.g., color balancing, face and/or person detection, shake detection, etc.) and audio analysis operations (e.g., identifying latent audio channels, identifying stereo pairs of channels, enhancing the audio, etc.). The data from these analysis operations may be stored in one or more files in some embodiments.

With all of the destination operations being performed at once, the application will only need to perform the image preparation operations required to retrieve an image for these destinations operations once for each image of an imported media file. In some embodiments, a scheduling engine manages the performance of the various image preparation operations in order to prepare the images for the destinations. The scheduling engine of some embodiments schedules disk reads (i.e., disk I/O calls), decodes, and image processing operations. When the application is sending a media file to multiple destinations, the engine will schedule only one disk read and one decode for each image in the media file. This prevents duplicative disk reads and decodes from being performed. When all of the destinations require the image in the same format (i.e., the same size and colorspace), the scheduling engine will perform any necessary conversions to this desired format only once as well. When different destinations need images in different formats, some embodiments will fan-out the operations as late as possible to minimize the number of processing operations that need to be performed.

In addition to performing the various image operations (e.g., encoding and analysis) at time of import, some embodiments can perform these and other image operations post-import. Furthermore, video playback (and other real-time destinations that accompany playback) may be an additional post-import destination, as well as background rendering (i.e., the preparation of output images for portions of a video sequence in advance).

In some embodiments, the scheduling engine schedules operations differently for real-time operations (e.g., playback) than for non-real-time operations (e.g., analysis, encoding, etc.). For real-time operations, the most important factor in how fast to schedule images is to keep up with the display rate for the video. For instance, for 24 frames per second (fps) video, the scheduling engine attempts to ensure that images are being sent to the playback operation fast enough for a continuous display of the video. When a clock in the scheduling engine indicates that the images are falling behind, the scheduling engine may opt to skip (i.e., drop) images and schedule ahead so as to keep up with real time. This also enables the media-editing application of some embodiments to modify its playback in real-time as the user edits a composite presentation in the timeline.

On the other hand, for destinations such as an encoder, a color balancer, etc., it is more important to receive every image than to receive the images at a particular rate. Thus, the scheduling engine of some embodiments will send images to these destinations based on when the destinations finish processing previous images as opposed to any clock that correlates to actual time.

When importing a media file, some embodiments create a media clip data structure for the imported media that links to the media file, any transcoded versions of the media file, and any analysis data about the media file. This media clip is the entity that is added to a media presentation in some embodiments in order to include the media file (or a portion of the media file) in the composite presentation. Some embodiments store this information in an asset data structure that specifically references the media and analysis files, and then additionally create a clip data structure that references the asset. In addition, the asset data structure may include metadata such as a universally unique identifier (UUID) for the media file generated by the camera that captured the media, file format information, various video properties (e.g., frame rate, colorspace, pixel transform, dimensions, etc.), and various audio properties (e.g., channel count, track count, sample rate, etc.) of the media.

The references stored in the media clip (or asset) refer to the versions of the media file stored in the application's file storage. Some embodiments, for each set of imported media files, create separate folders for the original media and any type of transcoded media. In some embodiments, the transcoded media include both high-resolution and low-resolution encodes of the original media file that may be created on import or post-import.

In some embodiments, these references to the files are pointers to the locations of the files on the storage device. In some embodiments, the media-editing application initially sets the reference to the original media such that the data structure references the media file that is to be imported (e.g., the file on a camera) as the original media, then modifies this reference once the media file is copied to the application's file storage so that the data structure now references the media in the file storage. In some such embodiments, the application displays the media clips for the user to edit before the file is actually copied. This enables a user to begin creating a presentation using the media clip while the clip refers to a file stored on a camera, and then continue using the same clip once the file is copied with no interruption to the editing workflow.

Much like the folders for different versions of media files, some embodiments create separate folders within a folder for a set of imported files for each type of analysis file (e.g., a folder for person detection files, a folder for color balance files, a folder for shake detection files, etc.). In addition, some embodiments store additional clip data in the media clip, as opposed to a separate file. As one example, some embodiments store shake detection as a tag about the media file or a specific portion of the media file.

Having data structures that refer to each of the different versions of media enables the media-editing application of some embodiments to seamlessly switch between editing and playback in high- and low-resolution. When a user requests high-resolution editing, the application reads images from the original media or the high-resolution transcoded media (enabling better image quality), whereas when a user requests low-resolution editing the application reads images from the low-resolution transcoded media (enabling faster processing). Some embodiments attach a pixel transform to each image that specifies a transform of the image from an image space in which many editing operations are defined into the pixel space of the image. Attaching the pixel transforms to the images in the image processing pipeline enables the editing operations to be defined independent of the size and type of images being received, and thus makes possible the seamless transition between using high- and low-resolution files for editing.

As mentioned, for each imported media file, some embodiments create both an asset data structure that stores references to the different versions of the imported media file and a clip data structure that refers to the asset. Some embodiments create a nested series of clip structures for the imported file, including a first clip structure that refers to the asset and a second clip structure that contains the first clip structure. The second clip structure may be contained within a data structure that stores several associated clips and assets. When a user adds the media clip to a composite presentation, some embodiments duplicate the first and second clip structures and add these structures to a data structure for the composite presentation.

In the course of editing, projects will be unable to identify the underlying media from time to time. An asset might be deleted, an asset might exist but reference a file that no longer exists, etc. Some embodiments provide various mechanisms to modify the clip or project references in order to restore the media in the project (e.g., finding a different asset in the application that refers to a copy of the same media file).

In addition, some embodiments allow a user to create archives of the media on a camera in a bundle from which the files can be later imported. If a user deletes all of the media (i.e., to save disk space), the user can restore this media from camera archives and the application will be able to identify the media files (using a file identifier) and restore its missing references.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 12-19 illustrate one example folder structure, as shown through a file navigation GUI.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a media-editing application that performs one or more destination operations on a media file (e.g., video files, audio files, etc.) in parallel upon import of the media file. Rather than performing fully separate processing for each operation, the media-editing application performs certain image preparation operations (e.g., disk read, decode, format conversions) only once whenever possible, then sends the same image data to the different destination operations.

Figure 1:
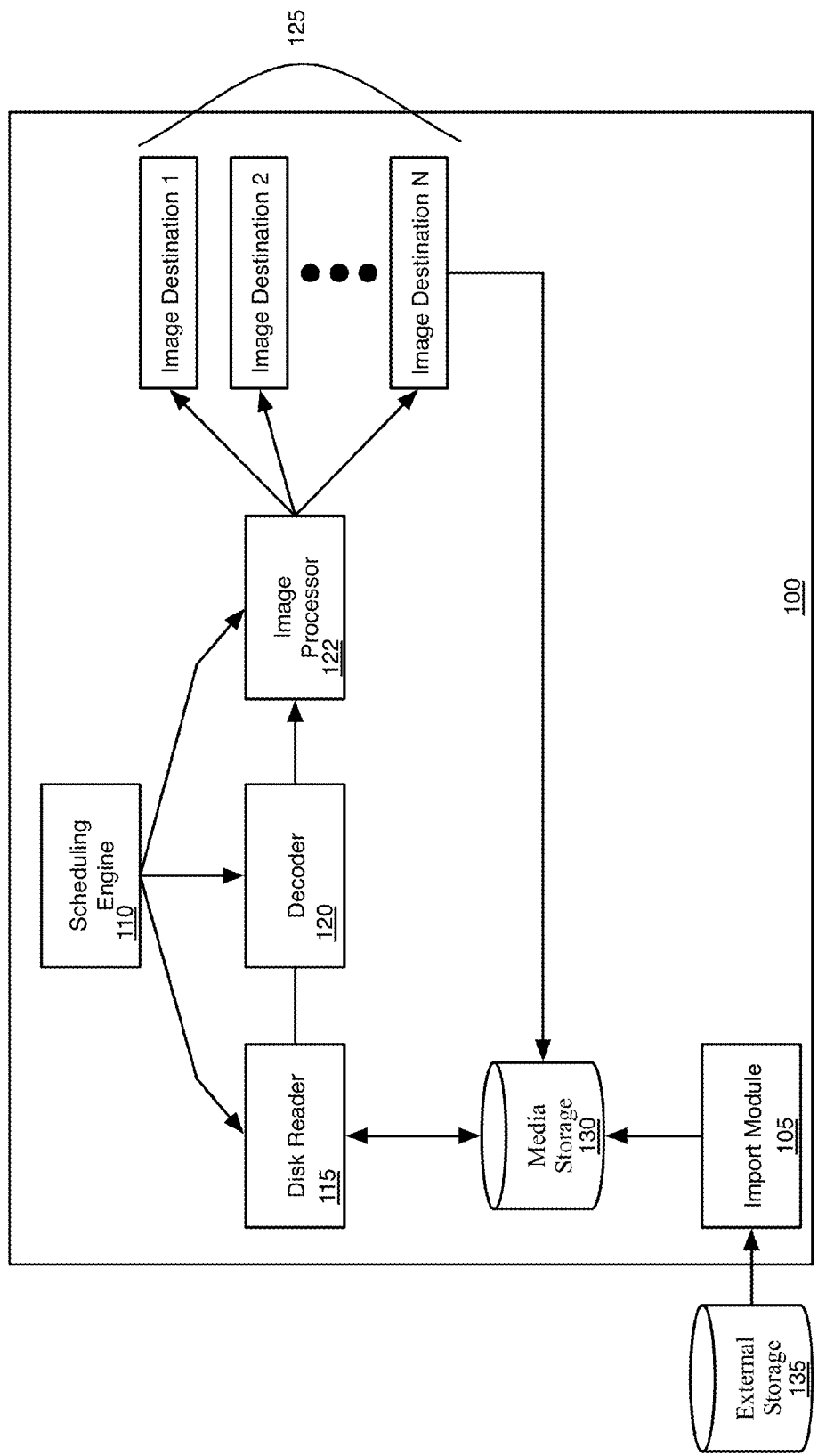
FIG. 1 conceptually illustrates the software architecture of a media-editing application of some embodiments.

FIG. 1 conceptually illustrates the software architecture of a media-editing system 100 of some embodiments. Specifically, the figure illustrates the architecture relating to an import process performed by the media-editing system 100. In some embodiments, some or all of the functions attributed to this system are performed by a media-editing application. In some embodiments, the media-editing application is an application that enables a user to create a composite media presentation from a set of media files. Through a graphical user interface (GUI) of the application, the user specifies the manner in which the media files are composited to create the composite presentation. In addition, through this GUI, the user can command the application to import one or media files (e.g., from a camera, from an external drive, from an internal drive, etc.).

As shown, the media-editing system 100 includes an import module 105, a scheduling engine 110, a disk reader 115, a decoder 120, an image processor 122, and a set of image destinations 125. The system 100 also includes media storage 130. In some embodiments, the media storage 130 is a set of file folders organized by the media-editing application and stored on a particular set of storage devices. The storage devices may include the boot drive of the electronic device on which the application operates, a different partition of that disk, a separate internal or external hard drive, a flash drive, SD card, etc.

FIG. 1 also illustrates an external storage 135. The external storage 135 is a storage device that stores media files that may be imported by the media-editing application. The storage may be a camera, an SD card, a flash drive, an external hard drive, file storage of an internal hard drive separate from the organized file folder structure created by the media-editing application, etc.

The import module 105 imports media files from the external storage 135. Upon instructions from the user (i.e., through the media-editing application GUI) or as an automatic response to the detection of the media files in the external storage 135, the import module 105 copies the media files to a particular location in the media storage 130. Some embodiments create a particular folder within the folder structure of the media storage 130 for a set of imported media files (i.e., the media files imported at a particular time) and store a copy of the imported files in this particular folder at time of import.

The disk reader 115 reads an image from a storage device (i.e., the storage device on which the media storage 130 is located). In some embodiments, this represents a disk read operation (i.e., disk I/O call) performed by a processor of the computing system on which the media-editing application is running. The decoder 120 performs a decode operation on an image retrieved by the disk reader 115, and may also represent an operation performed by a processor of the computing system, or by a specific decoder hardware that is part of the system. In some embodiments, the image retrieved from the media storage is stored in an encoded format, while the destinations 125 require a set of unencoded pixel values that describe the image. Some embodiments are capable of decoding numerous different types of images, and will use the type of decoding required for the particular retrieved image.

The image processor 122 represents a set of operations that may be performed on the image data to place the image data in the correct format for each of the different destinations. The different destinations may want the image in different sizes (i.e., number of pixels) and colorspaces in some embodiments, and thus the image processor 122 may need to produce multiple different outputs for the multiple destinations. In some embodiments, these image-processing operations may be performed by a primary processor (e.g., one or more CPU cores) or a specialized graphics processing unit.

The destinations 125 are a set of operations the media-editing application performs on an image (in many cases, on each image of a media file). In some embodiments, upon import of a media file, the images of the media file are automatically sent to one or more of the destinations for processing. At time of import, these destinations may include encoding operations and analysis operations. Some embodiments store one or more versions of an imported media file in encoded formats that are particularly suitable for editing. For example, the application might store a high-resolution encoded version and a low-resolution encoded version of a media file, in addition to the original copy (which may also be encoded in a different format). In this example, image destination N is an encoding operation that stores its output (a new version of a media file) into the media storage 130. The analysis operations of some embodiments analyze the images of a media file to determine specific information about the images. For instance, some operations identify people in the images, identify time ranges in media files captured by a shaking camera, balance color in the images, etc. The data from these analysis operations may be stored in a file (e.g., in the media storage 130 or in separate folders) in some embodiments.

As stated, some embodiments perform these encoding and analysis operations at time of import. With all of the operations being performed at once, the disk read and decode operations will only need to be performed once for each image of an imported media file. In some embodiments, when a user indicates that he wants to import one or more media files, the application presents the user with a set of options that enable the user to select operations for the application perform on the imported media. These may include the high and low-resolution encoding, the various video analysis operations mentioned above, as well as audio analysis operations (e.g., identifying latent audio channels, identifying stereo pairs of channels, enhancing the audio, etc.). While many of the video analysis and encoding operations are performed on each image of the media file, the audio operations may be performed on the file as a whole or on each frame of audio (i.e., a portion of the audio having a particular length, which may correspond to the frame rate of the video).

In addition to performing the various image operations (e.g., encoding and analysis) at time of import, some embodiments can perform these and other operations post-import. Furthermore, video playback (and other real-time destinations that accompany playback) may be an additional post-import destination, as well as background rendering (i.e., the preparation of output images for portions of a video sequence in advance).

The scheduling engine 110 manages the performance of various operations on images of the media files in order to prepare those images for the destinations 125. In some embodiments, the scheduling engine 110 schedules disk reads (i.e., disk I/O calls), decodes, and image processing operations. When the application is sending a media file to multiple destinations (as shown in this figure), the engine will schedule only one disk read and one decode for each image in the media file. This prevents the performance of duplicative disk reads and decodes. When all of the destinations require the image in the same format (i.e., the same size and colorspace), the scheduling engine will perform the conversions to this desired format only once as well. When different destinations need images in different formats, some embodiments will fan-out the operations as late as possible to minimize the number of processing operations that need to be performed.

In some embodiments, the scheduling engine schedules operations differently for real-time operations (e.g., playback) than for non-real-time operations (e.g., analysis, encoding, etc.). For real-time operations, the most important factor in how fast to schedule images is to keep up with the display rate for the video. For instance, for 24 frames per second (fps) video, the scheduling engine attempts to ensure that images are being sent to the playback operation fast enough for a continuous display of the video. When a clock in the scheduling engine indicates that the images are falling behind, the scheduling engine may opt to skip (i.e., drop) images and schedule ahead so as to keep up with real time. This also enables the media-editing application of some embodiments to modify its playback in real-time as the user edits a composite presentation in the timeline.

On the other hand, for destinations such as an encoder, a color balancer, etc., it is more important to receive every image than to receive the images at a particular rate. Thus, the scheduling engine of some embodiments will send images to these destinations based on when the destinations finish processing previous images as opposed to any clock that correlates to actual time. That is, the scheduling engine bases the rate at which it schedules image preparation operations on the processing speed of the destination operations rather than a desired frame rate.

Figure 2:
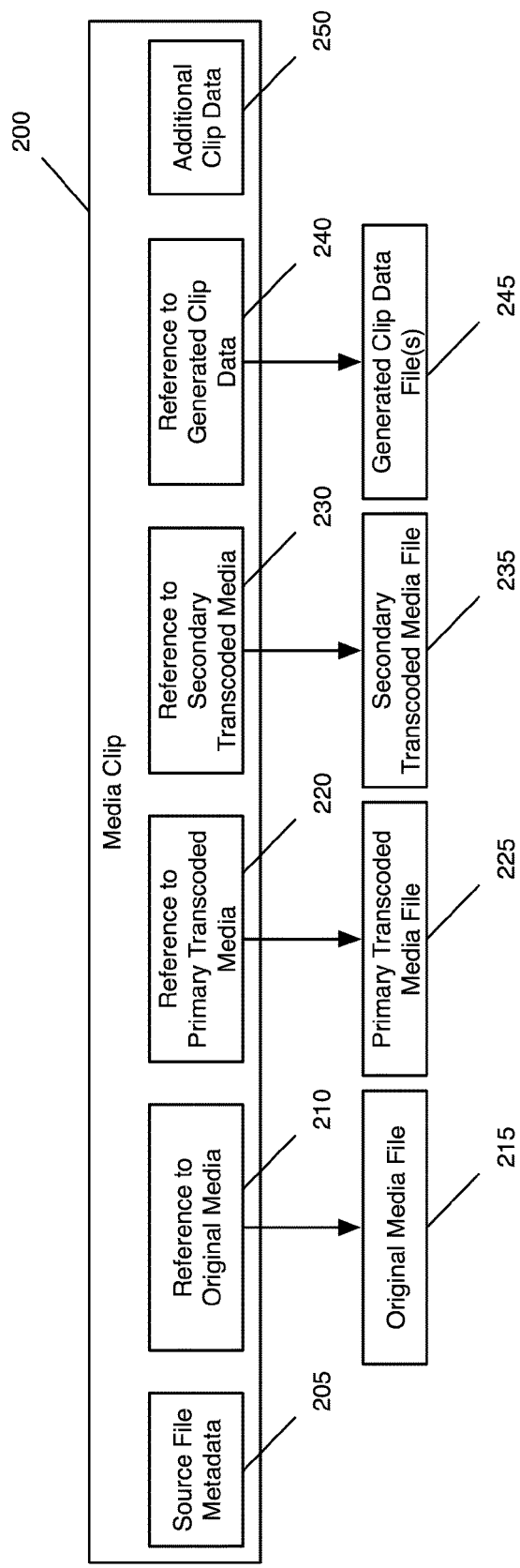
FIG. 2 conceptually illustrates a media clip of some embodiments.

When importing a media file, some embodiments create a media clip data structure for the imported media that links to the media file, any transcoded versions of the media file, and any analysis data about the media file. This media clip is the entity that is added to a media presentation in some embodiments in order to include the media file (or a portion of the media file) in the composite presentation. FIG. 2 conceptually illustrates such a media clip 200 of some embodiments. The media clip 200 includes source file metadata 205, a reference 210 to an original media file 215, a reference 215 to a primary transcoded media file 225, a reference 230 to a secondary transcoded media file 235, a reference (or references) 240 to generated clip data 245, and additional clip data 250.

As will be described below, some embodiments actually store this information in an asset data structure that specifically references the media and analysis files, and then also create a clip data structure that references the asset. FIG. 2 collapses this structure into a single media clip for simplicity, while additional figures in Section I.E describe the data structures in further detail.

The source file metadata 205 may include, in some embodiments, such information as a UUID for the media file generated by the camera that captured the media, file format information, various video properties (e.g., frame rate, colorspace, pixel transform, dimensions, etc.), and various audio properties (e.g., channel count, track count, sample rate, etc.) of the media. The references 210, 220, and 230 to the original media file 215 and transcoded media files 225 and 235 refer to the versions of the media file stored in the application's file storage. Some embodiments, for each set of imported media files, create separate folders for the original media and any type of transcoded media. In some embodiments, the primary transcoded media and secondary transcoded media are high-resolution and low-resolution encodes of the original media file that may be created on import or post-import (e.g., by destinations 125 of FIG. 1).

In some embodiments, these references to the files are pointers to the locations of the files on the storage device. In some embodiments, the media-editing application initially sets the reference 210 to the original media such that the data structure references the media file that is to be imported (e.g., the file or set of files on a camera—a camera may store multiple files that are imported as a single clip) as the original media, then modifies this reference once the media file is copied to the application's file storage so that the data structure now references the media in the file storage. In some such embodiments, the application displays the media clips for the user to edit before the file is actually copied. A user can begin creating a presentation with the media clip while the clip refers to a file stored on a camera, then continue using the same clip once the file is copied with no interruption to the editing workflow.

The generated clip data files 245, in some embodiments, are one or more files that store analysis data. For example, some embodiments store a person detection file that stores information about the location of people in each image of a video. Much like the folders for different versions of media files, some embodiments create separate folders for each type of analysis file within a folder for a set of imported files (e.g., a folder for person detection files, a folder for color balance files, a folder for shake detection files, etc.). In addition, some embodiments store additional clip data 250 in the media clip data structure, as opposed to in a separate file. As one example, some embodiments store shake detection as a tag within the media clip that references the media file or a specific portion of the media file.

Having data structures that refer to each of the different versions of media enables the media-editing application of some embodiments to seamlessly switch between editing in high- and low-resolution. Referring to FIG. 1, when a user requests high-resolution editing, the scheduling engine 110 will instruct the disk reader 115 to read images from the original media or the high-resolution transcoded media, whereas when a user requests low-resolution editing the engine instructs the disk reader to read images from the low-resolution transcoded media. Some embodiments attach a pixel transform to each image that specifies a transform of the image from an image space in which many editing operations are defined into the pixel space of the image. Attaching the pixel transforms to the images in the image processing pipeline enables editing operations to be defined independent of the size and type of images being received, and thus makes possible the seamless transition between using high- and low-resolution files for editing.

As mentioned, for each imported media file, some embodiments create both an asset data structure that stores references to the different versions of the imported media file and a clip data structure that refers to the asset. Some embodiments create a nested series of clip structures for the imported file, including a first clip structure that refers to the asset and a second clip structure that contains the first clip structure. The second clip structure may be contained within a data structure that stores several associated clips and assets. When a user adds the media clip to a composite presentation, some embodiments duplicate the first and second clip structures and add these structures to a data structure for the composite presentation.

In the course of editing, projects will be unable to identify the underlying media from time to time. An asset might be deleted, an asset might exist but reference a file that no longer exists, etc. Some embodiments provide various mechanisms to modify the clip or project references in order to restore the media in the project (e.g., finding a different asset in the application that refers to a copy of the same media file).

In addition, some embodiments allow a user to create archives of the media on a camera in a bundle from which the files can be later imported. If a user deletes all of the media (i.e., to save disk space), the user can restore this media from camera archives and the application will be able to identify the media files (using a file identifier such as a UUID) and restore its missing references.

Several more detailed embodiments of the invention are described in the sections below. Section I describes various aspects of importing media with a media-editing application, including the parallel processing of the media, the creation of data storage structures for the media, and other topics. Section II describes a playback engine, or scheduling engine, that facilitates parallel processing of media clips, both pre-import and post-import. Section III describes the use of the playback engine to encompass edits into playback in real time. Section IV then describes the project library of some embodiments and clip recovery. Next, section V describes switching between high- and low-resolution editing according to some embodiments. Section VI then describes background task monitoring. Section VII describes the software architecture of a media-editing application of some embodiments. Finally, Section VIII describes an electronic system that implements some embodiments of the invention.

I. Importing Media

As mentioned above, the media-editing application of some embodiments performs operations on media files (e.g., video files, audio files, movie files with both video and audio tracks, etc.) in order to create a composite presentation. In order for the media-editing application to access the media, some embodiments provide an import procedure for importing media into the application. Some embodiments import media into a specific set of file folders defined for the application on a physical storage device connected to (or part of) the device on which the application operates (e.g., a hard drive of a computer on which the application operates).

While importing media, some embodiments perform a set of operations in parallel to create additional versions of the media, analyze the media, etc., as described above. In some embodiments, a user of the media-editing application may select which of the operations the application should perform during import. These operations may include transcoding the media (e.g., creating high and/or low-resolution versions of the media that are easy to edit), performing image analysis (e.g., finding people in images, detecting shaky video, balancing color, etc.), and performing audio analysis (e.g., identifying latent audio channels, identifying mono channels and stereo pairs, enhancing audio, etc.).

In addition to storing the actual media files (and any transcoded versions of the media), some embodiments define a media clip for each piece of imported media and store this media clip as data associated with the media-editing application. The media clip of some embodiments includes references to the one or more versions of the media file, metadata about the media file, references to any analysis data about the media file, etc.

The following subsections include detailed description of various aspects of the import process. Subsection A provides a description of the user interface of some embodiments through which a user imports media into the media-editing application, and subsection B describes the parallel processing on import. Next, subsection C describes the ability to edit a media clip before its media file is actually imported by the media-editing application. Subsection D then describes the folder structure into which the media is stored, while Subsection E describes the clip structure of some embodiments. Subsection F describes a camera archives feature of some embodiments that allows a user to create an archive of media from a camera or other external device.

A. User Interface for Importing Media

As mentioned, some embodiments enable a user to import media through a user interface of the media-editing application. The user can select which media to import (from a device such as a camera, an external drive, internal drive, etc.) and what should be done with the media upon its import. In addition, during and after import, the user interface (UI) makes available the media clips corresponding to the imported files so that the user can use these media clips to create a composite presentation.

Figure 3:
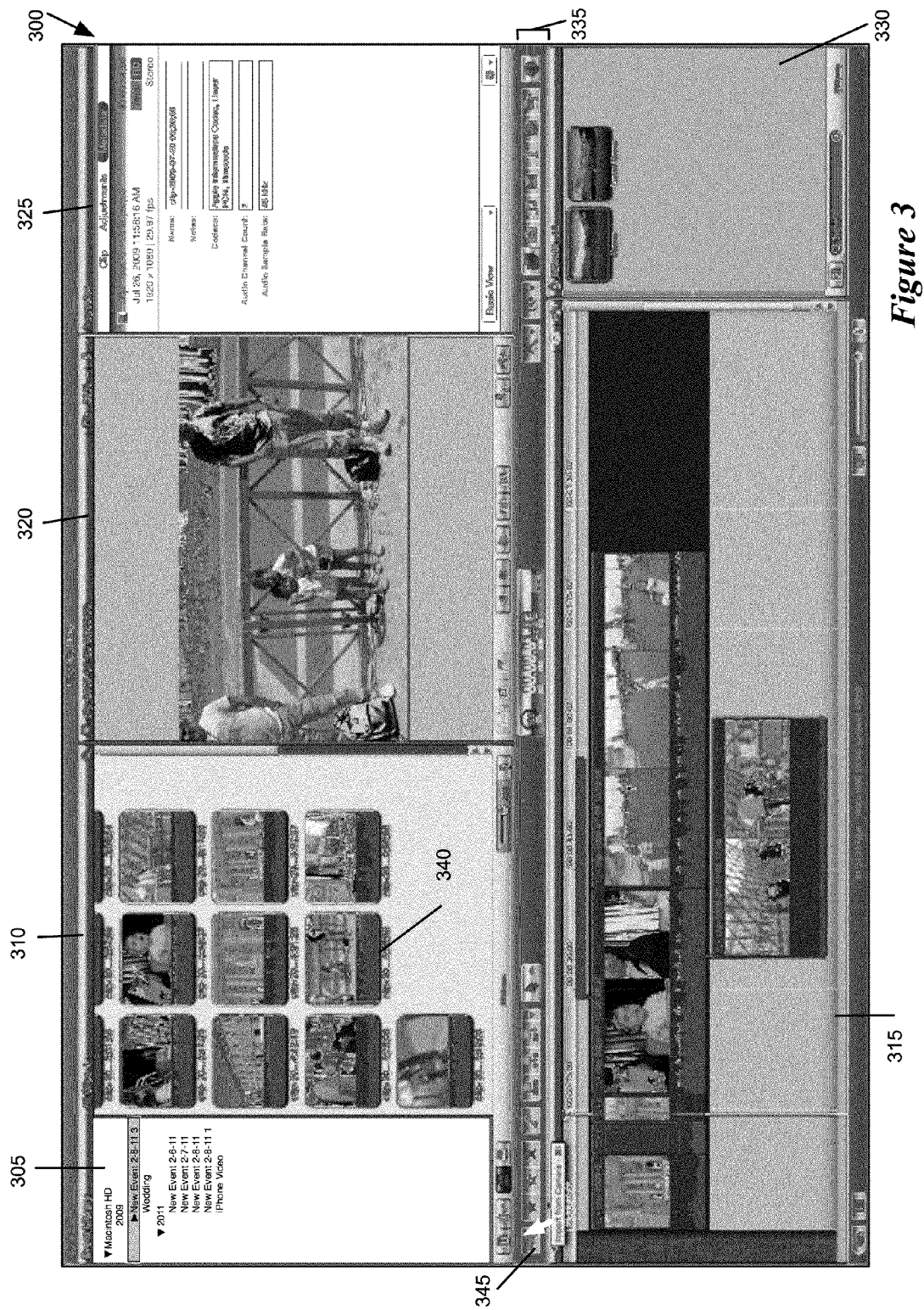
FIG. 3 illustrates a graphical user interface (GUI) of a media-editing application of some embodiments.

FIG. 3 illustrates a graphical user interface (GUI) 300 of a media-editing application of some embodiments. One of ordinary skill will recognize that the graphical user interface 300 is only one of many possible GUIs for such a media-editing application. In fact, the GUI 300 includes several display areas which may be adjusted in size, opened or closed, replaced with other display areas, etc. The GUI 300 includes a clip library 305, a clip browser 310, a timeline 315, a preview display area 320, an inspector display area 325, an additional media display area 330, and a toolbar 335.

The clip library 305 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 305 includes media clips from both 2009 and 2011.

Within a storage device and/or date, users may group the media clips into "events", or organized folders of media clips. For instance, a user might give the events descriptive names that indicate what media is stored in the event (e.g., the "Wedding" event shown in clip library 305 might include video footage from a wedding). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the wedding event, all media clips showing the bride might be tagged by the user with a "bride" keyword, and then these particular media clips could be displayed in a sub-folder of the wedding event that filters clips in the wedding event to only display media clips tagged with the "bride" keyword.

The clip browser 310 allows the user to view clips from a selected folder (e.g., an event, a sub-folder, etc.) of the clip library 305. As shown in this example, the folder "New Event 2-8-11 3" is selected in the clip library 305, and the clips belonging to that folder are displayed in the clip browser 310. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 315 provides a visual representation of a composite presentation (or project) being created by the user of the media-editing application. Specifically, it displays one or more geometric shapes that represent one or more media clips that are part of the composite presentation. The timeline 315 of some embodiments includes a primary lane (also called a "spine", "primary compositing lane", or "central compositing lane") as well as one or more secondary lanes (also called "anchor lanes"). The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can add media clips from the clip browser 310 into the timeline 315 in order to add the clip to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 320.

The preview display area 320 (also referred to as a "viewer" displays images from media files that the user is skimming through, playing back, or editing. These images may be from a composite presentation in the timeline 315 or from a media clip in the clip browser 310. In this example, the user has been skimming through the beginning of clip 340, and therefore an image from the start of this media file is displayed in the preview display area 320. As shown, some embodiments will display the images as large as possible within the display area while maintaining the aspect ratio of the image.

The inspector display area 325 displays detailed properties about a selected item and allows a user to modify some or all of these properties. The selected item might be a clip, a composite presentation, an effect, etc. In this case, the clip that is shown in the preview display area 320 is also selected, and thus the inspector displays information about media clip 340. This information includes duration, file format, file location, frame rate, date created, audio information, etc. about the selected media clip. In some embodiments, different information is displayed depending on the type of item selected.

The additional media display area 330 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 330 is currently displaying a set of effects for the user to apply to a clip. In this example, only two effects are shown in the display area (the keyer effect and the luma keyer effect, because the user has typed the word "keyer" into a search box for the effects display area).

The toolbar 335 includes various selectable items for editing, modifying what is displayed in one or more display areas, etc. The right side of the toolbar includes various selectable items for modifying what type of media is displayed in the additional media display area 330. The illustrated toolbar 335 includes items for video effects, visual transitions between media clips, photos, titles, generators and backgrounds, etc. In addition, the toolbar 335 includes an inspector selectable item that brings causes the display of the inspector display area 325 as well as items for applying a retiming operation to a portion of the timeline, adjusting color, and other functions.

The left side of the toolbar 335 includes selectable items for media management and editing. Selectable items are provided for adding clips from the clip browser 310 to the timeline 315. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

In addition, the media-editing application includes an import initiation item 345, which includes a camera icon in this figure. As shown, when a user holds the cursor over the item 345, the application displays feedback saying "Import from Camera" in the GUI 300. As shown, the user is selecting this item with a cursor in FIG. 3. This selection operation, as well as other user interface operations shown with a cursor throughout this application, could be performed with a cursor controller such as a mouse, touchpad, trackpad, etc. Furthermore, one of ordinary skill will realize that these user interface operations shown as performed by a cursor could also be performed through a touchscreen, which may not have a cursor. In addition, while the import process (and other processes in this application) are shown as initiated through various items in the user interface (e.g., item 345), many of these operations may be initiated in ways other than those shown, such as through drop-down or other menus, keystrokes, etc.

One or ordinary skill will also recognize that the set of display areas shown in the GUI 300 is one of many possible configurations for the GUI of some embodiments. For instance, in some embodiments, the presence or absence of many of the display areas can be toggled through the GUI (e.g., the inspector display area 325, additional media display area 330, and clip library 305). In addition, some embodiments allow the user to modify the size of the various display areas within the UI. For instance, when the display area 330 is removed, the timeline 315 can increase in size to include that area. Similarly, the preview display area 325 increases in size when the inspector display area 325 is removed.

Figure 4:
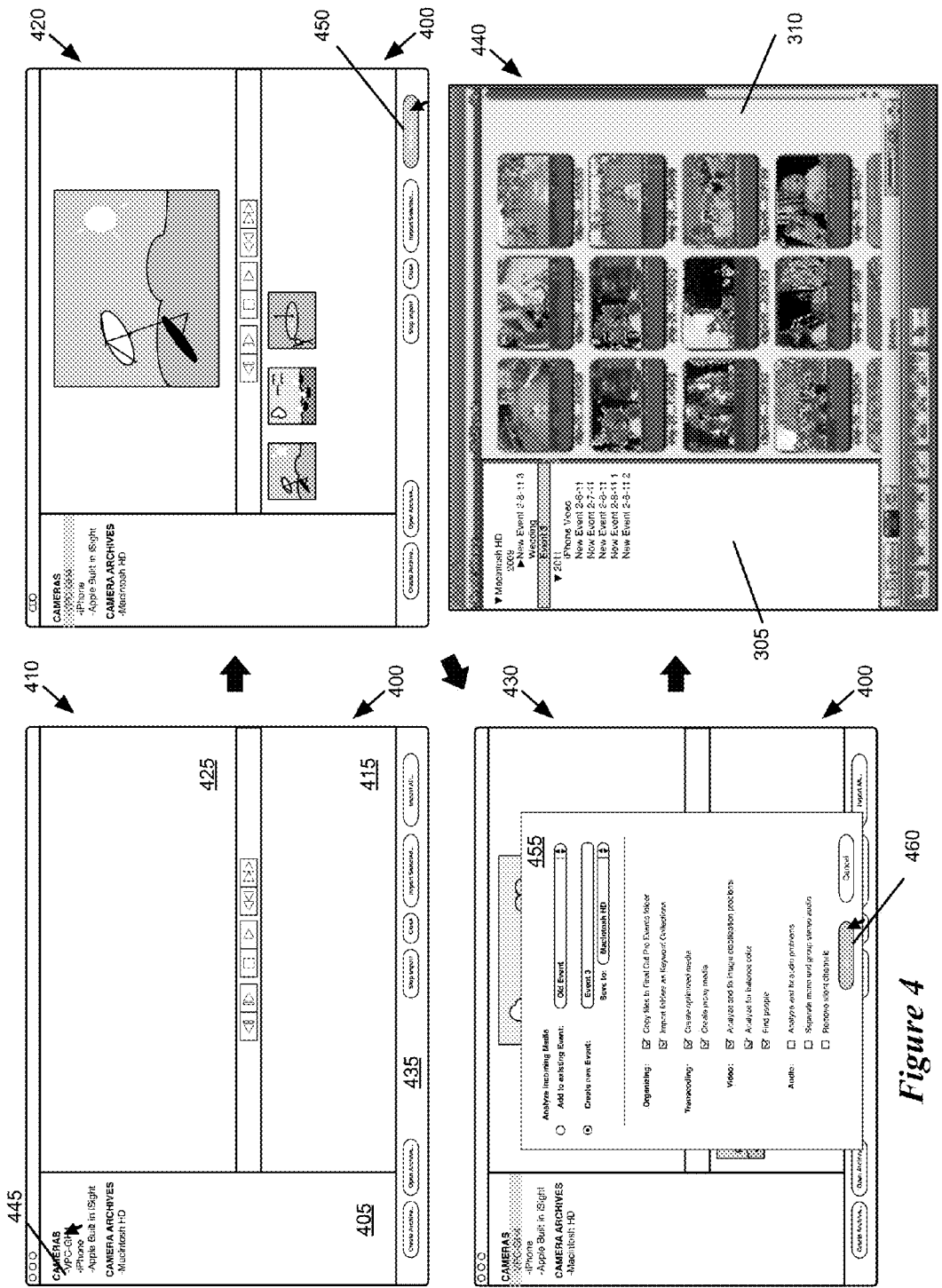
FIG. 4 illustrates the import process of some embodiments in four stages.

FIG. 4 illustrates the import process of some embodiments in four stages 410-440. Stages 410-430 illustrate an import display area 400 displayed by the media-editing application as a result of the selection of the import initiation item 345 or a similar GUI feature (e.g., a drop-down or other type of menu option, a different selectable GUI item, etc.), and through which the import process is performed, while stage 440 illustrates the clip library 305 and clip browser 310 after the import process. In some embodiments, the import display area 400 is displayed as a moveable window over a portion of the GUI 300.

The import display area 400 includes a device selection area 405, a media browser 415, a preview area 425, and a set of user-selectable items 435. The device selection area 405 includes a set of cameras and a set of camera archives from which the user may select to import media into the media-editing application. In some embodiments, cameras detected by the media-editing application may include cameras with hard drives, cameras with SD cards, digital tape-based cameras, SD cards (or similar physical storage devices) separated from their cameras, etc. Camera archives are described in further detail below in subsection F of this section.

The media browser 415 displays media files (or sets of media files) identified on a device (e.g., on a camera). In some cases, what the media-editing imports as a single file may not be stored as such on the camera. For instance, a file imported as a single movie file might be stored on the camera as a video file, multiple audio files, and a metadata file. The nature of the camera's storage may depend on the type of camera; for instance, smaller consumer cameras may store a single file whereas a professional camera will have a more sophisticated set of video, audio, and metadata files. Throughout this application, these collections of files may be referred to as a media file on a camera.

In some embodiments, the media-editing application displays the media files in a manner similar to the media clips in clip browser 310. That is, the user can skim or playback the media files while the files are still stored on the storage device and not yet imported. The preview area 425 displays previews of the media files on the device as the user skims or plays back the media files. As shown, the preview area 425 includes a set of playback controls (e.g., play and stop buttons, fast forward and rewind buttons, etc.). The set of user selectable items 435 includes various selectable items that enable a user to import media, create camera archives, and access camera archives. Camera archives will be described in further detail in subsection F below.

As shown at stage 410 of FIG. 4, the user has moved the cursor over the selectable item 445 for camera VPC-GH4, and is in the process of selecting this particular camera. The second stage 420 shows that with the camera VPC-GH4 selected, the media files on that camera now populate the media browser 415. In this case, there are three media files that appear as thumbnails in the media browser 415, one of which is also shown in the preview area 425. The stage 420 also shows the user selecting selectable item 450, labeled "Import All". As shown, the set of user selectable items 435 also includes an item "Import Selected". The import all button allows a user to import all files from a selected device or archive, while the import selected button allows the user to import files selected in the media browser 415. In some embodiments, there is only one import button, which imports all files as a default, but only imports selected files when the user has selected one or more files in the media browser.

The third stage 430 illustrates an import dialog box 455 that presents the user with a number of options for analyzing the incoming media. In some embodiments, the dialog box also includes a list of media files from which the user may choose files to import. In other embodiments, the user has already made this selection (by selecting to import all files from a device or a subset of the files on the device) as described above. Some embodiments allow a user to import files that are already stored on the device on which the application operates, in which case the application displays a similar dialog box that also includes a file browser section.

As shown, the import dialog box 455 allows a user to either add the imported files to an existing event or create a new event for the incoming media. When creating a new event, the user can select the device on which the event should be created. As described above, an event is a folder of media clips that a user has chosen to group together (e.g., because the clips were all shot at the same time and place, the clips all relate to a particular topic, etc.). In some embodiments, the media-editing application stores all events in a particular section of the file storage of a device, for organization purposes. In this case, the user has selected to create a new event, "Event 3", which will be saved on the Macintosh HD (i.e., the hard drive of the device on which the media-editing application operates).

The import dialog box also includes a number of checkboxes for various optimization and analysis options. In some embodiments, as shown, these are broken down into four groups: organizing, transcoding, video analysis, and audio analysis. The organization options include a first option for copying files to the Events folder, and a second option for importing folders as keyword collections. The first option copies the imported media files to a specific folder for original media in the Events folder on the selected device or drive. The second option imports folders of the selected import device (e.g., the camera) as keyword collections. That is, when the selected camera has media organized into folders, the media-editing application tags the media clips in the event with the name of the folder. A user can then view the clips in the event filtered by keywords, in some embodiments.

The transcoding and analysis options are options for various actions that can be taken on the imported media files. In some embodiments, these actions are all performed in an efficient manner using parallel processing, as described in subsection B below. Two transcode options are provided: create optimized media, and create proxy media. In some embodiments, the optimized media is a high-resolution transcode of the original media file and the proxy media a low-resolution transcode of the original media file. These different versions of the media file are stored in the event folder in some embodiments, and used to enable the media-editing application to seamlessly switch between high- and low-resolution editing.

In some embodiments, the optimized media is generated at the same resolution as the original imported media, but is in a format better suited for editing. Whereas the original media may have significant temporal dependencies in the encoding (i.e., one image in the video sequence is encoded by reference to numerous other images in the video sequence) depending on the format of the media, the optimized media uses a format without such temporal compression. In some embodiments, the optimized format uses ProRes 422 encoding. This simplifies the editing process, as often a user will only want to use some of the images in a media file, and when each image in a video sequence can be decoded and displayed on its own, the retrieval of a specific one of the images is simplified (i.e., does not require the retrieval or decode of any other images). As described below, some embodiments automatically determine whether imported media should include an optimized transcode based on the format of the media. In fact, some embodiments automatically select the checkbox for optimized media when the format is not well suited for editing (e.g., AVCHD format, in which often only one in a large group of images (e.g., 15 or 30) is encoded without reference to other images). On the other hand, some embodiments either gray out the optimized media checkbox or do not create the optimized media even if the checkbox is selected in the case that the imported media is in a format that is already easy to use for editing (e.g., the iFrame format or DV, which include no temporal compression).

The proxy media, in some embodiments, is also designed for editing, but stores images at a lower resolution. Some embodiments use the ProRes Proxy format, which stores images at a resolution of 960×540 (i.e., one-fourth the size of the optimized media). In some embodiments, the optimized and proxy versions of the media files are stored in specific folders within an event folder on the storage, as described below.

The video analysis options of some embodiments, as shown in dialog box 455, include identification of image stabilization problems, automatic color balancing, and person detection. The image stabilization operation of some embodiments identifies portions of the video in a media file in which the camera appears to be shaking, and tags the media file (or a portion of the media file with the shaky video) with a term such as "shake". Users can then search in the clip browser for clips with the "shake" tag and perform shake correction on these clips. Other embodiments automatically perform the shake correction when the shake is detected. In addition, some embodiments store an image stabilization file for each media clip analyzed that may indicate dominant motion (e.g., determined by computing motion vectors for the images) between the images and how to invert this motion in order to cancel the shake.

The color balancing of some embodiments automatically balances the color of each image in a media file and saves the color balancing information in a color balance file for each media file analyzed. The color balancing operation adjusts the colors of an image to give the image a more realistic appearance (e.g., reducing tint due to indoor lighting). Different embodiments may use different color balancing algorithms.

The person detection algorithm identifies locations of people in the images of a media file and saves the person identification information in a person detection file for each media file analyzed. The person detection operation of some embodiments identifies faces using a face detection algorithm (e.g., an algorithm that searches for particular groups of pixels that are identified as faces, and extrapolates the rest of a person from the faces). Some embodiments provide the ability to differentiate between single people (e.g., in an interview shot), pairs of people, groups of people, etc. In addition to, or instead of, saving a person detection file, some embodiments tag the media clip created for the media file with a tag (e.g., a keyword tag) that indicates that the clip includes people in a particular range. Other embodiments use different person detection algorithms.

As described in detail below, some embodiments process each image of a media file in an efficient manner by performing all of the optimization and analysis in parallel. That is, each image is read from a disk only once and decoded only once, then sent to each of the various operations (e.g., the transcoding and analysis operations). In some embodiments, the same engine that is used to prepare images for playback also prepares images for the transcoding and analysis operations.

In addition to the video operations, some embodiments include audio analysis operations at import as well. As shown, these operations may include analysis for audio problems, separation of mono audio channels and identification of stereo pairs, and removal of latent audio channels (i.e., channels of audio that are encoded in the imported file or set of files but do not include any actual recorded audio). Other embodiments may make available at import additional or different audio or video analysis operations, as well as additional transcode options.

The third stage 430 of FIG. 4 illustrates that the user is selecting the import selectable item 460 in order to start the import process. This sets off a process that creates a clip for each media file, copies the media file, and performs all of the requested analysis and transcoding operations on the media file. The creation of media clips will be described in detail below in subsection E of this section.

The fourth stage 440 illustrates the clip library 305 and clip browser 310 from GUI 300 of FIG. 3 after the import operation. In FIG. 3, the "2009" folder of clip library 305 included two events. At stage 440 of FIG. 4, the clip library now includes a third event in the "2009" folder, the newly created "Event 3". As these are placed in the 2009 folder, the media files in the event were created (i.e., filmed) in the year 2009. In fact, as can be seen by viewing the thumbnail filmstrips in the clip browser 310, some of the clips are the same as in "New Event 2-8-11 3". At this point, the media clips have been created, and the copying of the original media, transcoding, and analysis may or may not have been completed. These tasks take place in the background in some embodiments, while the user can work with the clips (e.g., add the clips to the timeline) as soon as the clips are created.

Figure 5:
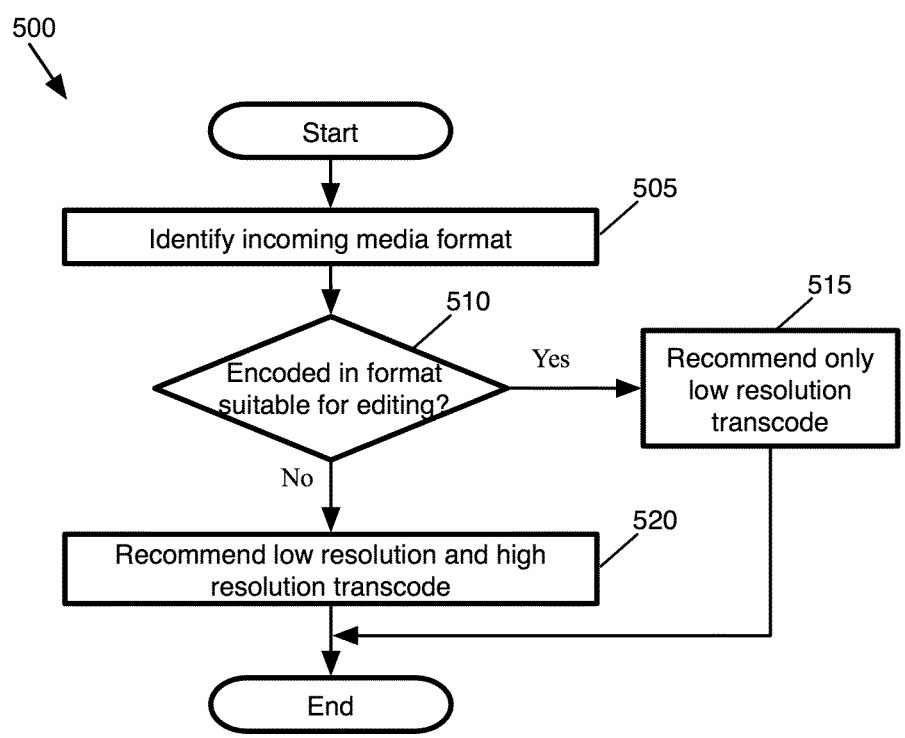
FIG. 5 conceptually illustrates a process of some embodiments for determining whether or not to recommend a high-resolution transcode to the user.

As mentioned in the preceding discussion, some embodiments automatically determine whether or not the media-editing application should perform a high-resolution transcode of a media file during import. To make this determination, the media-editing application examines the format of the media files. FIG. 5 conceptually illustrates a process 500 of some embodiments for determining whether or not to recommend a high-resolution transcode to the user.

As shown, the process 500 begins by identifying (at 505) the format of an incoming media file. In some embodiments, the media editing application determines the format by reading metadata in the media file (or in a metadata file associated with the media file or files). Examples of formats include AVCHD, iFrame, AVC-Intra, etc.

The process then determines (at 510) whether the media file is encoded in a format suitable for editing. In some embodiments, the media-editing application determines that a media file is in a format suitable for editing when each video image in the media file is encoded without reference to any other images, as opposed to formats that use temporal compression. For instance, the iFrame format does not use temporal compression, and therefore there is no reason to create a high-resolution transcode of an iFrame video, as the iFrame video is easy to edit. On the other hand, AVCHD often has one image every fifteen or thirty that is encoded without reference to any other images, while the rest of the images are encoded by reference to at least one other image.

When the media file is encoded in a format suitable for editing, the process recommends (at 515) only a low-resolution transcode for the media file. Otherwise, the process recommends (at 520) both a low-resolution transcode and a high-resolution transcode for the media file. The process then ends. In some embodiments, the media-editing application makes this recommendation by either automatically checking a checkbox such as that shown in stage 430 of FIG. 4, or by graying out such a checkbox. Some embodiments simply do not perform a high-resolution transcode of a media file that is already in a format optimized for editing, as such a file will take up disk space and not provide any advantages over the original format of the media file.

Figure 6:
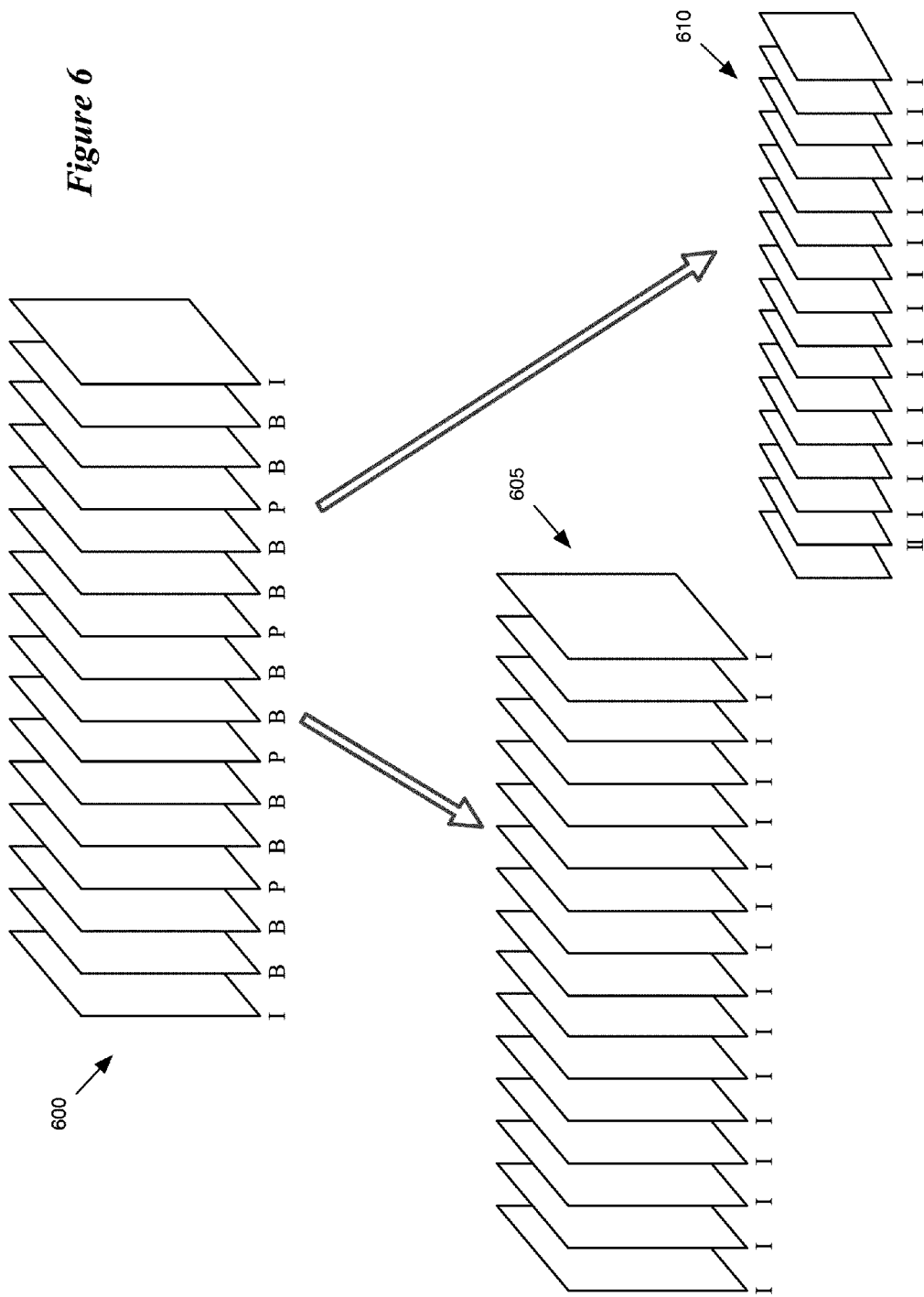
FIG. 6 illustrates an example of a situation in which the media-editing application would generate both a high-resolution and a low-resolution transcode of a media file.

FIG. 6 illustrates an example of a situation in which the media-editing application would generate both a high-resolution and a low-resolution transcode of a media file. In this case, the original media 600 is encoded in a temporally compressed manner, in which every fifteenth frame is an intraframe (i.e., a video image that is encoded without reference to other images in the sequence). The other intermediate frames are predictive or bidirectional frames, that are encoded by reference to one or more other images. The media-editing application creates a high-resolution transcode 605 for these images and a low-resolution transcode 610 (shown as one-fourth the size of the original media). In both of these transcoded versions, all of the images are intraframes, encoded without temporal compression.

Figure 7:
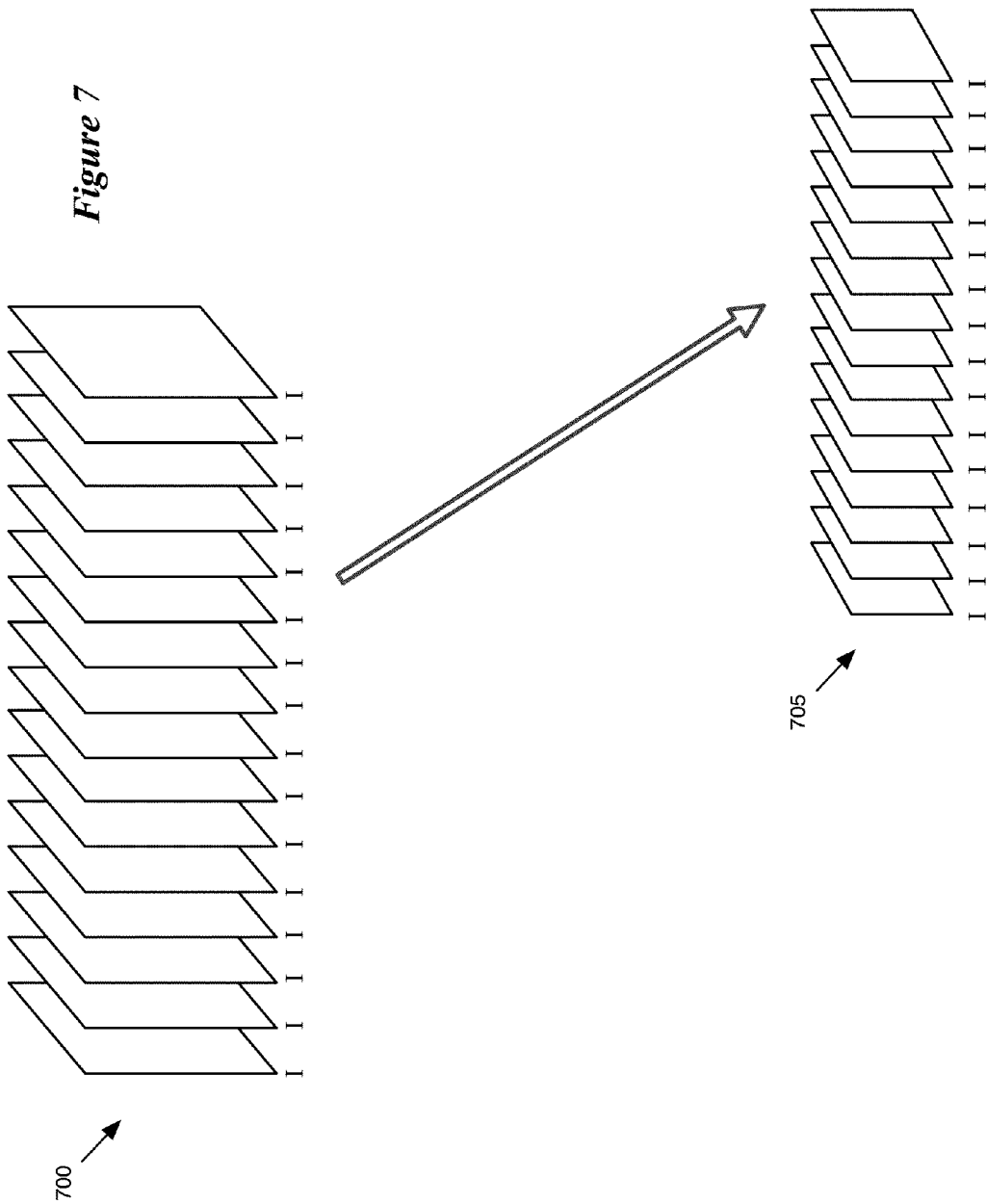
FIG. 7 illustrates an example of a situation in which the media-editing application would generate only a low-resolution transcode of a media file.

FIG. 7, on the other hand, illustrates an example of a situation in which the media-editing application would generate only a low-resolution transcode of a media file. In this case, the original media 700 is encoded without temporal compression, so that all of the images are encoded without reference to other images. The media-editing application only creates a low-resolution transcode 705, which (as above) is one-fourth the size of the original media. While the low-resolution transcodes are shown as having one fourth the size of the original (i.e., half the height and half the width), one of ordinary skill in the art will recognize that different embodiments might use different sizes for the various forms of media (e.g., having a low-resolution version of the media that is two-thirds the height and width of the original media, or creating more than two sizes of media).

B. Media Import Process

As mentioned above, some embodiments perform processing of multiple operations upon import. Either automatically or based upon user selection, the media-editing application will perform a file copy operation, transcoding operations, and media analysis operations. In some embodiments, the application first performs a file copy operation, then begins performing the transcoding and media analysis operations in an efficient manner. In other embodiments, the application begins the transcoding and analysis operations as soon as the import begins by reading the media file from the external device (e.g., camera), then switching to use the imported file once that file is created.

Figure 8:
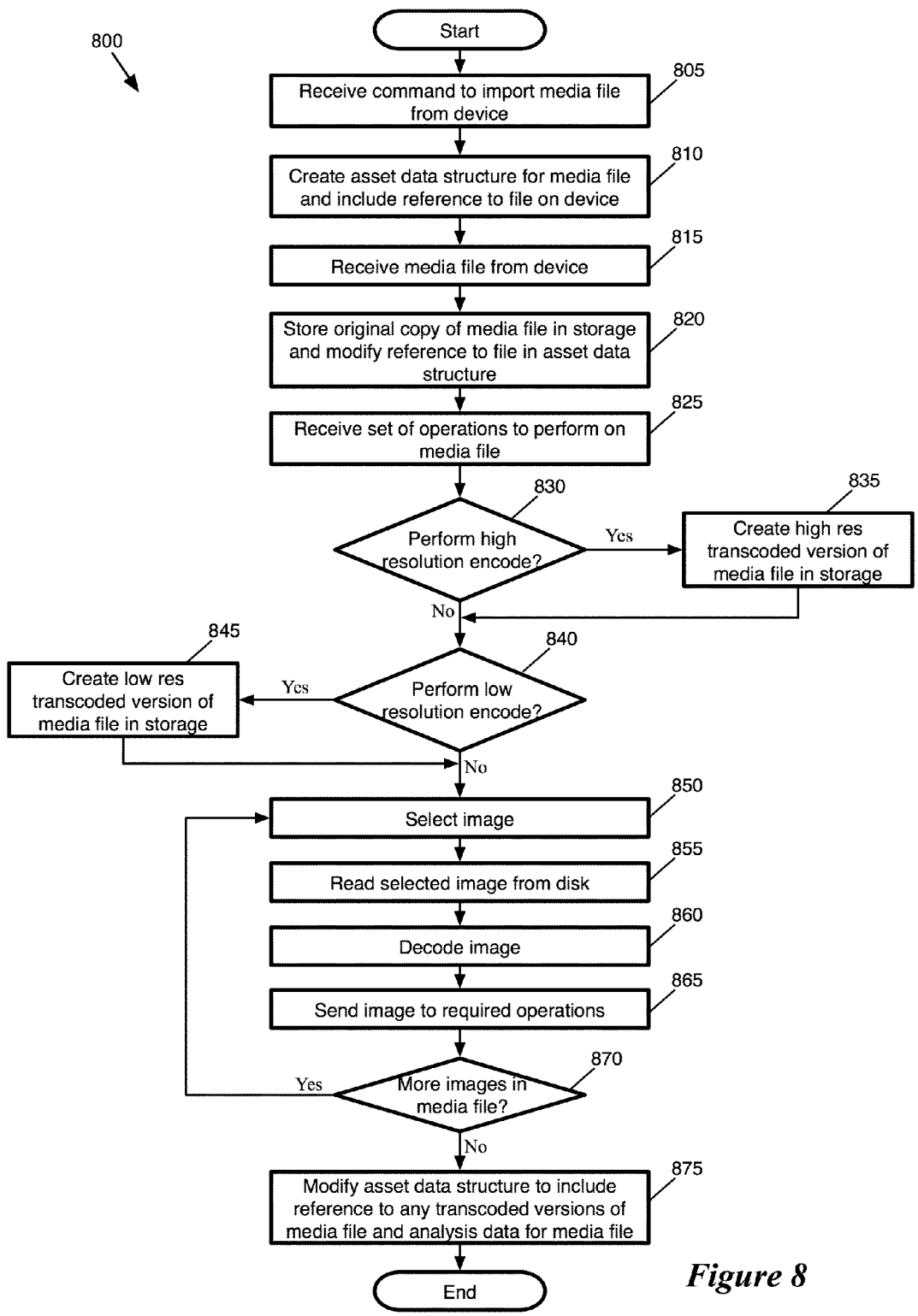
FIG. 8 conceptually illustrates a process of some embodiments for importing media with a media-editing application.

FIG. 8 conceptually illustrates a process 800 of some embodiments for importing media with a media-editing application. In some embodiments, the process is performed in response to a user command (e.g., through a user interface) to import the media file. Some embodiments, though, automatically import files from a device such as a camera when the device is attached to the computer or similar device on which the application operates, and the application is running.

As shown, the process 800 begins by receiving (at 805) a command to import a media file from a device. As mentioned, the import may be the result of a user instructing the application to import a file from the device. The device might be an external device such as a digital video camera, an external drive (e.g., an external hard drive, a flash drive, an SD card, etc.), or a drive internal to the device on which the application operates (e.g., the same hard drive, a different partition of the hard drive, etc.). In the latter case, the media file might be located in a folder, on the same hard drive as the imported files, that is not associated with the media-editing application.

The process then creates (at 810) an asset data structure for the media file and includes a reference to the media file in the asset data structure. At this stage, the reference to the media file is a reference to the file stored external to the application's folder structure (e.g., the file on the camera, on an external drive, etc.). The asset data structure will be explained in more detail below in subsection E of this section. Some embodiments import each media file as an asset and create a data structure for the asset that references the media file and stores additional data. The application then uses clip data structures that include references to one or more assets and store the relation between the assets in the clip structure. The asset data structure of some embodiments, in addition to storing a reference to the media file, stores references to transcoded versions of the media file and to analysis data about the media file. In addition to creating the asset data structure, some embodiments also create a clip data structure at the same time that references the asset.

After creating the asset data structure, the process receives (at 815) the media file from the device (e.g., the camera). As mentioned, the asset data structure initially refers to the media file stored on this device, which allows the user to perform edits with the media clip for that asset before the file is copied over to the application file storage.

The process then stores (at 820) the original copy of the media file in the application storage (e.g., one or more file folders organized by the application for storing media) and modifies the reference to the file in the asset data structure. That is, once the media file has been fully copied to the application folder, the application modifies the asset data structure to refer to the file in the application's folder structure, rather than the file on the camera (or other device).

Next, the process 800 receives (at 825) a set of operations to perform on the media file. As mentioned above, in some embodiments the media-editing application performs the analysis on the media file once the media file is copied over to the application file storage. The set of operations of some embodiments includes the transcoding operations and analysis operations that are mentioned above—these may include high- and low-resolution transcodes, video analysis (e.g., person detection, color balancing, shake detection), and audio analysis (e.g., audio defect correction, mono/stereo detection, and latent channel detection). As shown, the user may determine which of these operations should be performed by selecting from a list of operations at the time of import. Some embodiments perform a set of operations automatically, and the particular operations performed may depend on the type of file being imported.

In some embodiments, the media-editing application may also provide an option for performing any of these operations at some time after import as well. For example, if the user is on a laptop computer out in the field, they may not want to perform all of the analysis (or any of the analysis) on the laptop, as the laptop may not have the processing capability to perform all of the analysis while still running smoothly. Upon returning to a desktop computer with significant processing power (and storage space for transcoded files), the user could then have the application perform the analysis and transcode operations.

Based on the set of operations to perform, the process determines (at 830) whether to perform a high-resolution encoding operation to create a high-resolution encoded file. As mentioned, in some embodiments, the high-resolution transcoded media is encoded in ProRes 422 format, at 1920× 1080 resolution. In addition, as described above, some embodiments only generate this encoded file when the original media file is in a format that is not suited for easy editing, such as when most of the video images are temporally compressed.

When the editing application is performing a high-resolution encoding operation, the process creates (at 835) a high-resolution transcoded version of the media file in the file storage for the application. The high-resolution transcoded media file will at this point not yet be complete with all of the video images, as each of these images must be encoded and stored in the file by the high-resolution encoder.

The process also determines (at 840) whether to perform a low-resolution encoding operation to create a low-resolution encoded file. As mentioned, in some embodiments, the low-resolution transcoded media is encoded in ProRes Proxy format, at 960×540 resolution (which is one-fourth the number of pixels of the high-resolution transcoded media). As described above, some embodiments leave it up to the user whether or not to generate a low-resolution encode.

When the editing application is performing a low-resolution encoding operation, the process creates (at 845) a low-resolution transcoded version of the media file in the file storage for the application. The low-resolution transcoded media file will at this point not yet be complete with all of the video images, as each of these images must be encoded and stored in the file by the low-resolution encoder. In some embodiments, the application also stores a reference to the newly created files in the asset data structure for the imported media file.

With the original file copied over to the file storage for the application, the process can begin the parallel processing operations on the media file for generating the transcoded file(s) and performing the video and audio analysis. The process selects (at 850) an image of the original media file. In some embodiments, the media-editing application accesses the images in the order of the video sequence (i.e., in temporal order of the video).

With the image selected, the process reads (at 855) the selected image from the disk on which it is stored (e.g., the hard drive of the device on which the application is operating). In some embodiments, as described in detail below in Section B, this involves scheduling a disk read operation with a processor of the device. The disk read operation accesses the media file and reads the data from the media file that describes the selected image. Some embodiments store this data in volatile memory, such as RAM, or in a cache of the processor.

The process 800 then decodes (at 860) the data that has been read from the disk to arrive at a description of the image. In some embodiments, the image description includes a pixel buffer. The pixel buffer of some embodiments is an ordered set of pixels, where each pixel includes a set of coordinates (i.e., where in the image the pixel is located) and a set of pixel values that describes the pixel (e.g., color values in a particular colorspace). As described below in Section V, some embodiments include additional detail in the image, such as a pixel transform and a colorspace in which the pixels are defined.

With the image decoded, the process sends (at 865) the decoded image to all of the required operations (i.e., the operations received at 825). As noted, these operations may include one or more transcoding operations, analysis operations such as person detection, color balancing, shake detection, and audio operations, etc.). As shown, the process only reads each image once and decodes the image once, as opposed to performing a separate read and decode for each destination operation. This enables more efficient processing of the media file. As will be described in further detail in Section II, the process of some embodiments may additionally perform a number of format conversions before sending each image to its destination operations (e.g., colorspace conversions, size conversions, etc.). Each operation may want a particular format image, and thus the images will need to be converted to the appropriate format for each operation.

After sending the currently selected image to the required operations, the process 800 determines (at 870) whether any more images remain in the media file. The media-editing application will perform the required analysis on each image by reading the image data from the disk, decoding the image data, and sending the image to the appropriate operations. When additional images remain, the process returns to 850 to select the next image.

Once all images are analyzed and transcoded, the process modifies (at 875) the asset data structure to include references to any transcoded versions of the media file and any analysis data for the media file. The process then ends. The references stored in the asset data structure will be described in further detail below in subsection E.

One of ordinary skill in the art will recognize that the process 800 is a conceptual process, and that the operations may not be performed in the specific order described. For instance, the process may perform many of the operations at the same time or in an overlapping manner (e.g., creating the high and low res transcoded versions of the media file and creating references to those media files in the asset data structure). In addition, the disk reads and decodes may not be performed in the orderly fashion shown in process 800— instead, the process may perform disk reads and decodes ahead of time (e.g., reading image 2 from a disk before the processing of image 1 is complete).

As described, the media-editing application of some embodiments first copies the original media file to a particular file folder associated with the application and then performs the transcoding and analysis on the copied version of the original media file. As opposed to performing the transcode and analysis operations on the media file stored on an external device (such as a camera), this enables the user to quickly disconnect the external device once the files are all copied. For example, the user could connect a camera with a number of video clips to a computer, quickly copy that video to the computer, then disconnect the camera and continue shooting video while the computer transcodes and analyzes the video and another user edits the video into a composite presentation.

Figure 9:
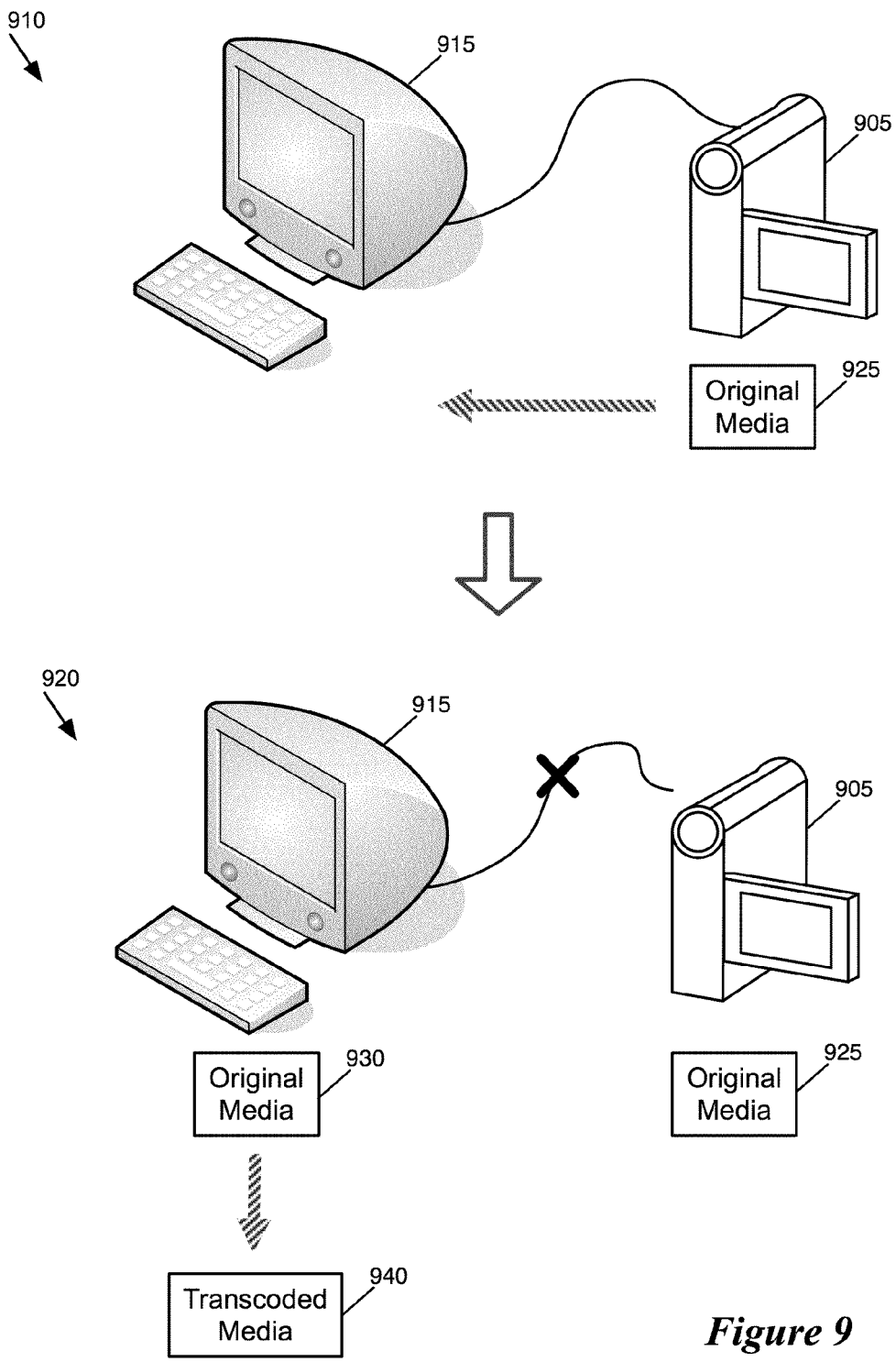
FIG. 9 illustrates the import of a media file from a device and then the disconnection of the device while the application transcodes the media file.

FIG. 9 illustrates this situation in two stages 910 and 920. At stage 910, a camera 905 is connected to a computer 915. An original media file 925 is stored on the camera 905, having been captured by the camera 905. In response to a user import command (e.g., as shown in FIG. 4), the camera begins transferring the media file 925 to the computer 915). At stage 920, the camera 905 has been disconnected from the computer 915. The original media file 925 remains on the camera (although the user may choose to delete this file), but a second copy 930 of the media file is now stored on the computer 915. As shown, although the camera 905 is disconnected, the computer is generating a transcoded media file 940 from the original media file 930.

Figure 10:
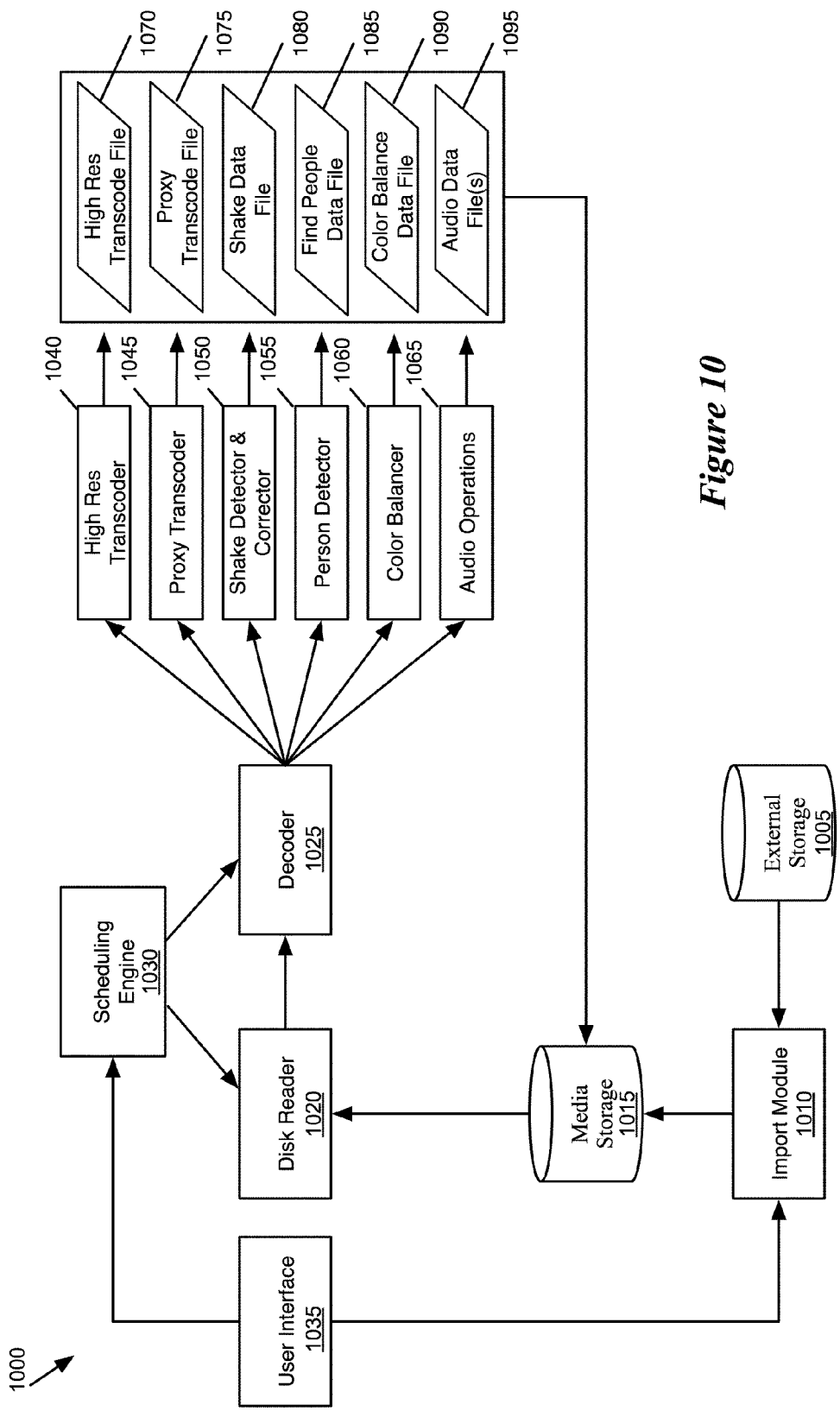
FIG. 10 illustrates a system with examples of specific destinations to which the decoder may send decoded images, as well as the output of those destinations.

As described by reference to FIG. 1 and FIG. 8, some embodiments send each image of an imported media file to multiple destinations in parallel. FIG. 1 illustrated that a disk reader reads image data from a media storage and sends the data to a decoder, which then sends the decoded image to a number of destinations. FIG. 10 illustrates a system 1000 with examples of specific destinations to which the decoder may send decoded images, as well as the output of those destinations.

As with FIG. 1, the system 1000 includes an external storage 1005, an import module 1010, a media storage 1015, a disk reader 1020, a decoder 1025, and a scheduling engine 1030. The system 1000 also includes a user interface 1035 and image destinations 1040-1065. The external storage 1005 is a storage external to the file structure of the media editing application. This storage may be a storage on an external camera (e.g., a digital tape, a hard drive, an SD card, etc.), a storage on an external drive such as a flash drive, external hard drive, SD card isolated from a camera, etc.), or even on the same disk as the application's file storage (i.e., the same partition or a different partition of the disk).

A user interacts with the media-editing application through user interface 1035. As shown in FIGS. 3 and 4, the user can select which media files to import and what operations should be performed on the media files through the user interface. The user interface 1035 instructs the import module 1010 as to which files from the external storage 1005 should be imported.

The import module 1010 receives instructions from the user interface 1035 indicating which files from the external storage 1005 to import. Based on these instructions, the import module 1010 copies the indicated files from the external storage 1005 to the media storage 1015. In some embodiments, the import module creates any required folders in the file folder structure for the application (e.g., an events folder, folders within the events folder for the original media file, transcoded media, analysis files, etc.). In some embodiments, the import module (or a different module) creates the asset and clip data structures for the imported file. The media storage 1015, as mentioned, stores the imported media file, and may represent a set of file folders in the file storage of either the device (i.e., the boot disk of the device) on which the application operates or a different storage device.

The disk reader 1020 reads image data from the appropriate media file in the media storage 1015, as instructed by the scheduling engine 1030, and passes the image data to the decoder 1025. Unless the image data is in a raw, unencoded format, the data needs to be decoded in order for a destination to work with the image. Thus, the decoder 1025 decodes the image data to generate pixel data for the image. The type of decoding used will depend on the format in which the image is encoded. In some embodiments, the system may include multiple decoders and will choose between the different decoders based on the format of the received encoded video.

The scheduling engine instructs the disk reader 1020 and the decoder 1025 to perform their operations based on instructions received from the user interface (indicating which media files are being imported and which operations should be applied to the media files). In addition, as will be described below in Section II, the scheduling engine receives feedback from the image destinations 1040-1065 indicating the speed at which the images should be sent to the destinations.

The image destinations 1040-1065 include a high-resolution transcoder 1040, a proxy transcoder 1045, a shake detector and corrector 1050, a person detector 1055, a color balancer 1060, and audio operations 1065. These destinations receive images either directly from the decoder 1025 or from intermediate image processing operations that are not shown in this figure, but are described in detail below. The audio operations 1065 do not receive or use image pixel data, but in some embodiments receive decoded audio at the same rate as the other destinations receive images. For instance if the video has a frame rate of 24 fps, some embodiments receive $\frac{1}{24}^{th}$ of a second of audio per decoded image. If the audio is sampled at 48 kHz (48,000 samples per second), then the audio operations would receive 2000 samples to correspond to one image.

The high-resolution transcoder 1040 generates a high-resolution encoded image for each image received and stores these images in a high-resolution transcode file 1070. The proxy transcoder 1045 generates a lower resolution encoded image for each image received and stores these images in a proxy transcode file 1075.

The shake detector and corrector 1050 of some embodiments identifies portion of the video in a media file in which the camera appears to be shaking, and tags the media file with a term such as "shake". Users can then search in the clip browser for clips with the "shake" tag and perform shake correction on these clips. Other embodiments automatically perform the shake correction when the shake is detected. In addition, some embodiments store an image stabilization file, or shake data file 1080, for each media clip analyzed.

The person detector 1055 identifies people in the images of a media file and saves the person identification information in a person detection file, or find people data file 1085, for each media file analyzed. The person detection operation of some embodiments identifies faces using a face detection algorithm (e.g., an algorithm that searches for particular groups of pixels that are identified as faces, and extrapolates the rest of a person from the faces). Other embodiments use different person detection algorithms.

The color balancer 1060 automatically balances the color of each image in a media file and saves the color balancing information in a color balance data file 1090 for each media file analyzed. The color balancing operation of some embodiments adjust the colors of an image to give the image a more realistic appearance (e.g., reducing tint due to indoor lighting). Different embodiments use different color balancing algorithms.

The audio operations 1065 may include analysis for audio problems, separation of mono audio channels and identification of stereo pairs, and removal of latent audio channels (i.e., channels of audio that are encoded but do not include any actual recorded audio). The output of these audio operations may be stored in one or more audio data files 1095, stored as metadata of the media file, or may be used to directly modify audio data in the media file.

As shown, the various media files 1070-1075 and the analysis data files 1080-1095 are stored in the media storage 1015. In some embodiments, as will be described in subsection D, these files are all stored in an organized fashion in the file storage of the application.

As mentioned, the media-editing application performs the various different operations 1040-1065 in parallel in some embodiments. To do this, some embodiments perform the operations as multiple concurrently processed threads for each image in a media file (i.e., a thread for encoding an image at high-resolution, a thread for performing shake detection, a thread for balancing color, etc.). In addition, through the scheduling engine 1030, duplicative operations are removed. Rather than having a separate disk read and decode for each of operations 1040-1065, the scheduling engine 1030 ensures that each image in a video is read only once and decoded only once.

C. Editing a Clip on a Camera

As described in the above section, when a user imports a media file from a camera (or other external device), some embodiments create an asset data structure for the media file that initially references the media file on the camera, and modify this reference once the media-editing application has copied the media file from the camera to a storage location associated with the application, often located on the boot disk of the device on which the application operates. The application also creates a clip data structure that refers to the asset (the details of these data structures and the references are described in subsection E). Because these data structures are created when the import process begins, the media clip may be used for editing right away, even before the media files are copied (which could be a significant length of time, depending on the file size and the speed of the connection between the camera and the computer). For instance, the user can add a clip to the timeline and then trim the clip in the timeline without the underlying media file having yet been copied to the application file storage.

Figure 11:
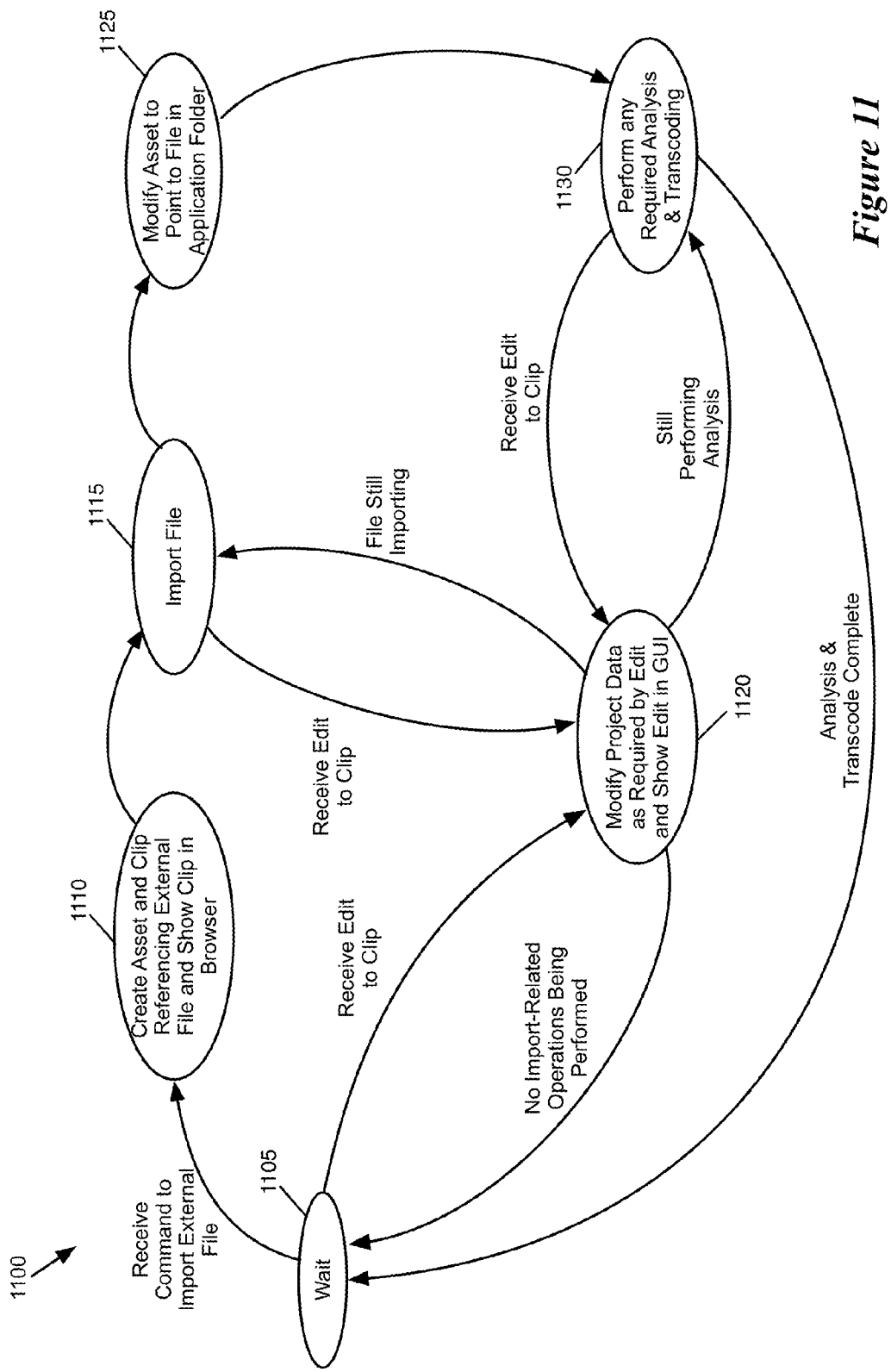
FIG. 11 conceptually illustrates a state diagram of a media-editing application of some embodiments.

FIG. 11 conceptually illustrates a state diagram 1100 of a media-editing application of some embodiments. One of ordinary skill will recognize that the state diagram does not describe all states of the media-editing application, but instead specifically pertains to the import of a media file and the editing of that media file. As shown, the media-editing application is in a wait state 1105 before and after the import of the media file. The media-editing application may be performing other tasks, including import- or editing-related tasks, at this time. In addition, at many of the other stages, the application could be performing a wide variety of tasks. In fact, in some embodiments, many of the import operations (transcoding, analysis, etc.) are performed as background tasks that the application pauses when performing other tasks (e.g., editing).

When the media-editing application receives a command to import an external file, the application transitions to state 1110 as the import process starts. At state 1110, the application creates an asset and a clip that reference the external file and display the clip in the browser. As described above, the asset references the media file and the clip references the asset in some embodiments. An example of clips shown in the browser is illustrated in FIG. 3. At this state, the asset references the file on the camera (the external file).

The application then transitions to state 1115 to import the media file. During this state, the application copies the media file from the camera to the file storage associated with the application on a drive chosen by the user. In some embodiments, this may be a time-intensive process, depending on the size of the file (and whether additional files are being imported at the same time) as well as the speed of the connection between the camera and the computer.

If a user edits the clip associated with the media file while in the import state, the application transitions to state 1120 to modify the project data as required by the edit and display the edit in the GUI of the media-editing application. This edit might involve adding the clip to the timeline so that the clip is part of a user-created composite presentation (also referred to as a project). The user could also edit the clip in the timeline (e.g., by trimming the clip, moving the clip, etc.), could open the clip in the timeline to directly edit the clip without adding the clip to a project, or perform other edits. The media-editing application modifies the appropriate data to record the edit in project data. For instance, if the clip is added to a presentation, the data associated with the presentation is modified to include a reference to the clip and information indicating where in the presentation the clip is located.

If, after performing the edit, the file is still importing, the media-editing application returns to state 1115. Once the file copy operation is completed, the application transitions to state 1125 to modify the asset data structure so that, instead of referencing the clip on the camera, the data structure refers to the newly created file in the application folder. At this point, the media-editing application transitions to state 1130 and begins performing any required transcoding and analysis on the imported file. The efficient parallel processing utilized by some embodiments to perform these operations is described in the above section.

The transcoding and analysis may be a time-intensive process as well, depending on the size of the media file (i.e., how many images have to be analyzed and how large the images are) and the processing capabilities of the device performing the operations (e.g., the processing speed and number of processors).

While the application is at state 1130, analyzing the media file, the media clip representing the file may be edited, in the same manner as when the application is at state 1115. That is, the user can add the clip to a project in the timeline, modify the clip in the timeline, edit the clip directly, etc. As before, when the application receives an edit, the application transitions to state 1120 to modify the project data as required by the edit and display the edit in the GUI of the media-editing application. In some embodiments, the analysis and transcoding tasks are performed in the background, and paused while the user interacts with the application, then resumed after the edit is complete. This enables the device running the application to devote its processing power to the user interactions rather than the analysis, and then go back to the analysis when the processing power is not needed. If the analysis is not complete when the edit is finished, the media-editing application transitions back to state 1130 to continue performing the operations.

Once the analysis and transcoding is complete, the media-editing application transitions back to 1105 to continue waiting. As shown, edits may be received from this state as well, in which case the application transitions to state 1120 to perform the edit, then returns to 1105. As mentioned above, while in the wait state 1105, the media-editing application may be importing additional files, analyzing those files, and receiving edits to those clips, other clips, etc.

D. File Folder Structure of the Media-Editing Application

In some embodiments, importing a media file entails copying the media file to a particular storage as well as generating transcoded versions of the media file and analysis data. The media-editing application of some embodiments stores the set of related files for each media file imported into the application in an organized fashion in the file folder (i.e., directory) structure of one or more storage devices. The storage devices may be physical devices such as an internal or external hard drive, or virtual devices such as a hard drive partition.

Figure 12:
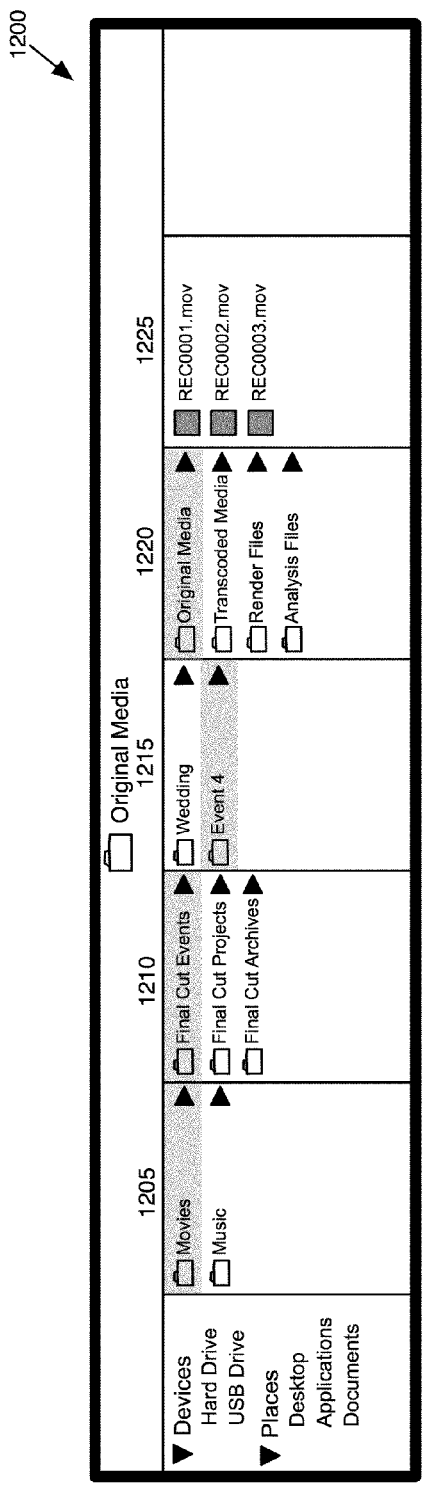

The following FIGS. 12-19 illustrate one example folder structure, as shown through a file navigation GUI 1200. One of ordinary skill will understand that this is simply one example of a folder structure generated by a media-editing application of some embodiments, and that other embodiments may generate different folder structures to serve similar purposes. As shown in FIG. 12, the GUI 1200 includes a list of devices and places at the left side. The devices currently accessible include a hard drive and a USB drive. In this case, the hard drive is the boot disk for the device on which the application operates, and is the drive on which the file folders shown in file navigation GUI 1200 are stored.

As shown, the highest level of file folders shown, in column 1205, includes a "Movies" folder and a "Music" folder. In some embodiments, when stored on a boot disk of the device on which the media-editing application operates, these folders are located in the file storage associated with a particular user that is logged into the device. That is, some embodiments create a folder for each user of the device that is accessible by that user. The folder for a particular user may include a "Movies" and "Music" folder as shown in these figures.

The "Movies" folder is currently selected. The "Movies" folder includes three folders (shown in Column 1210): a "Final Cut Events" folder, "Final Cut Projects" folder, and "Final Cut Archives" folder. When stored on a non-boot disk (which may not include a "Movies" folder, some embodiments store the events, projects, and archives folders at the root of the drive. In some embodiments, the projects folder stores data about projects (e.g., composite presentations) created by a user with the media-editing application. The archives folder stores camera archives in some embodiments, which are described below in subsection F of this section.

The events folder, which is currently selected, includes a folder for each event that the user (or users) has created (shown in column 1215). As described above, an event in some embodiments is a collection of media assets. The assets may be grouped into events based on when the media files are imported (i.e., clips imported together grouped into the same event) as well as other criteria such as user decisions to create an event and place clips in the event. The two events created at this point are "Wedding" and "Event 4". In many editing situations (e.g., the creation of a feature film), a user will have created dozens, or even hundreds, of events, each of which receives its own folder.

In the situation illustrated in FIGS. 12-19, the "Event 4" folder is selected in column 1215. The selected event folder includes four sub-folders, shown in column 1220 of the GUI 1200. These folders are "Original Media", "Transcoded Media", "Render Files", and "Analysis Files". In addition, some embodiments include a data file in the folder for each event that describes the event. This may be a CoreData (SQLite) database file, an eXtensible Markup Language (XML) file, or other file format that is readable by the media-editing application to parse the data structures (e.g., objects) that define the event and its assets. In some embodiments, the original media folder stores copies of the original imported files for an event, in their original format. This folder is currently selected in FIG. 12, and includes three ".mov" files (i.e., QuickTime files), shown in column 1225. These are original recorded versions of movies that the media-editing application imported into the "Event 4" event.

Figure 13:
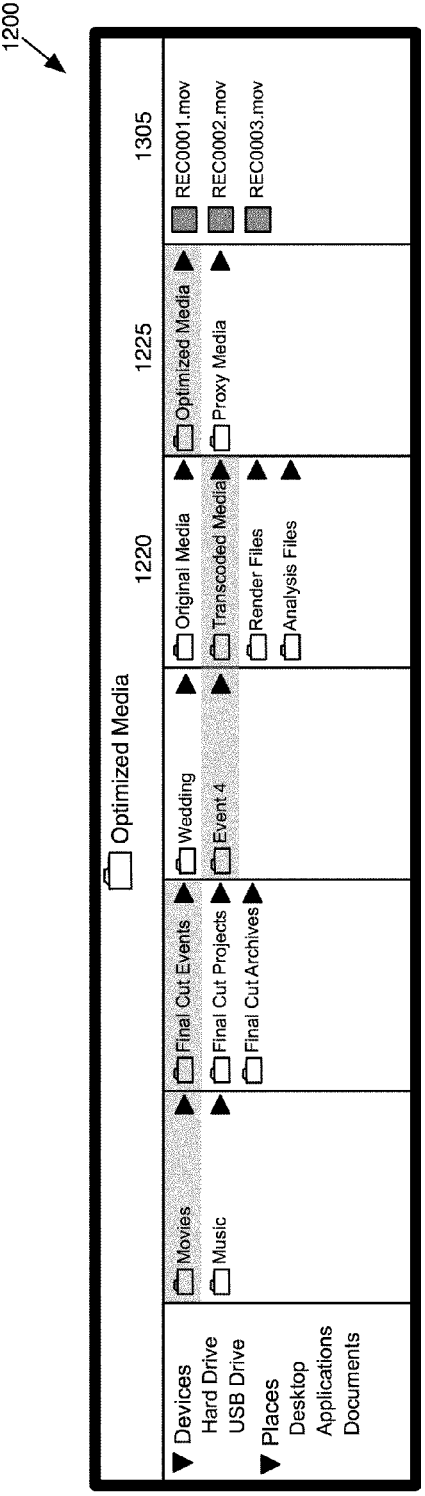
Figures 14, 15:
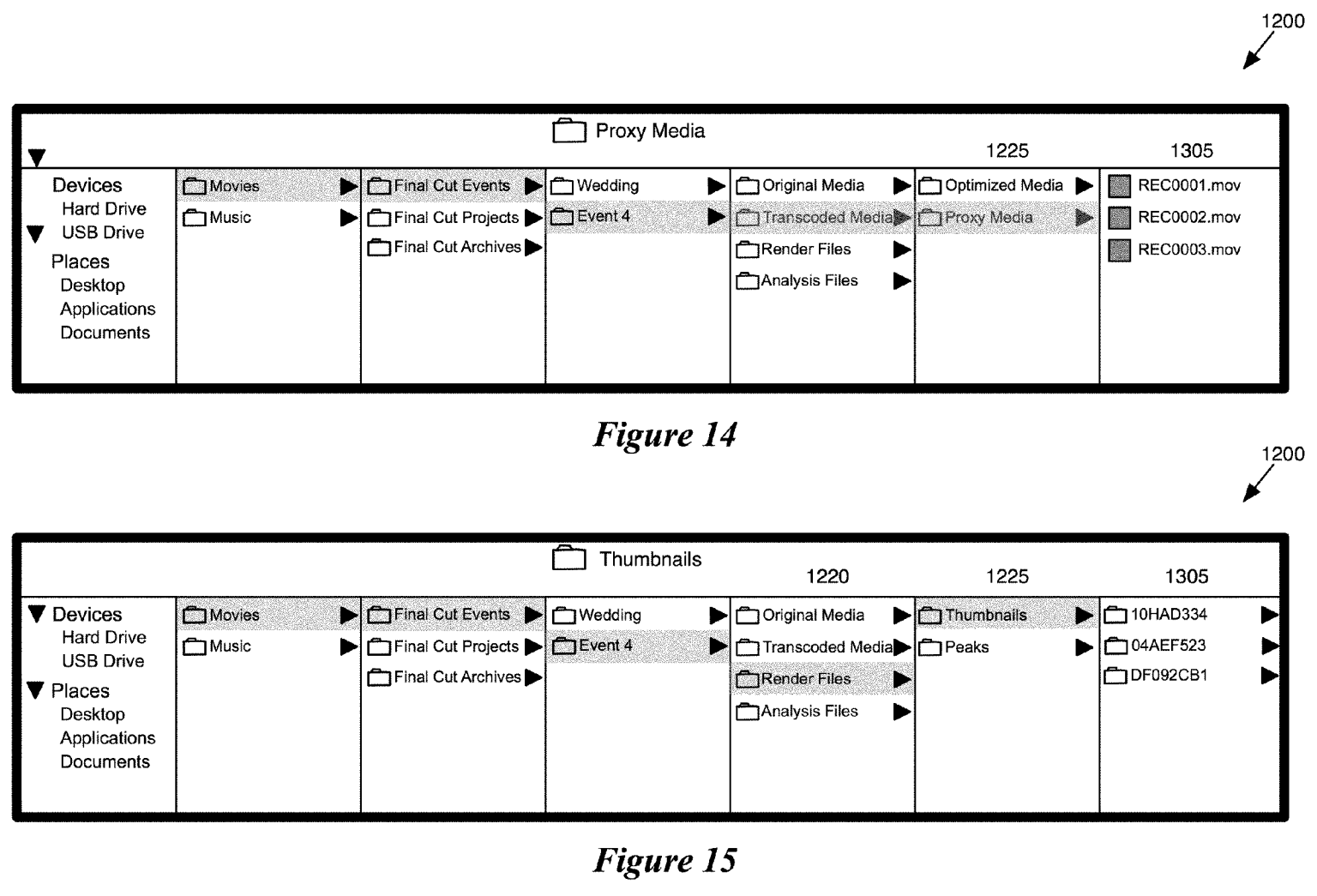

In FIG. 13, the transcoded media folder is selected in column 1220. In this case, the user has opted to have the application generate both high-resolution (optimized) and low-resolution (proxy) versions of the media files in the event, and thus column 1225 includes an "Optimized Media" and a "Proxy Media" folder. Some embodiments only create a folder for a particular type of file when at least one such file is being generated. That is, if there is no proxy media for a particular event, then the application does not create a proxy folder for that event (and if there is also no optimized media, the transcoded media folder is not created). The optimized media folder is selected, and thus three ".mov" files stored in this folder are displayed in column 1305. In some embodiments, the transcoded files have the same file name as the original media files, as in this case. This allows an asset to reference all of the files with this particular name, differentiating between different files based on the folder in which the file is located. FIG. 13 illustrates the three high-resolution transcoded files that correspond to the original media files shown in FIG. 12. In FIG. 14, the proxy media folder is selected in column 1225. As such, the figure illustrates the three low-resolution transcoded files that correspond to the original media files shown in FIG. 12. As with the high-resolution transcoded files, these files have the same file names as the original media.

In FIG. 15, the user has selected the render files folder in column 1220. In some embodiments, the media-editing application uses such a folder to store data used for displaying the media clips in the media browser or timeline of the application GUI. As shown, the render files that have currently been generated for "Event 4" include a "Thumbnails" folder and a "Peaks" folder (shown in column 1225). The thumbnails folder includes information for displaying the thumbnails in the representation of the media clip, while the peaks folder includes information for displaying the audio waveforms shown below the thumbnails in the clip representations.

Figure 16:
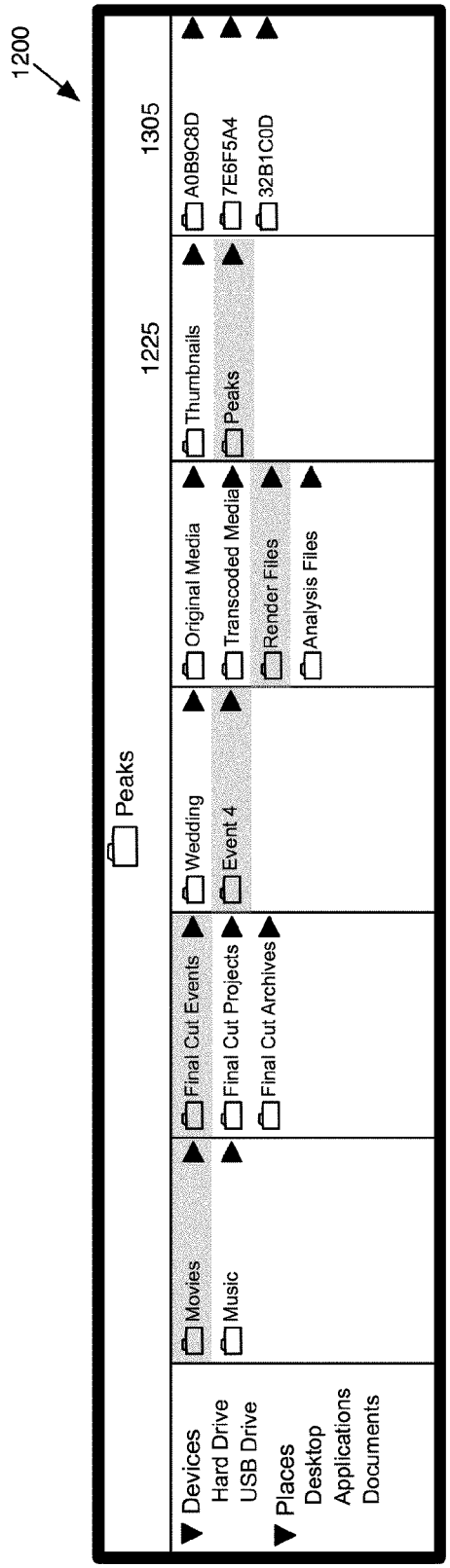

Unlike the transcode and analysis files, the render files folders do not inherit the file name of the original media files in some embodiments. Instead, a hash (e.g., MD5 hash) of various properties of the file is used to generate the folder names shown in column 1305, which are hexadecimal numbers. FIG. 16 shows the peaks folder selected in column 1225. Three different folders with three different hexadecimal names are now displayed in column 1305 of the file navigation GUI 1200. Some embodiments use different properties to generate the hash names for the folders for peaks as for thumbnails, so the folder names are different in FIG. 16 as compared to FIG. 15. The properties that are used to generate the hexadecimal folder names are various parameters about the underlying media. Some embodiments include all properties that affect the resultant render file (e.g., the thumbnail, waveform, etc.) and no properties that do not affect the resultant file, with the goal that if two render files are exactly the same then their file name should be exactly the same.

Figure 17:
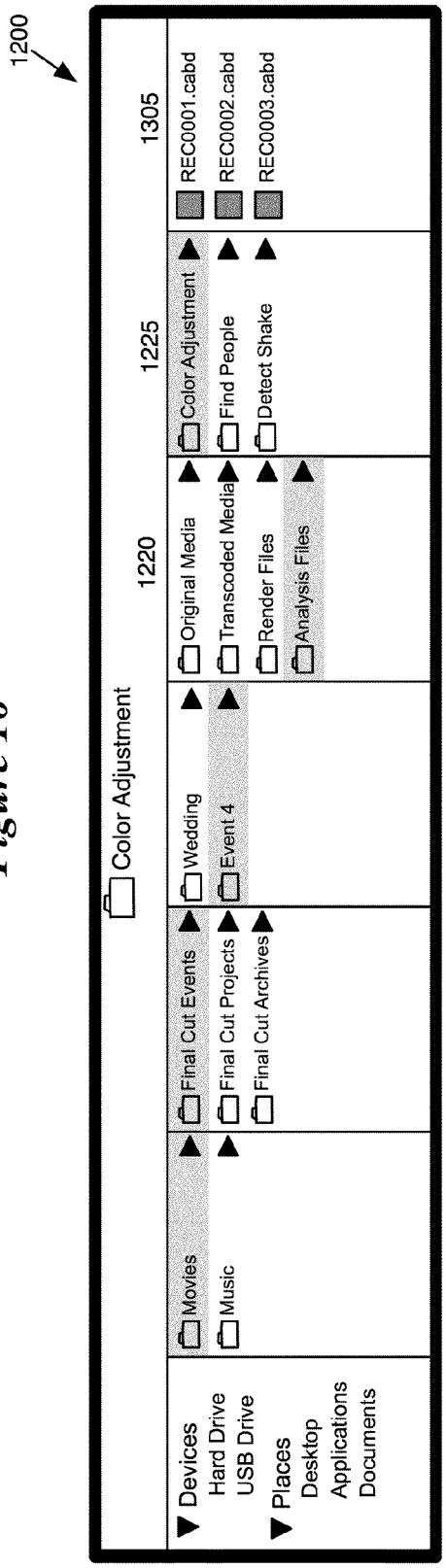
Figure 18:
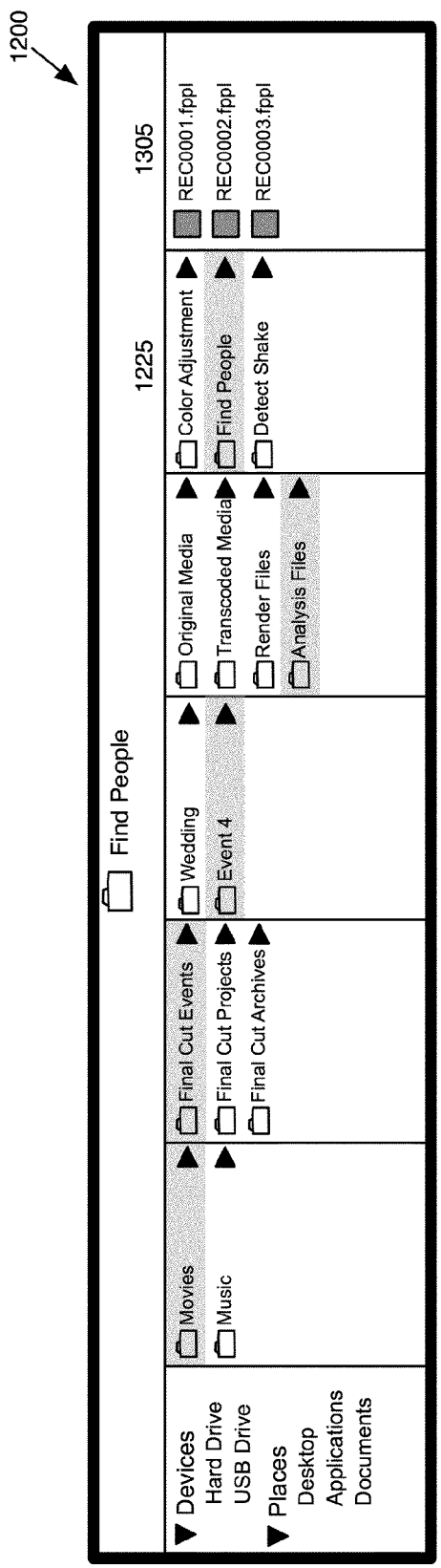
Figure 19:
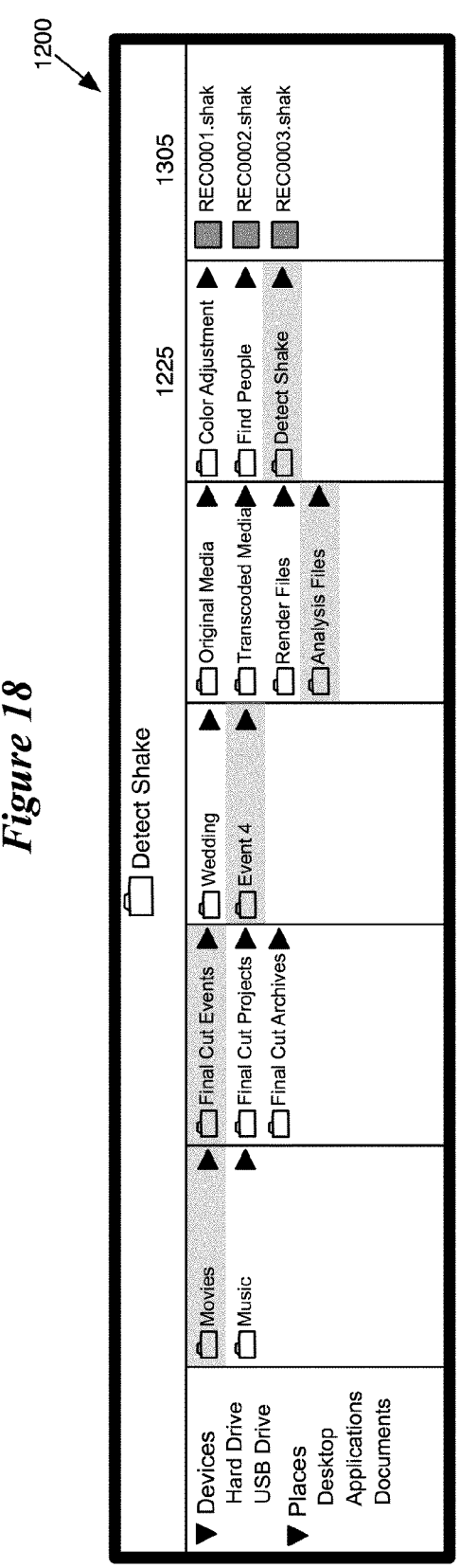

In FIG. 17, the user has selected the analysis files folder in column 1220. This causes any folders with analysis files to be displayed in column 1225 of the file navigation GUI 1200. In this case, the user has selected to balance color, find people, and detect shake in the media files of "Event 4". In FIG. 17, the color adjustment folder is selected in column 1225. In FIG. 18, the find people folder is selected in column 1225, and in FIG. 19, the detect shake folder is selected in column 1225. As these figures show, the files in each of these folders (color balance files, person detection files, and shake detection files, respectively) have the same file names as the original media, but with different file names. In some embodiments, each analysis file has its own file type, and stores the respective data in a format readable by the media-editing application.

One of ordinary skill will recognize that the file folder names, file types, and folder structure are only one example of a set of folders that could be created by the media-editing application of some embodiments. Other embodiments might use different file names, different folder names, or a different folder organization (e.g., having the folders for optimized and proxy media at the same level as the original media folder).

E. Data Structures of Media-Editing Application

As indicated above, the media-editing application of some embodiments creates an asset data structure (e.g., an asset object) for each imported media file imported by the application, and also creates a clip data structure (e.g., a clip object) for each asset that refers to the asset. When multiple related media files are imported (e.g., a video file and several audio files), some embodiments create an asset for each of these files and then a single clip that refers to the collection of related assets. The following sub-section will describe these data structures in further detail, as well as additional data structures used by the media-editing application.

Figure 20:
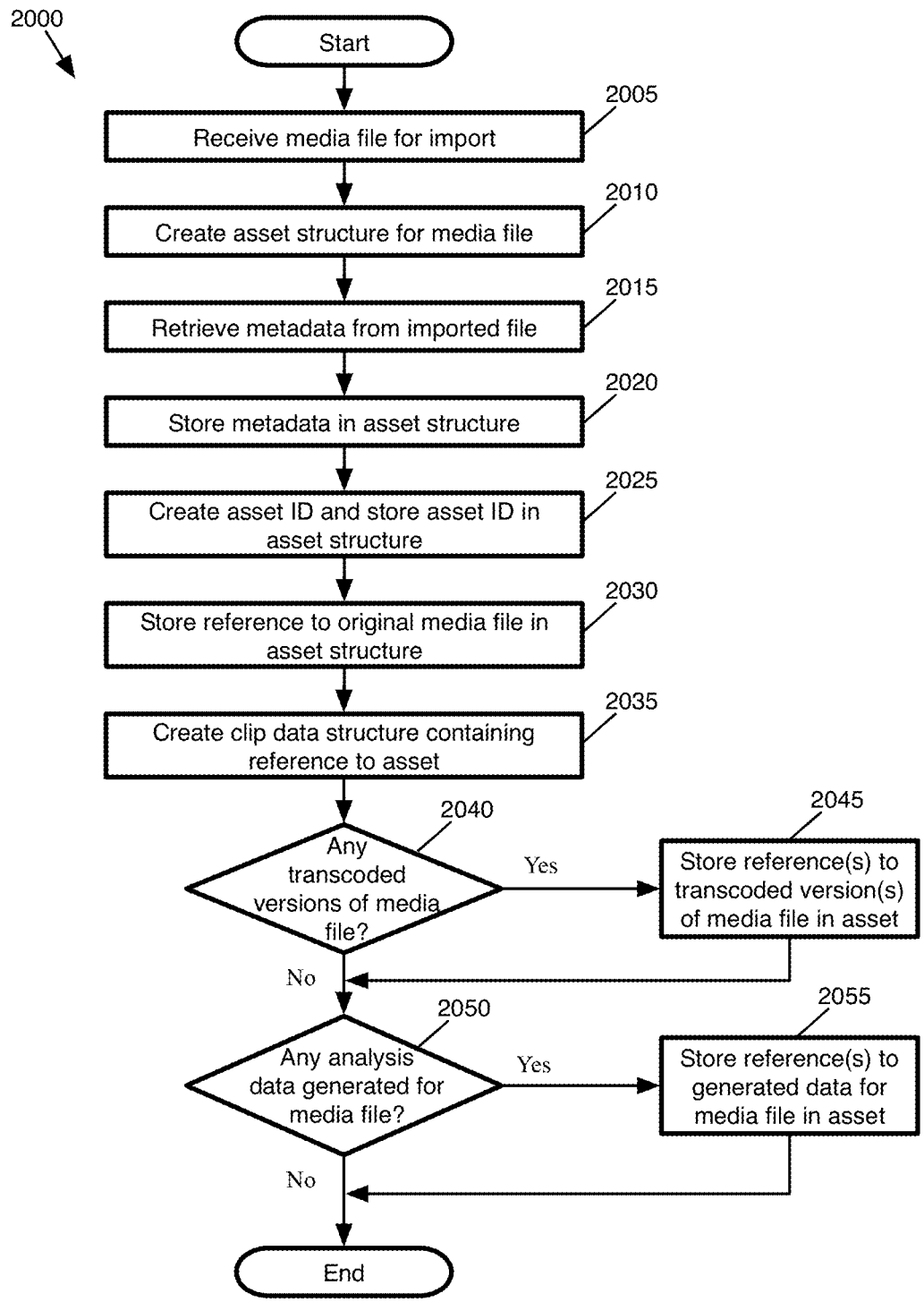
FIG. 20 conceptually illustrates a process of some embodiments for creating an asset data structure and a clip data structure referencing that asset.
Figure 21:
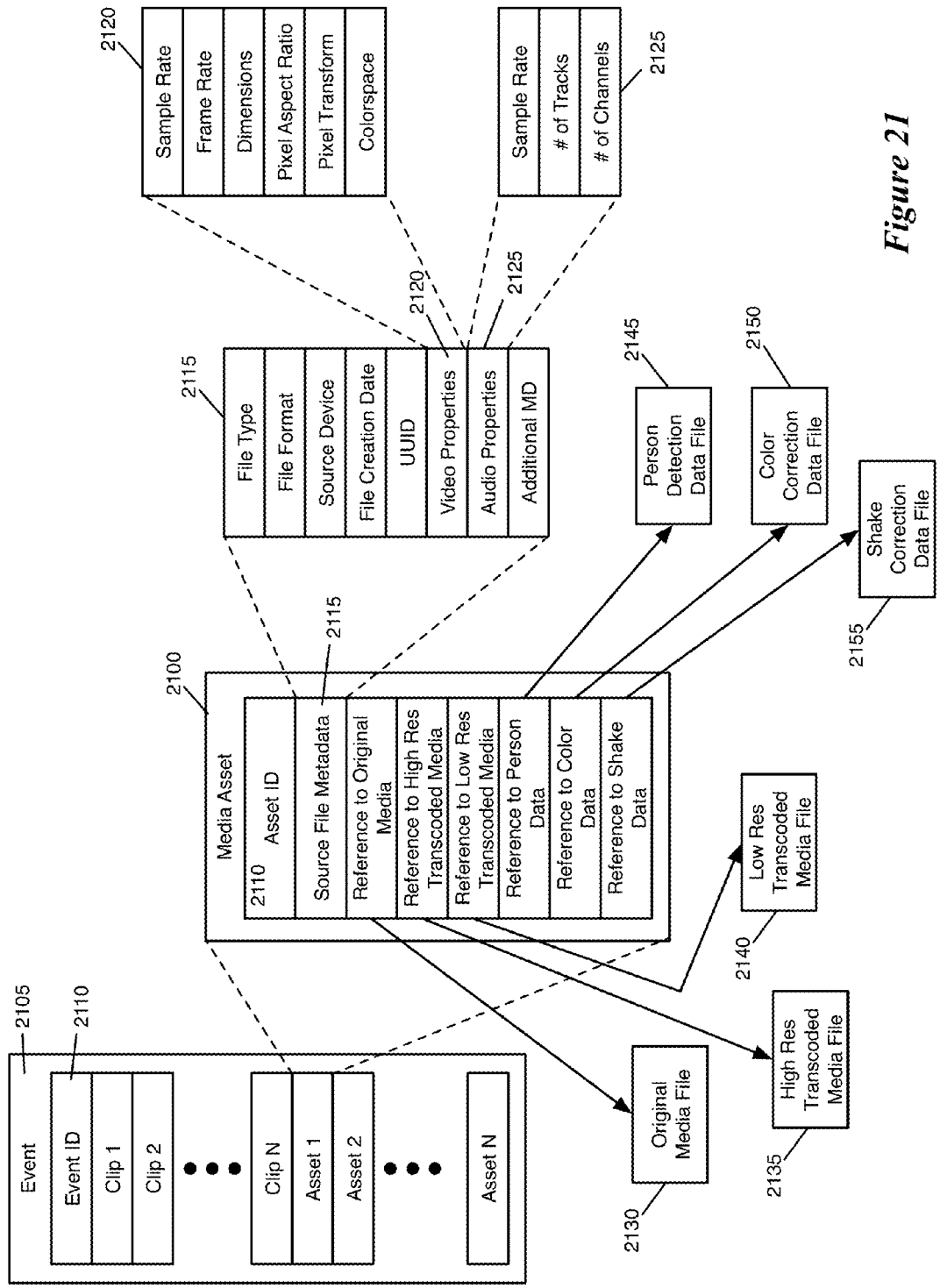
FIG. 21 conceptually illustrates an asset data structure for a video asset, as well as an event data structure for an event that contains the video asset.

FIG. 20 conceptually illustrates a process 2000 of some embodiments for creating an asset data structure and a clip data structure referencing that asset. In some embodiments, process 2000 is performed as part of the import process of the media-editing application. The process 2000 will be described in part by reference to FIG. 21. FIG. 21 conceptually illustrates an asset data structure 2100 for a video asset, as well as an event data structure 2105 for an event that contains the video asset.

As shown, the process begins by receiving (at 2005) a media file to import. The media file may be an audio file, a video file, or other type of media file. In the example shown in FIG. 21, the media file is a video file with audio channels (e.g., a ".mov" file).

Next, the process creates (at 2010) an asset data structure for the media file. At this point in the process, the asset data structure is an empty structure. Some embodiments define the data structure in a CoreData (SQLite) database file, an XML file (e.g., an XML file for an event), etc. As mentioned, FIG. 21 illustrates an asset data structure 2100 for the media asset. The asset data structure 2100 is fully populated, and this data will be described further below.

In some embodiments, the asset data structure is created within an event data structure. If the event data structure does not yet exist, then the media-editing application also creates this data structure to contain the asset. As shown in FIG. 21, the asset data structure 2100 is one asset within the event data structure 2105. The event data structure 2105 includes an event ID 2110, the list of assets, and a list of clips. The event data structure may include additional fields in some embodiments, such as the event name, event date (which may be derived from asset information), etc. The event data structure 2105 may be a CoreData (SQLite) database file that includes the assets and clips as objects defined with the file, an XML file that includes the assets and clips as objects defined with the file, etc.

The process next retrieves (at 2015) metadata from the imported file, and then stores (at 2020) this metadata in the asset structure. The metadata is information about the source file and its stored media in some embodiments. In some embodiments, this metadata is used to generate the asset ID, described below. The asset data structure 2100, as shown, includes source file metadata 2115. As shown, the source file metadata includes the file type (e.g., audio, video, movie, still image, etc.), the file format (e.g., ".mov", ".avi", etc.), the source device (i.e., the device that created the media, such as the particular type of camera on which a movie file was captured), the file creation date (e.g., the date a video was captured, rather than the date of import), a UUID (a unique identifier generated by a media creation device such as a camera), a set of video properties 2120, a set of audio properties 2125, and additional metadata. Different types (or manufacturers) of cameras create different UUIDs differently. These may be hashes of various data in some embodiments, such as a camera ID, record time (e.g., the time a user of the camera started recording, the duration of the video), etc., so long as all UUIDs are unique.

The video properties 2120 of some embodiments include such properties as a sample rate, a frame rate (i.e., the number of video images the video file contains per second, often 24, 25, or 30), the dimensions of the image (i.e., the number of pixels horizontally and number of rows of pixels), the pixel aspect ratio (i.e., the shape of the pixels, which may be square (HD video) or rectangular (e.g., NTSC video has a ratio of 10:11)), the pixel transform (described in detail below in Section V), and the colorspace in which pixel values of the image are defined (e.g., ITU-R BT.709 for HD, ITU-R BT.601 for SD, etc.). The audio properties 2125 of some embodiments include a sample rate (i.e., the number of audio samples per second, often 48 kHz), the number of audio tracks stored in the underlying media file, and the number of audio channels stored in the underlying media file. In some embodiments, the asset may additionally store override data that modifies one or more of the video or audio properties. For instance, a user might enter that a media file is actually 1080p, even though the file's metadata, stored in the asset, indicates that the video is 1080i. When presented to the user, or used within the application, the override will be used and the media file will be treated as 1080p.

Returning to FIG. 20, the process 2000 then creates (at 2025) an asset ID and stores the asset ID in the asset structure. The asset ID, in some embodiments, is a function of various properties of the underlying media file. For instance, some embodiments generate the asset ID as a hash of properties such as a file identifier, video properties, audio properties, and media range. The creation of the asset ID will be described in further detail by reference to FIG. 22. As shown in FIG. 21, the asset ID 2110 is stored in the video asset 2100.

With the asset created, the process 2000 then begins populating the asset with references to various data. The process stores (at 2030) a reference to the original media file in the asset structure. As described above by reference to FIG. 11, this reference initially refers to the media file on the device from which the application is importing the file (e.g., the camera), and then once the file is copied to the application's folder structure, the reference is modified to refer to the copied media file.

Next, the process 2000 creates (at 2035) a clip data structure containing a reference to the asset. In some embodiments, a clip is created for each asset. As will be described below, clip data structures (e.g., clip objects) can also contain other clips, and some embodiments use the same data structure for single asset clips, compound clips containing multiple assets and/or nested clips, and project sequences. The clip data structure, like the asset, is contained in the event data structure in some embodiments. Some embodiments create a series of nested clip objects for an imported clip, as described in further detail below. The lowest clip object in the nested hierarchy references the asset.

Next, the process determines (at 2040) whether any transcoded versions of the media are generated by the media-editing application. As described in subsections A and B above, some embodiments generate one or more transcoded versions of imported media files in formats that are better suited for editing. This may be an automatic process based on the imported file properties, or based on user selection of whether to transcode the media. When one or more transcoded versions of the media are created, the process stores (at 2045) references to any such transcoded versions of the media file in the asset data structure.

The process also determines (at 2050) whether any analysis data is generated for the media by the media-editing application. As described above, some embodiments generate data about the video and/or audio data of a media file. This data may be generated automatically or based on user selection of particular analysis operations. When one or more analysis data files are created, the process stores (at 2055) references to any such analysis data files in the asset data structures. The process 2000 then ends.

The media asset 2100 of FIG. 21 includes references to three versions of the underlying media file: a copy of the original media file 2130, a high-resolution transcoded media file 2135 (e.g., a ProRes 422 file), and a low-resolution transcoded media file 2140 (e.g., a ProRes Proxy file). In addition, the media asset includes references to a person detection file 2145, a color correction data file 2150, and a shake correction data file 2155. These data files are described in further detail in the subsections above. In some embodiments, the references stored in the asset data structures are pointers to the locations of the video on a physical storage device (e.g., the boot disk of the device on which the media-editing application operates). In the case of media asset 2100, the underlying file stores both audio and video. In some media formats, different files are used to store video and audio for a single shot (and there may be multiple audio files recorded by different audio recorders in some cases). In this case, some embodiments create separate assets for each file. In some embodiments, each media file gets its own asset data structure.

Figure 22:
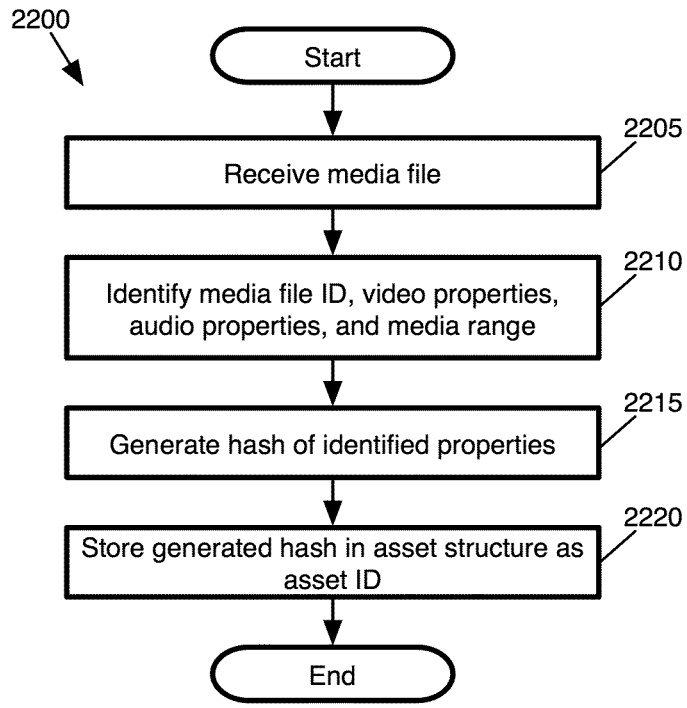
FIG. 22 conceptually illustrates a process of some embodiments for generating an asset ID and storing the ID in the data structure.

As mentioned in the discussion of FIG. 21, the asset ID for a particular asset may be generated using various properties of the asset's underlying media file. FIG. 22 conceptually illustrates a process 2200 of some embodiments for generating the asset ID and storing the ID in the data structure. In some embodiments, process 2200 is performed at operation 2025 of process 2000.

As shown, the process 2200 begins (at 2205) by receiving a media file (e.g., a video file, audio file, movie file, etc.). The process then identifies (at 2210) the media file ID, video properties, audio properties, and media range of the media file. As shown in FIG. 21, these may be stored as metadata of the source media file. The media file ID, in some embodiments, is a UUID generated by a camera that shot the media file, as described above. In some cases, the file may not have a UUID (e.g., if the device that captured the file does not generate UUIDs), and some embodiments will instead use the file name. The video properties used in some embodiments are the dimensions, colorspace, field dominance, sample duration, frame duration, pixel transform, and pixel aspect ratio, though different video properties may be used in different embodiments. The sample duration may be different from frame duration if, for example, the video is field rendered, in which case the frame duration is twice the sample duration. The frame duration, in some embodiments, is the inverse of the frame rate (e.g., if the frame rate is 30 fps, then the frame duration is 1/30 of a second). The audio properties used in some embodiments are the number of tracks, number of channels, and sample rate (i.e., the same as shown in audio properties 2125). Some embodiments include additional properties, such as the file creation date (i.e., the date and/or time at which the media was captured (e.g., filmed, photographed, recorded, etc.)).

The media range indicates the range of the original media file referenced by the particular asset. Some embodiments use timecode values of the media file to define the media range. Thus, if a file is split apart (e.g., a user might take a thirty minute video and split it into a twelve minute video, a seven minute video, and an eleven minute video, as well as retain the original), the different timecodes will differentiate the assets. The media range can also be used if one of the assets goes missing, as an asset with identical properties and a range including the media range of the missing assets can be used to restore the missing asset.

The process then generates (at 2215) a hash of the identified properties of the media file. Different embodiments use different hash algorithms (e.g., MD5, etc.). The process then stores (at 2220) this generated hash in the asset structure as the asset ID. While the process 2200 describes one method of computing an asset ID, one of ordinary skill will recognize that asset IDs can be computed using many different properties and many different computation algorithms.

Figure 23:
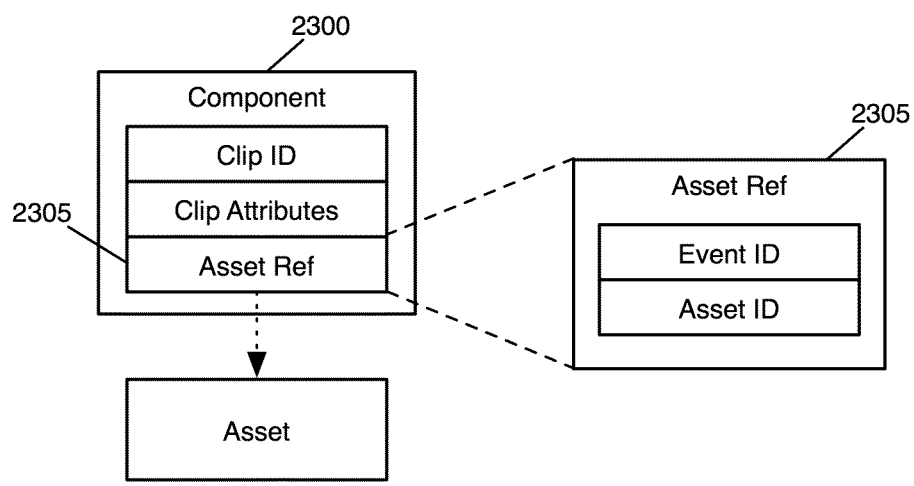
FIG. 23 illustrates a component clip data structure of some embodiments that references an asset.

As mentioned by reference to FIG. 20, some embodiments use a clip structure that references one or more assets when importing a media file. FIG. 23 illustrates a component clip data structure 2300 of some embodiments that references an asset. In some embodiments, the component clip 2300 is the lowest level of a set of nested clip objects, which are all members of the same class. The details of clip objects of some embodiments will be described below by reference to FIG. 24.

The component clip 2300 includes a clip ID, clip attributes (described in more detail below), and an asset reference 2305. The asset reference 2305 of some embodiments stores an event ID and an asset ID, and uniquely identifies a particular asset data structure, as indicated by the dashed arrow referring to an asset. The arrow is shown as dashed because the asset reference is not a direct reference to the asset, but rather is used to locate the asset when needed. When the media-editing application of some embodiments needs to identify a particular asset, the application uses the event ID to locate the event that contains the asset, and then the asset ID to locate the particular desired asset.

Figure 24:
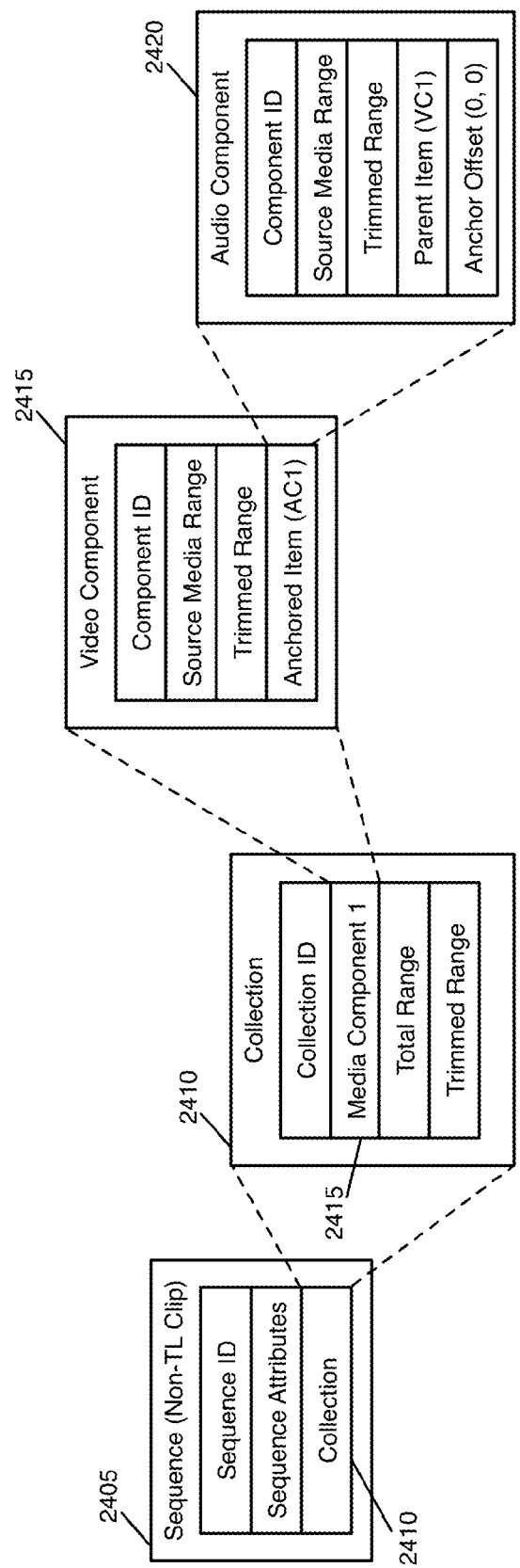
FIG. 24 conceptually illustrates a nested sequence of clip objects created by the media-editing application of some embodiments for an imported media file.

FIG. 24 conceptually illustrates a nested sequence of clip objects created by the media-editing application of some embodiments for an imported media file. In some embodiments, each of the clip objects shown in this figure is a member of the same class, though the object may be of different sub-classes. The media file whose clip structure is illustrated in FIG. 24 is a movie file that stores both audio and video information.

The figure illustrates a sequence 2405, a collection 2410, and two components 2415 and 2420. As mentioned, these three types of objects are all subclasses of clip objects (or anchored objects) in some embodiments. Some embodiments create a sequence within an event object for each imported media clip. The sequence 2405 stores a sequence ID, a set of sequence attributes, and the collection object 2410. The sequence ID is a unique identifier for the sequence object. The sequence attributes, in some embodiments, include video properties for the sequence, such as the resolution, frame rate, etc. The attributes may be set by a user in some embodiments, or set automatically based on the underlying media.

The collection object 2410 is an ordered array of clip objects. In the case of a clip imported into an event, as is the case with object 2410, the collection stores one or more component clips in the array. Often, the collection only stores the video component clip in the array, as shown here; any additional components (generally one or more audio components) are then anchored to that video component. In addition, the collection object 2410 stores a collection ID, a total range, and a trimmed range. The collection ID is a unique identifier for the collection object. The total range of a clip object indicates the maximum range for the object based on the objects it contains, while the trimmed range indicates the actual range of the object in its parent object according to user edits. In some embodiments, the collection object stores a value for the total range because the total range is a variable assigned to all types of clip objects, but this range is not actually used by the application. Instead, the application dynamically calculates the total range based on the objects contained by the collection (as opposed to updating the range value every time a clip is added to the collection). Some embodiments, on the other hand, do update the total range in the collection object. These ranges will be described in further detail below by reference to FIG. 25. The array of the collection object includes two media components 2415 and 2420. Collection objects, in some embodiments, can include component clip objects as well additional collections.

In the above paragraph and elsewhere in this section, a first object (e.g., the collection object 2410) is described as containing a second object (e.g., media component 2415 in the collection object's array). In some embodiments, a first object contains a second object by storing a reference to the object (e.g., a pointer). This reference is a strong pointer in some embodiments.

The media components shown include a video component 2415 and an audio component 2420. These are the same data structures as the component clip 2300, in some embodiments, and thus store the clip attributes and the asset reference shown in that figure. Each of the components stores a component ID (i.e., the clip ID of FIG. 23), a source media range (i.e., total range) and a trimmed range. For a component clip that refers to a media asset, the total range is the duration of the source media. The trimmed range is the range selected by a user through various user edits (e.g., trim edits) and indicates both the start time within the total range and the duration, in some embodiments. The trimmed range is generally a subset of the total range (i.e., does include time outside the total range). However, in some embodiments, the application may use a range extender to extend the trimmed range past the total range (e.g., when needed for part of a transition, or if aligned audio runs slightly longer than video). Some embodiments will generate video images using, e.g., the first and last images of the video file, to fill in the needed extra range. When a clip is initially imported into the application, the total range and trimmed range will generally be equal as the user will not have edited the clip at all yet.

The video component 2415 includes an anchored item set that contains the audio component 2420. As described above by reference to the timeline 315 in the user interface 300 of FIG. 3, clips can be anchored to other clips in some embodiments. When a particular clip is moved in a timeline, any clips anchored to the particular clip are moved along with it. Each clip can have numerous clips anchored to it, and can be anchored to a single clip. In the case of a media clip with audio and video components, some embodiments anchor the audio component to the video component. Thus the video component object 2415 contains the audio component in its set of anchored items (and could include numerous such items if there were additional audio components), while the audio component object 2420 includes a parent item reference to the video component to which it is anchored. In addition, the child (anchored) object stores an anchor offset that indicates two values. The first value is the position in the parent object to which the child object is anchored, and the second value is the offset within the child object of the anchor. In the case of an imported media file, the audio and video components will start at the same time, and thus both anchor offset values are zero. However, this can be modified if, for example, there is a slight offset in the recordings of the two components and the user has to adjust the audio relative to the video.

Figure 25:
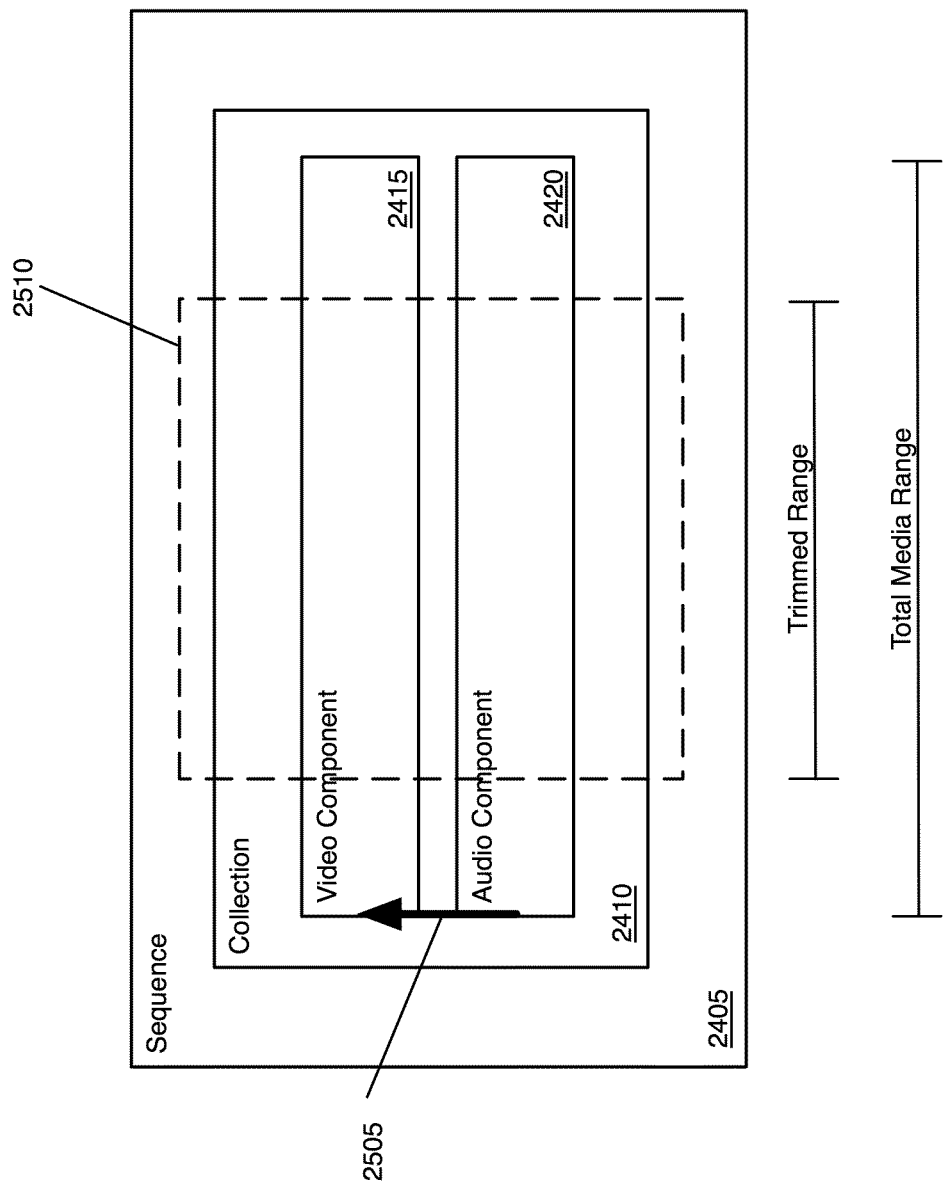
FIG. 25 conceptually illustrates the objects of FIG. 24 nested in a conceptual timeline.

FIG. 25 conceptually illustrates the objects 2405-2420 nested in a conceptual timeline. The figure shows video and audio components 2415 and 2420 inside the collection 2410, which is nested inside the sequence 2405. The audio component 2420 is anchored to the video component 2415; specifically, as shown by the thick arrow 2505, the start of the audio component is anchored to the start of the video component.

The figure also includes a dashed box 2510 that illustrates that a user has trimmed the clips so that portions at the beginning and end of the clip are not part of the sequence were it to be rendered. Thus, the total media range of the components is the full length of the media to which they refer, whereas the trimmed range is a subset of this range based on the user edits. In some embodiments, all clip objects store a total range and trimmed range. The collection 2410, in this case, will have the same total range and trimmed range as the components. However, if the components were offset, or if the collection included additional objects, it would have larger trimmed and total ranges. For sequence objects, the total range and trimmed ranges are always equal in some embodiments. In the illustrated case, the sequence 2405 has a range equal to the trimmed range of the collection 2410. As the user edits the objects in the sequence, both the trimmed and total range of the sequence change.

Figure 26:
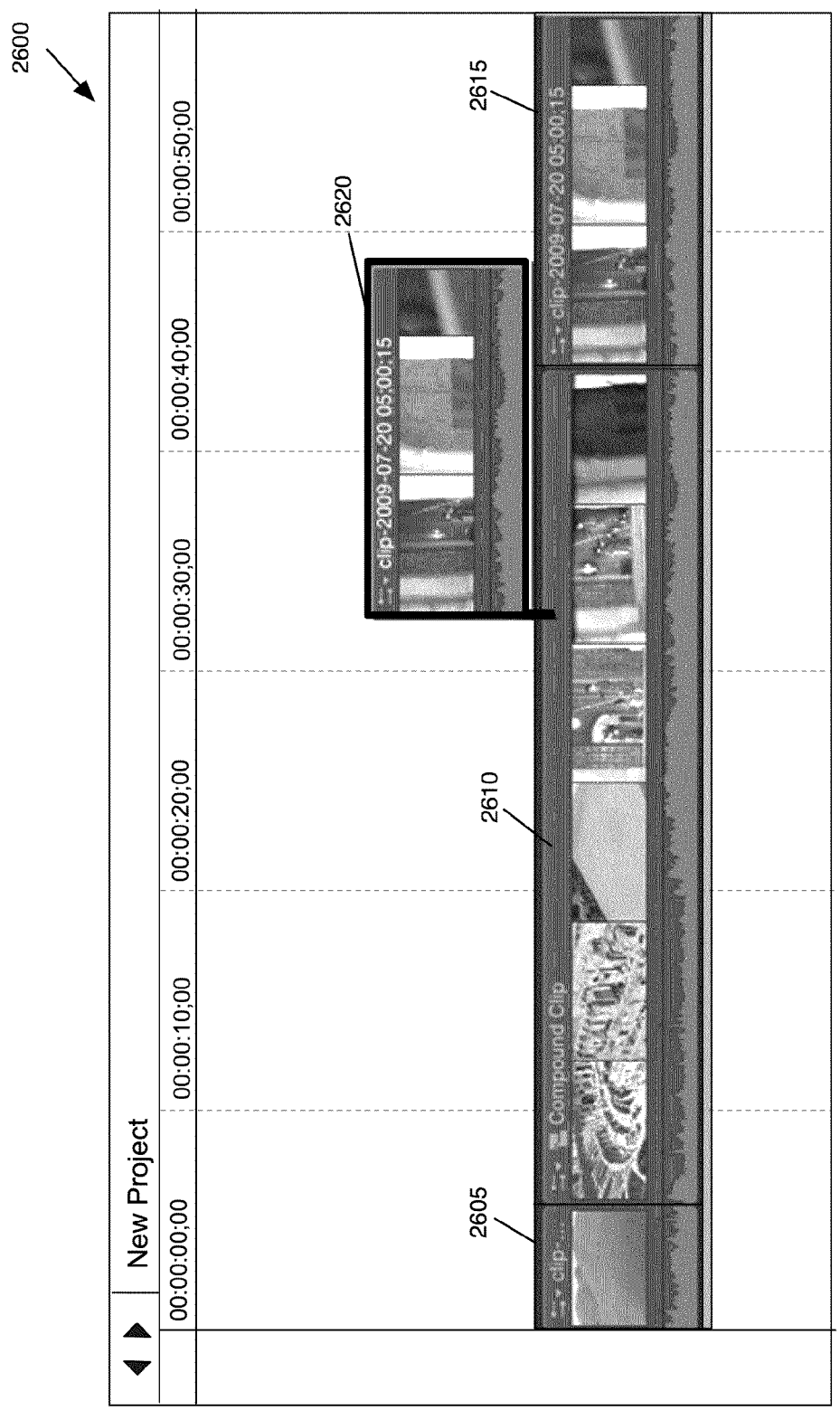
FIG. 26 illustrates a timeline that includes four clips.

FIG. 26 illustrates a timeline 2600 with a project title "New Project" that includes four clips 2605-2620. The clips 2605-2615 are in the primary compositing lane of the project's sequence, while the clip 2620 is anchored to clip 2610 at approximately 26 seconds into clip 2610. The clip 2610 is a compound clip that itself includes two clips.

Figure 27:
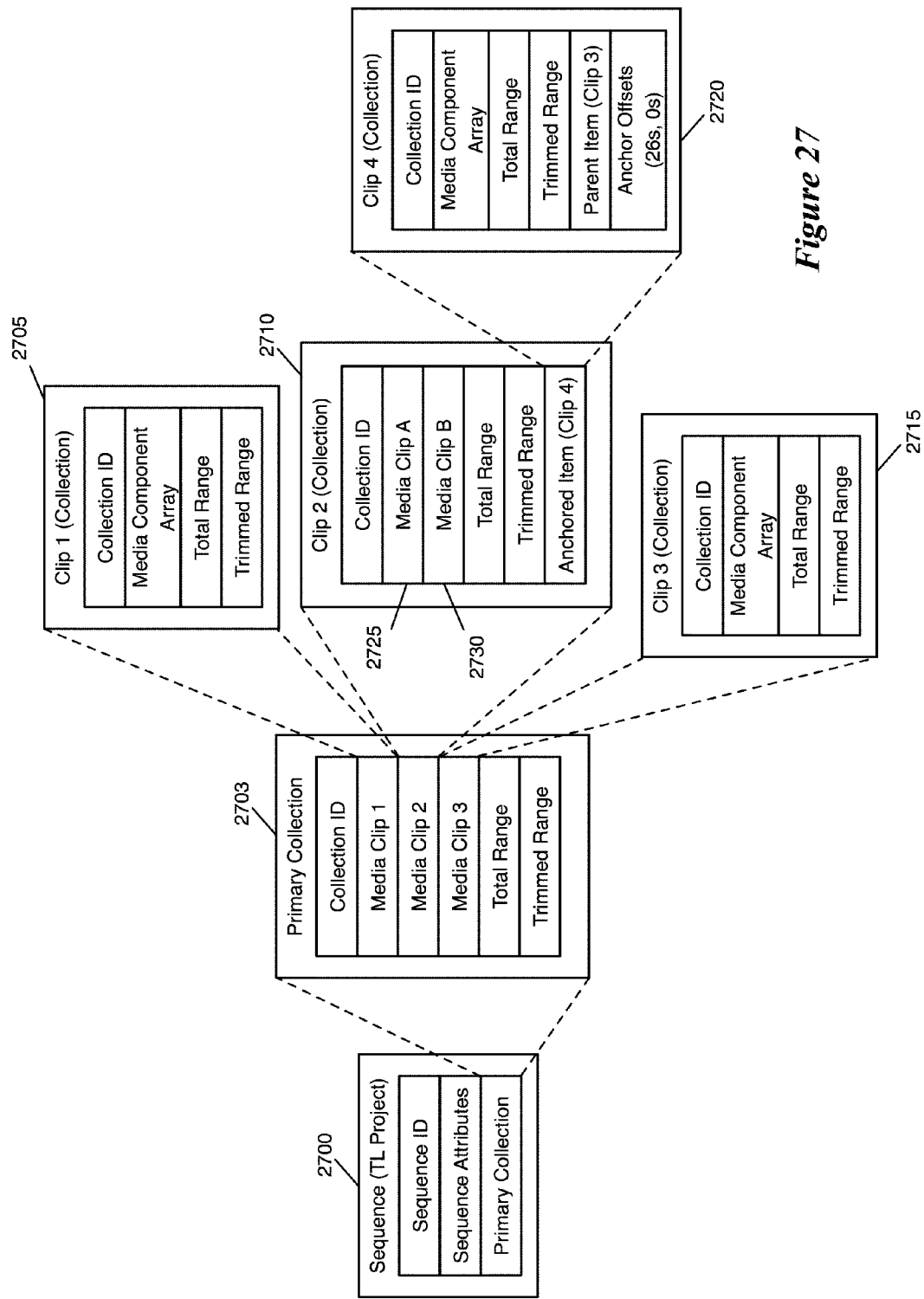
FIG. 27 conceptually illustrates a subset of the data structures for the sequence illustrated in FIG. 26.

FIG. 27 conceptually illustrates a subset of the data structures for the sequence illustrated in FIG. 26. In some embodiments, the data structures of FIG. 27 are all contained within a project data structure that contains a single sequence. In some embodiments, the project data structure for a project in the timeline is a sub-class of a class that also includes event data structures. Unlike the project data structures, the event data structures can contain multiple sequences, and in fact contain a sequence (such as sequence 2505) for each clip in the event.

FIG. 27 illustrates a sequence 2700 that includes a primary collection data structure 2703, which itself is an array of three collections 2705-2715 that correspond to the clips 2605-2615. In addition, the fourth clip 2620 is stored as a data structure within the collection 2710. For simplicity, the component objects are not shown in this figure. The sequence 2700 includes a sequence ID, sequence attributes, and the primary collection 2703. The sequence attributes for a project in the timeline are set by a user when creating the project, in some embodiments.

The primary collection 2703 includes the collection ID, total and trimmed range, and the array of media clips. In some embodiments, the array is ordered based on the location in the timeline and only includes media clips in the primary lane of the collection. The application assumes that there is no gap between these items, and thus no timing data is needed between the items. As shown, each of these clips is represented as a collection. When a clip stored in an event (e.g., the clip shown in FIG. 24) is added to a project in a timeline, some embodiments remove the sequence container data structure (e.g., structure 2405) and copy the rest of the structure (i.e., the collection and its components) into the data structure for the object in the timeline.

Clips 2705, 2715, and 2720 are individual clips that have been added to the timeline from the clip browser, and thus do not themselves include collections. Similar to the collection 2410, these objects include an ID, total and trimmed ranges, and an array of media components (e.g., a video component and one or more audio components).

The clip 2710 is a compound clip and therefore includes multiple clips in addition to the collection ID and ranges. Specifically, the clip 2710 includes two media clips 2725 and 2730. Within the collection, the clips are both in the primary lane of the collection, and thus one follows the next. These clip objects are not shown in this figure, but each of the clips is similar to clip 2705 in that the clips include an array of media components. In addition, the clip object 2710 includes a set of anchored items (in this case only the one item, clip 2720). Some embodiments include a set of anchored items for each collection, which are empty for the other objects shown in this figure. The anchor offset stored in clip 2720 indicates that it is anchored 26 seconds into clip 2, and that the anchor is at the start of clip 2720. These times refer to the trimmed ranges of the clips in some embodiments.

Figure 28:
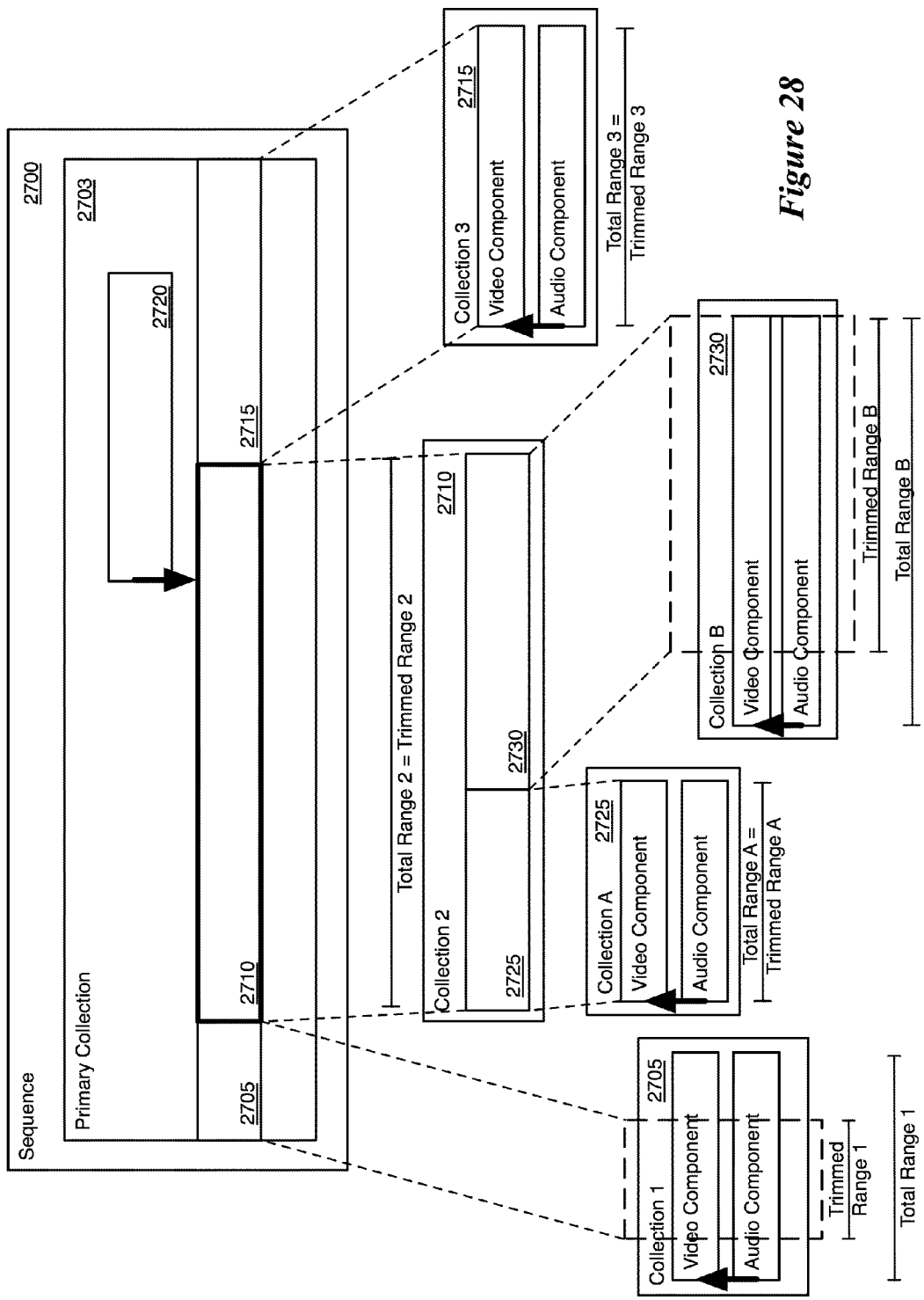
FIG. 28 conceptually illustrates the objects of FIG. 27 nested in a conceptual timeline.

FIG. 28 conceptually illustrates the objects 2700-2730 nested in a conceptual timeline. As shown, collection objects 2725 and 2730 are nested inside the collection 2710, which is nested inside the primary collection object 2703 along with the collection objects 2705, 2715, and 2720. The collection object 2703 is itself nested inside a sequence object.

The figure illustrates the anchoring relationships between the various clips as well as the durations (ranges) of the clips. As with the clip objects shown in FIG. 25, each of the lowest level collections 2705, 2715, 2725, and 2730 each have an audio component anchored to a video component. While not shown, collection 2720 could also have the same video/audio setup, or could be just a video component (or just an audio component). While each of the objects shown has a single audio component, one of ordinary skill will recognize that some embodiments will have multiple audio components (e.g., if a camera records several audio tracks as separate files and imports the files with a video file as part of a single clip).

The figure also illustrates the anchoring of clip 2720 to clip 2710. In some cases, multiple clips will be anchored to the same primary lane clip, and the multiple anchored clips may overlap in time. In this case, multiple secondary lanes may be used. Some embodiments assign lane numbers to each clip object that indicates the clip object's lane within a collection.

All of the primary lane objects are assigned a lane number of zero in some embodiments, with lanes above the primary lane getting increasing numbers and lanes below the primary lane getting decreasing (negative) numbers. For instance, a separate audio clip might be anchored to a clip in the primary lane and displayed below the primary lane. In this case, within the primary collection 2703, the anchored clip 2720 has a lane number of 1. The lane numbers indicate compositing order for video in some embodiments. Whereas two audio files can be combined fairly easily (mixed), two video files cannot be displayed at the same time. Thus, some embodiments composite higher lane number clips on top of lower lane number clips. If no compositing effect is defined between two clips at the same time, then the clip in the higher lane will be displayed. However, various compositing modes and effects may be used to combine the pictures (e.g., compositing modes such as subtract, darken, multiply, etc. that combine pixel information of two images, as well as effects such as scaling the top image to get a picture-in-picture, applying a color mask to the top image, etc.).

The items in a lower-level nested collection will also have lane numbers that refer to their lane order within that collection. For example, the collection object 2710 has two clips 2725 and 2730, that each have a lane number of zero. However, this collection object could have anchored clips in multiple lanes. For the purpose of compositing at time of rendering, the items within the collection 2710 would be composited initially according to the ordering within the collection, then the output of that would be composited within the primary collection according to the ordering of the primary collection. Similarly, for each of the lowest-level collections (e.g., collection 2705), the video components are all lane zero and the audio components are lane −1.

FIG. 28 also illustrates the ranges (e.g., durations) of the various clip objects. For the lowest level collections and their components (e.g., collections 2705, 2715, 2725, 2730, and 2720), the trimmed range and the total range are determined in a manner similar to that shown in FIG. 25 for the collection object 2410. In this case, collections 2715 and 2755 are not trimmed at all, whereas collection 2705 is trimmed on both sides and the start of collection 2730 is trimmed.

For collection 2710, the total range is the sum of the trimmed ranges of its primary lane clips, which in this case are collections 2725 and 2730. Thus, the variable Total Range 2=Trimmed Range A+Trimmed Range B. In this case, the collection 2710 is not separately trimmed, such that its trimmed range equals its total range. This means that, although there is more media within clip 2730, while editing the primary collection 2703 the media-editing application will not allow a user to increase the duration of clip 2710 beyond that of Total Range 2. However, a user could open up the clip 2710 in the timeline and apply trim edits to either of clip 2725 and 2730. Modifications to the trimmed range of these clips will affect the total range of the clip 2710. In addition, within the primary collection 2703, a user can modify the trimmed range of clip 2710 to shorten the clip. Trimming from the beginning would result in less of the media of collection 2725 being used in the component presentation, while trimming from the end would result in less of the media of collection 2730 being used in the composite presentation.

The above figures illustrated various aspects of different subclasses of clip objects (e.g., sequences, collections, and components). One of ordinary skill will recognize that clip objects of some embodiments may have additional properties not shown in these figures. For instance, both collections and components may have an effect stack in some embodiments, which stores a stack of effects that are applied to the media in the clip when the application renders the clip. The application applies these affects to the media in an order designated by the effects stack, which can be modified by the user during editing. The effects may include audio effects that perform a transform on the audio or video effects that apply a function to the pixel values of the video images, in some embodiments. In fact, some embodiments store separate video and audio effects stacks.

In addition, one of ordinary skill in the art will recognize that some embodiments may have additional different subclasses of clip objects. For instance, some embodiments store generators, transitions, audition stacks, markers, and keywords as clip objects. A generator, in some embodiments, is an effect used in a composite presentation that creates its own video images rather than modifying existing images (e.g., clouds and other computer-generated effects that may rely on random processes). Some embodiments also use generators as gap elements in collections in specific circumstances. If, for example, a user were to select clip objects 2705 and 2720 and create a compound clip from these objects, a gap element would be inserted into the collection object for the compound clip to take up the missing space of clip object 2710, which the user did not add to the collection. The clip object 2720 would then be anchored to this gap element. In some embodiments, these clips are not actually generators, but are special clips that produce neither audio nor video but add duration to a collection. As the generators create their own video images, they have a duration and this duration adds to the range of the collection containing the generator.

Transition objects, on the other hand, are used for transitions between two other clip objects. These objects have a range of 0, and do not add to the range of the container clip object. A transition object is stored in the array of its containing collection with an index between the indices of the two items between which it transitions. The transition object has a head and a tail that indicate the start and end of the transition between the clips.

Audition stack objects, or variants, store a list of possible clips for a particular index in a collection or for a particular anchor. That is, the audition stack object stores a set of clips, one of which is designated as active at any time. The properties of the stack object take on the properties of the active clip, such as the ranges, video properties (e.g., frame rate, resolution, etc.), audio properties, etc. Thus, when a user switches the active clip in the stack, some attributes of the stack may change. In addition, some of the objects in the stack may be collections that themselves have nested clips, while others might be simpler clip objects. When an audition stack object is anchored to another clip, some embodiments store the first portion of the anchor offset in the audition object (i.e., the offset within the parent clip), but store different offsets within the child clip for the different clips in the audition.

Marker objects store markers that a user adds to a specific time location in a collection. In some embodiments, marker objects have a duration of 1 frame, and store metadata indicating the type of marker (e.g., to do marker, analysis marker, etc.) and any notes about the marker that the user adds. Some embodiments anchor marker objects to a particular clip object. When calculating the duration of a collection, marker objects are specifically excluded from this calculation in some embodiments.

Finally, keyword objects store keyword tags about a clip object. Unlike markers, keywords have a range, as some embodiments provide the user the ability to tag a particular range of a clip rather than just associating the keyword with the entire clip. In some embodiments, a keyword object can store multiple keywords that have the same range. Some embodiments anchor keyword objects to the tagged clip object at the start of the range within the tagged object. Like markers, some embodiments specifically exclude keyword objects from the duration calculation for a collection.

Figure 29:
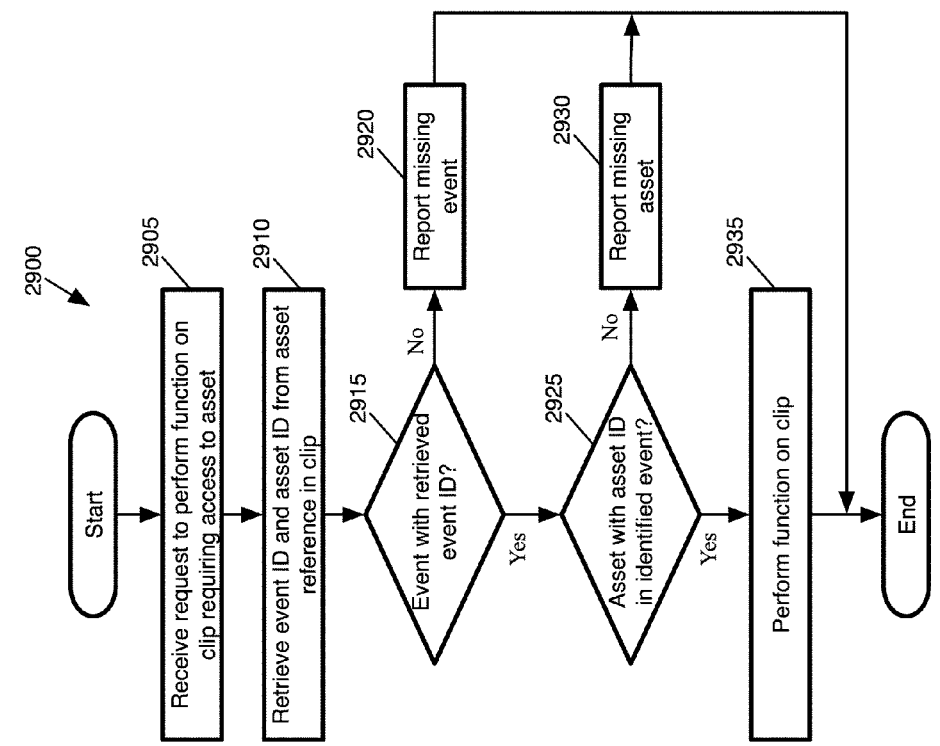
FIG. 29 conceptually illustrates a process of some embodiments for searching for an asset.

The above-described data structures (e.g., the clip objects, asset objects, event objects, project objects, etc.) are used by some embodiments of the media-editing application for displaying information in the GUI of the application as well as for rendering the composite presentations. As alluded to above, in some cases the media-editing application will attempt to access a clip (e.g., to display the clip in the media browser or timeline), but will be unable to resolve the underlying asset. In this case, the application may report that the asset is missing and provide an option to find a replacement asset. FIG. 29 conceptually illustrates a process 2900 of some embodiments for searching for an asset.

As shown, the process 2900 begins by receiving (at 2905) a request to perform a function on a clip that requires access to the asset. The clip may be a clip that includes multiple assets, or a component clip including only one asset. This function may simply be displaying a representation of the clip in the timeline (e.g., because a user has requested that a project including that clip be displayed in the timeline for editing), or performing more complex editing operations on the clip.

The process retrieves (at 2910) an event ID and asset ID from the asset reference in the clip. As shown in FIG. 23, the clip data structure stores an asset reference in some embodiments that includes both of these IDs. The process then determines (at 2915) whether an event can be found in the media-editing application database with the retrieved event ID. In some embodiments, the process searches an event database stored by the media-editing application for an event with the event ID retrieved from the asset reference. As shown in FIG. 21, each event has a unique event ID. When no such event can be found, the process reports (at 2920) a missing event, and ends. The media-editing application may display this information to the user. The display of such information is described in further detail below in Section IV. In some cases, a user might have deleted an event in order to delete the associated media and analysis files, thereby saving disk space. In addition, the event might be stored on a physical storage device (e.g., an external hard drive) that is not connected to the device on which the application is operating.

When an event is found with the event ID from the clip, the process determines (at 2925) whether an asset with the retrieved asset ID currently exists in the identified event. In some embodiments, the process searches within the event for an asset having the requested asset ID. As shown in FIG. 21, each event includes a list (e.g., an array) of the assets in the event stored by asset ID, and each asset stores its own asset ID as well.

When no such asset can be found, the process reports (at 2930) a missing asset, and ends. The media-editing application may display this information to the user. The display of such information is described in further detail below in Section IV. In some cases, a user might have deleted various clips from an event through the media browser, thinking that the clips are not needed. As the notion of an asset, as opposed to a clip, is not shown to the user of the application in some embodiments, in some embodiments deleting the clips in the clip browser deletes the asset as well (whereas deleting a clip from a project in the timeline does not affect the underlying asset). Some embodiments provide two different deletion functions—a user can either delete just a clip from an event but keep the asset, or delete the asset (and the underlying media) with the clip.

When the asset is found, by matching both the event ID and the asset ID, the process performs (at 2935) the requested function on the clip, and ends. This process illustrates two possible failure modes: a missing event and a missing asset (which is reported to the user as a missing clip). In addition, some embodiments include other failure modes. For instance, a file may be missing, if a user requests proxy media but has never generated a proxy version of a particular file, or if a user has manually deleted files through the directory folder structure of the device on which the file was stored. In the latter case, the asset data structure would remain, but would point to a nonexistent file.

Figure 30:
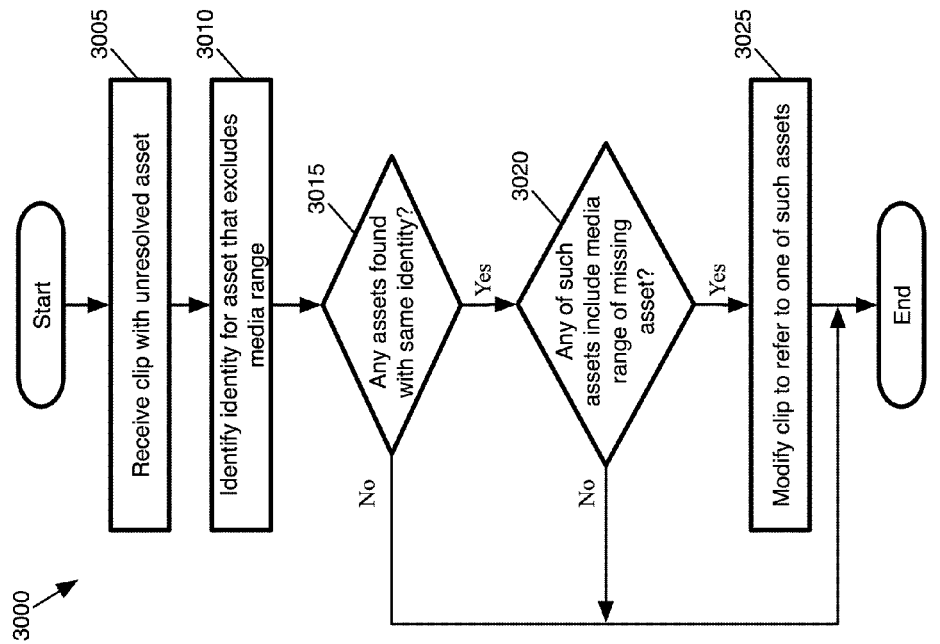
FIG. 30 conceptually illustrates a process of some embodiments for resolving a missing asset.

When a clip has an unresolved asset, some embodiments provide for the ability to identify a new clip with the same asset. This may be in response to a user request to find a replacement asset, or be performed automatically by the media-editing application. FIG. 30 conceptually illustrates a process 3000 of some embodiments for resolving such a missing asset.

As shown, the process 3000 begins by receiving (at 3005) a clip with an unresolved asset (i.e., a missing asset). The missing asset may have been discovered through a process such as that shown in FIG. 29. The process then identifies (at 3010) an identity for the asset that excludes the media range. This allows the application to find a replacement asset that references a media file created from the same shot or recording as the missing asset, but might have a different media range.

Next, the process determines (at 3015) whether any assets are found with the same identity as the missing asset. As stated, this would be an asset that references a media file created from the same shot or recording as the missing asset. This might be another copy of the same file, or a file split off from a larger file (e.g., half of a long recording). Such a file would have the same video properties, audio properties, and media file ID, but might have a different media range. When no such assets are found, the process will be unable to resolve the missing asset, and ends.

When the application finds one or more such assets, the process determines (at 3020) whether any of the assets include the media range of the missing asset. If the identified asset includes the entire range of a missing asset, then the asset is suitable for use by the clip with the missing asset. On the other hand, if the clip previously referred to an asset with media not part of the identified asset, then modifying the reference to the new asset will not be useful. If none of the identified assets include the media range required by the clip, the process is unable to resolve the missing asset, and ends.

However, when one or more of the identified assets includes the media range needed, the process modifies (at 3025) the clip to refer to one of these identified assets, then ends. To modify the clip, the application modifies the data structure of the clip to replace the asset reference for the missing asset with the asset reference of the newly identified asset. This will often be both a new event ID and a new asset ID. When multiple assets are found that include the media range needed by the clip, some embodiments select the first identified asset and use that asset. Some embodiments allow the user to prioritize different events and select the highest-priority event with a qualifying asset. Other embodiments use the asset with the longest media range, or the media range closest to that of the original asset.

Figure 31:
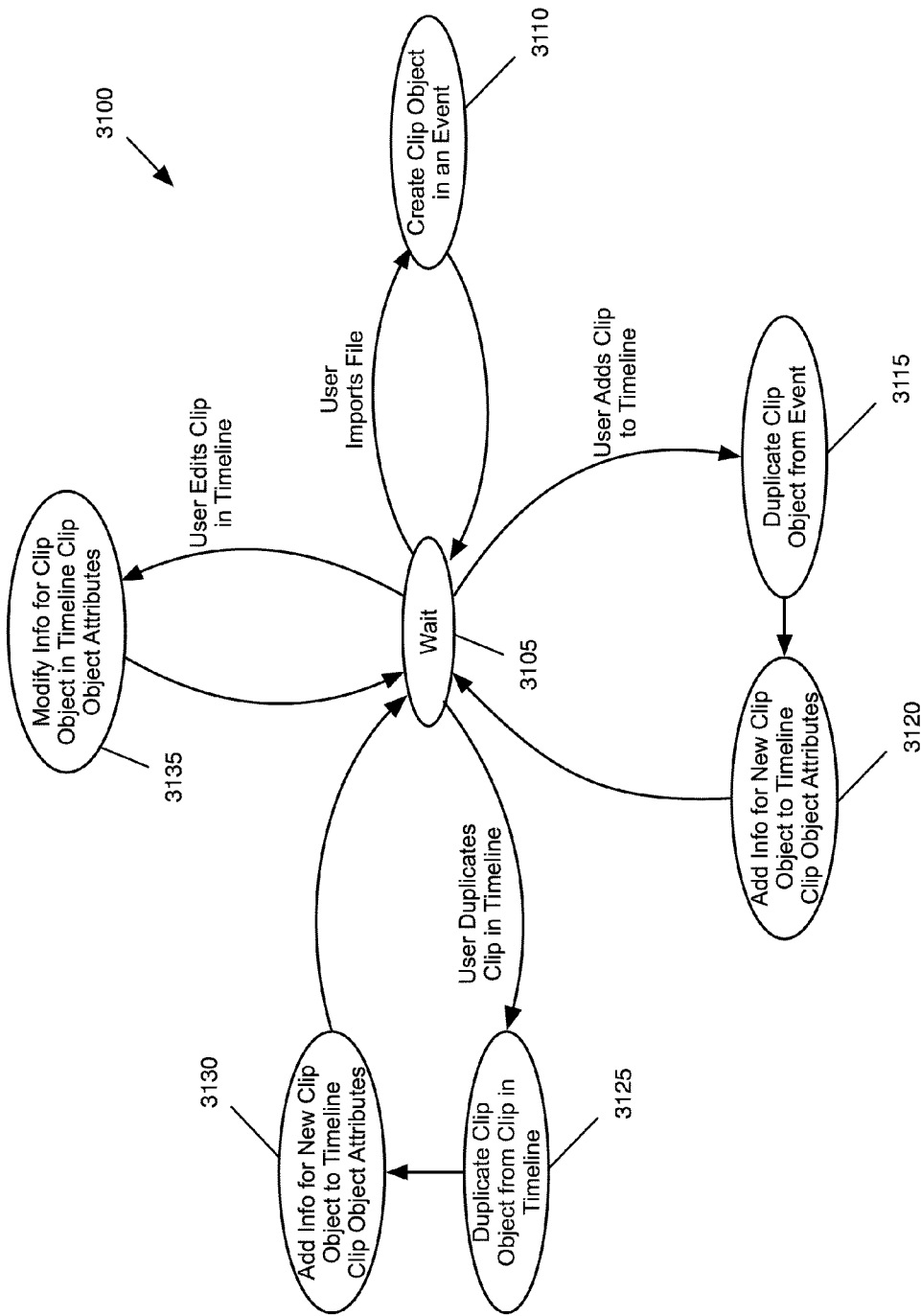
FIG. 31 conceptually illustrates a state diagram for a media-editing application of some embodiments.

FIG. 31 conceptually illustrates a state diagram 3100 for a media-editing application of some embodiments. Specifically, state diagram 3100 refers to the creation and modification of clip data due to various user actions. As shown, when the application is not receiving any such actions, the application is in the wait state 3105. One of ordinary skill in the art will recognize that the application might be performing many other actions while in the wait state with reference to this figure (e.g., performing background tasks such as rendering, analysis, and transcoding).

When a user imports a file, the application transitions to 3110 to create a clip object in an event for the imported file. The event object may also need to be created, depending on whether the user is importing the file to an existing event. As described above, in some embodiments creating the clip object entails creating one or more assets within the event that refer to the file (and any transcodes of the file), as well as creating a sequence that contains a collection with the media components of the imported file, which refer to the asset or assets. The application then returns to the wait state 3105.

When the user adds a clip to the timeline (e.g., by dragging the clip from the browser to the timeline), the application transitions to 3115 and duplicates the clip object from the event to create a new clip object that is part of the project currently edited in the timeline. The new clip object, in some embodiments, will have the sequence container object removed and will include the collection object and the components. In some embodiments, the user may add only a portion of the clip from the event browser to the timeline, in which case the trimmed range of the collection object and its components will be less than their total range. In addition, the application transitions to 3120 to add information for the new clip object to the timeline clip object attributes. That is, the collection (e.g., a primary collection of a sequence) is modified to include the new clip object in its array. If the clip is added to the middle of the timeline (in between other clips), then some embodiments insert the new clip object to the corresponding index in the array and move the later clips down to higher indices. The application then returns to the wait state 3105.

When the user duplicates a clip in the timeline (as opposed to adding a clip from the browser), the application transitions to 3125 to duplicate the clip object from the clip in the timeline. In this case, there is no sequence object to strip off of the clip object, so the information can simply be duplicated. In addition, the information about the new clip is added to the timeline clip object at state 3130. In some embodiments, this may require modifying the indices in the array for the collection object represented in the timeline.

When the user edits a clip in the timeline (e.g., moves the clip), the application transitions to 3135 to modify the information for the edited clip object and the timeline clip object. For instance, when a clip is moved in time, the indices of one or more clip objects will have to be modified in the collection object represented in the timeline. When a clip is trimmed, the trimmed range of its clip object and components will have to be modified. When a clip is moved from a primary lane to an anchored position in a secondary lane of the timeline, the array of the collection will be modified so that the moved clip object is at a later index. In addition, the application will modify the clip object to indicate the anchoring and modify the object to which it anchors for the same reason as well. One of ordinary skill in the art will recognize that other types of edits (e.g., moving a clip object from an anchored position to the primary lane) will have similar effects on the clip data structures.

F. Camera Archives

As mentioned in subsection D, in describing the folder structure used by the media-editing application of some embodiments, the application may store camera archives. Some embodiments store a copy of all media files on a camera (or other recording device) as an archive bundle, from which the files can be imported at a later time. The bundle, in some embodiments, is a set of files wrapped up in such a way that they appear as one item to a user. This prevents the user from easily modifying the bundle, either intentionally or accidentally, and thereby ensures that the original source files are still available at a later time.

Figure 32:
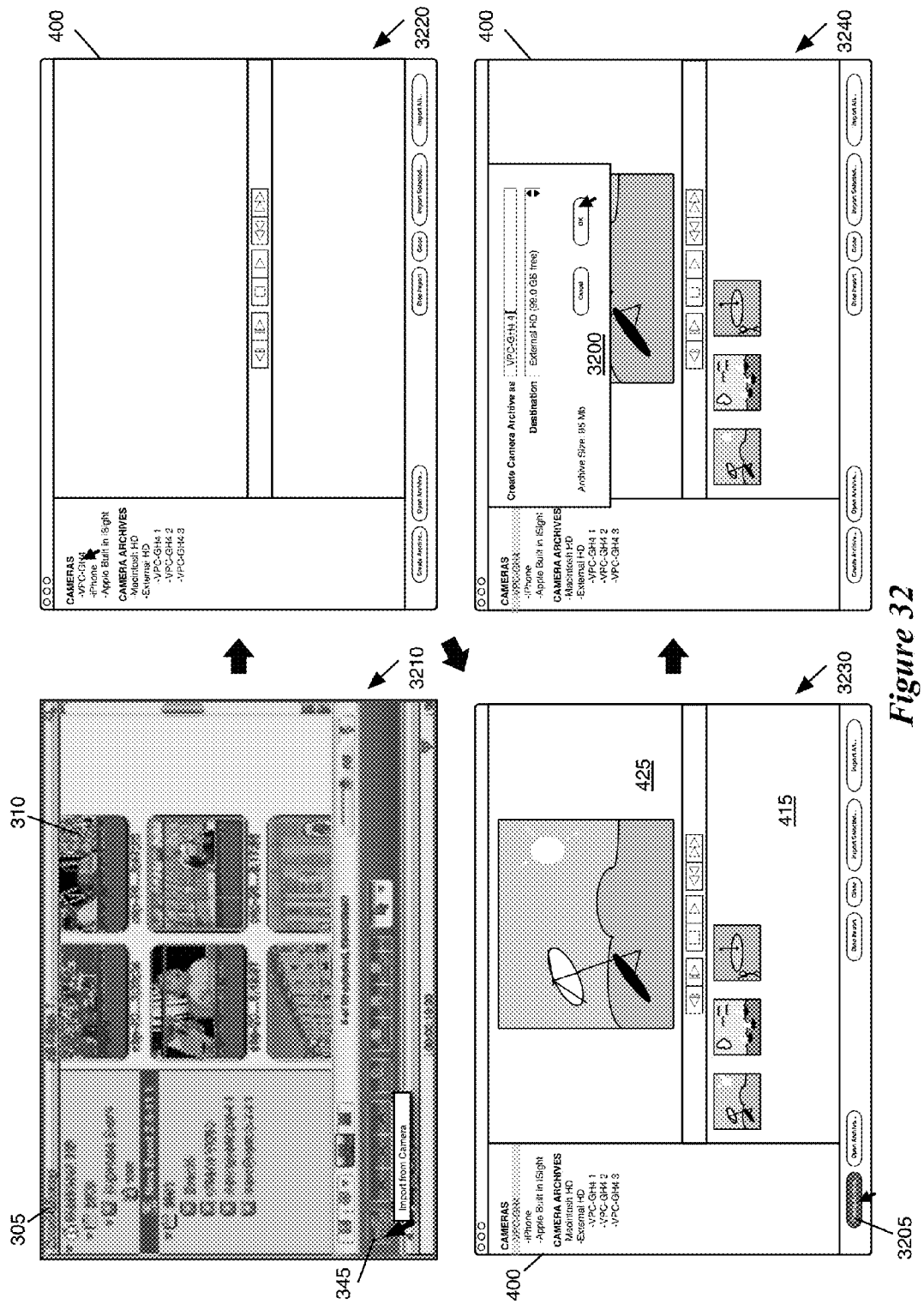
FIG. 32 illustrates the creation of a camera archive in four stages.

FIG. 32 illustrates the creation of a camera archive in four stages 3210-3240. Stage 3210 illustrates the clip library 305 and clip browser 310, while stages 3220-3240 illustrate the import window 400. The GUI elements of these items have been described in detail above in subsection A. As with FIG. 3, in stage 3210 the user is selecting the import initiation item 345, causing the display of the import window 400.

Stage 3220 illustrates that the import window 400 is now displayed. On the left, the list of current camera archives is displayed. Currently the display lists three archives on an external hard drive (External HD), with no archives on the boot disk hard drive (Macintosh HD). These are all archives created at one time or another of the contents of the VPC-GH4 camera, unless the user has misnamed the archives. As shown at stage 3220, the user is selecting the camera VPC-GH4.

The third stage 3230 illustrates that the user has selected camera VPC-GH4, such that the application displays the media stored on this camera in the browser area 415 and preview area 425 of the import window 400. At this stage, the user selects the "Create Archive" option 3205 from the set of user selectable items 435.

The selection of the option 3205 brings up an archive creation dialog box 3200 in stage 3240. The media-editing application displays this dialog box over the import window in some embodiments, as shown. The dialog box includes a field for the user to enter a name for the camera archive, as well as a drop-down menu for the user to select a drive onto which the archive will be stored. The application of some embodiments creates a folder on each drive that stores any camera archives stored on that drive, so that the archives are easily accessible by the media-editing application in a designated location. In this example, the user has typed "VPC-GH4 4" for the name of the camera archive, and is storing the archive to the external drive. When the user selects the "OK" item, the application creates the archive as a bundle file and stores it with the name "VPC-GH4 4".

Figure 33:
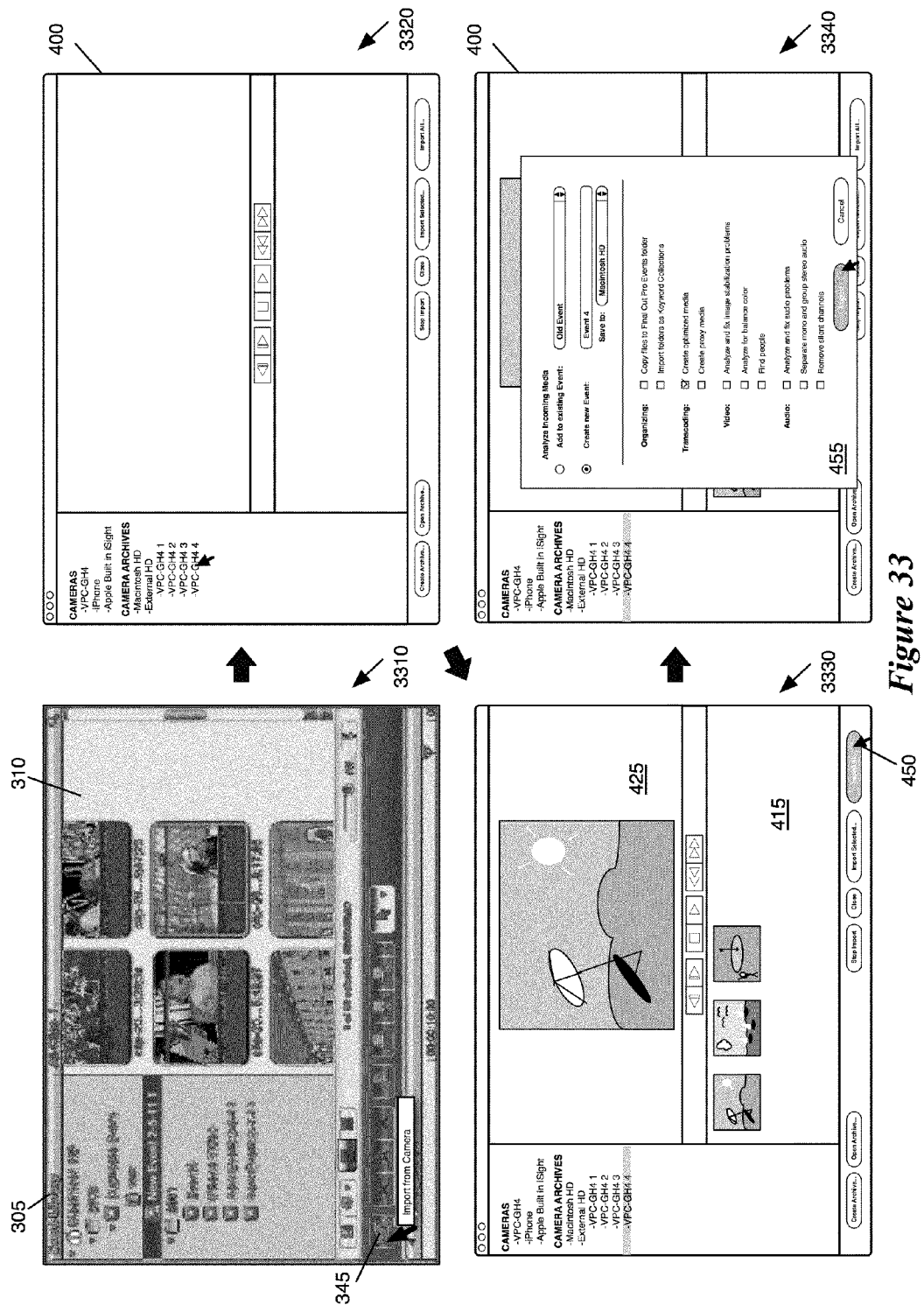
FIG. 33 illustrates the import of a set of media files from a camera archive over four stages.

FIG. 33 illustrates the import of a set of media files from a camera archive over four stages 3310-3340. As with FIG. 32, stage 3310 illustrates the clip library 305 and clip browser 310, while stages 3320-3340 illustrate the import window 400. Stage 3310, is the same as stage 3210, in which the user is selecting the import initiation item 345, causing the display of the import window 400. Stage 3320 is the same as stage 3220, except that the list of camera archives lists the newly-created "VPC-GH4 4" archive in addition to the previous three camera archives. In addition, the user is selecting this archive from the list at this stage.

At stage 3330, the user has selected camera archive "VPC-GH4 4", and thus the application displays the media from the archive in the browser area 415 and preview area 425 of the import window 400. The media appears as shown in stage 3230 of FIG. 32: that is, the display of the media from a selected camera archive will be the same as the display of the same media from a camera, in some embodiments. As shown, the user selects the "Import All" selectable item 450 at this stage.

The fourth stage 3340 illustrates that the application displays the import dialog box 455 as a result of the user selecting the selectable item 450. The import dialog box 455 is described above by reference to FIG. 4, and allows the user to select from a number of operations to perform on the imported media files. These operations include transcoding operations to create additional versions of the media files, analysis operations to generate data about the media files, etc. In addition, the user can either create a new event for the media or add the media to an existing event. In this case, the user has selected to create a new event and save that event to the boot disk (Macintosh HD). In addition, the user has selected to create only a high-resolution transcode of the media, with no low-resolution transcode, and not perform any analysis. The result of the user selecting the import button is the addition of the newly created event "Event 4" to the event library, in a similar fashion to that shown at stage 440 of FIG. 4.

Figure 34:
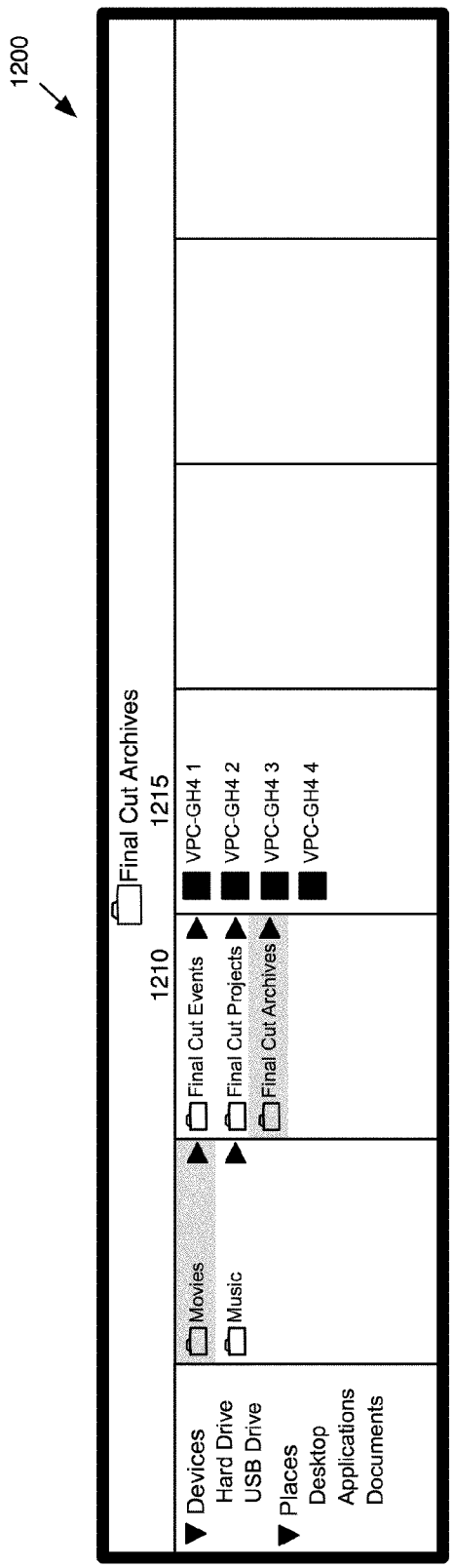
FIG. 34 illustrates the file navigation GUI of some embodiments with the archives folder selected.

Subsection D above described the folder structure of some embodiments, and mentioned that the media-editing application of some embodiments stores camera archives in a particular location within the folder structure set up by the application. FIG. 34 illustrates the file navigation GUI 1200 of some embodiments with the archives folder selected in column 1210. As this shows, some embodiments store the archives separate from the events (the media assets and associated media files) and the projects (the user-created composite presentations).

Although each archive includes one or more media files, the four archives listed in column 1215 of the file navigation GUI 1200 are shown as files, but without file extensions. As mentioned, some embodiments store the archives as bundles, which are a set of files that appear like a single file to a user. In some embodiments, a user can view the contents of a bundle by selecting the bundle, then selecting an option (e.g., from a drop-down menu) to view the bundle's contents. However, the bundle format prevents a user from easily accessing the files in the bundle and accidentally modifying the contents of an archive.

Some embodiments use the camera archives to restore media files that have been deleted for space-saving reasons. For instance, if a user is working on a large project (e.g., a feature film), the project may involve the use of hundreds or thousands of GBs of media. Rather than storing all of this media (in multiple encoded forms) in the file storage for the application, the media-editing application may enable the user to delete the media, while retaining the event and clip data structures (e.g., as a menu option), in order to create offline clips (or offline events and/or projects). The user can store camera archives (e.g., on a set of external hard drives), and then re-import the media files from the camera archive when time comes to return to the project (e.g., if making a director's cut of a film a few years after the original release). Because the media asset data structure stores the UUID of the media files to which they refer, the newly-imported media can be easily matched with its appropriate asset by the media-editing application.

II. Scheduling Engine

Much of the discussion above in Section I described the import of media files (especially video files, and the parallel processing of those files at import (e.g., to transcode the media, analyze the media, etc.). In some embodiments, the user can select to perform any of the transcode or analysis options on a media file at any time after import of the media file as well, including during playback of the media file. The same architecture of the media-editing application will perform these operations whether performed at time of import or post-import.

A. Scheduling of Operations

The media-editing application of some embodiments includes a scheduling engine that manages the preparation of images (e.g., video images) for various destinations, including the transcoding and analysis destinations described above (as well as other size transcodes or different types of analysis). In addition, some embodiments use the same engine to manage the preparation of images for playback (e.g., playing the image back in the preview display area or a thumbnail filmstrip).

Whenever possible, the scheduling engine of some embodiments ensures that each image is only read once from the disk on which its media file is stored and then only decoded once, rather than performing these functions separately for each destination. In addition, in some embodiments the scheduling engine manages graphics processing operations that prepare the image for its destinations, and seeks out efficiencies that can be realized in these operations. As different destinations may need an image in different resolutions, colorspaces, etc., some graphics processing may be required before sending the decoded image to the destinations. For instance, if two destinations process an image in the same format, then any graphics processing operations can be done only once. If, on the other hand, two destinations process the image in different colorspaces, then operations to convert the image into those two colorspaces must be done separately and different image data sent to the two destinations. In addition to conversions between colorspaces, resolutions, etc., the graphics processing may include blend, compositing, etc. operations in some embodiments to prepare an image for output using multiple source media files, as well as the application of one or more effects (e.g., stored in an effects stack) to an image.

Figure 35:
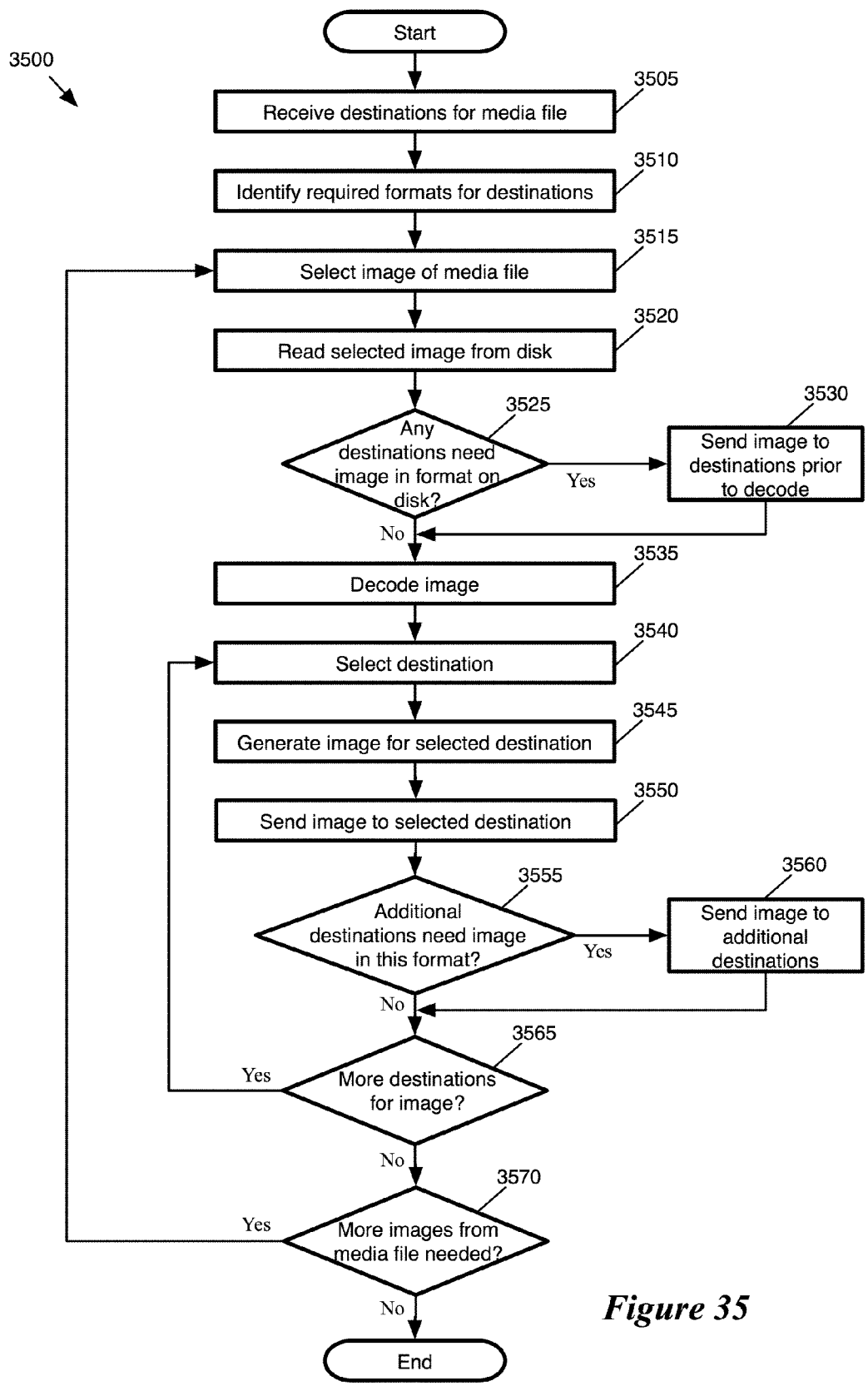
FIG. 35 conceptually illustrates a process of some embodiments for preparing images of a media file for one or more processing destinations.

FIG. 35 conceptually illustrates a process 3500 of some embodiments for preparing images of a media file for one or more processing destinations. These destinations may be analysis operations (e.g., person detection, shake detection, color balancing, etc.), encoding operations (e.g., different encoders for different size files, different encoders using different formats for presentation or storage in different locations, etc.), or real-time playback-related operations (e.g., display on a monitor or other display device, associated video waveforms or histograms, etc.), as well as any other destinations that use the images of a media file. In some embodiments, some or all of the process 3500 is performed by the scheduling engine of a media-editing application, also referred to as a playback engine.

As shown, the process begins by receiving (at 3505) a set of destinations for a media file. These destinations may be user-selected analysis and encoding options received through a GUI such as that illustrated in FIG. 4. The set of destinations may also include post-import destinations such as a background rendering operation that pre-renders portions of a project in the timeline. The destinations may also include one or more playback-related destinations, such as an output to a monitor or other display device. The output may be at one or more different sizes (e.g., displaying an image in both a thumbnail filmstrip clip representation and a preview display area).

The process identifies (at 3510) the required format for each destination. Identifying the formats ahead of time allows the media-editing application to identify destinations that require the same format image and only generate one image in that format for the destinations. In addition, some embodiments identify destinations that require images that are partially the same format, such as when two destinations require images in different sizes, but the same colorspace, or different colorspaces and the same size.

With the formats identified for the various destinations, the process selects (at 3515) an image of a media file. When playing back or skimming a video, the selected image will be whichever image of that video file is requested by the display. If the user is skimming through the video, then the images may not actually be requested in time sequential order (e.g., if the user is skimming backwards through the video). In addition, the user might be moving a playhead across the video too fast to display every image in the media file. When playing back the video, the application will generally try to display every image at the frame rate of the video (e.g., 24 frames per second, etc.). However, as described further below, the scheduling engine of some embodiments will skip images when necessary to keep up with playback requirements. When no real-time destinations are involved (e.g., the application is transcoding and analyzing the images, either at import or a later time), some embodiments select the images in time-sequential order.

The process 3500 then reads (at 3520) the selected image from the disk. In some embodiments, this operation is not actually performed by the scheduling engine of the media-editing application, but rather a request for a disk read operation is sent to a processor of the device on which the application is operating, and the processor performs this disk read operation in coordination with its own scheduler and the operating system. That is, the scheduling engine prioritizes its operations, and the processor then makes the decisions as to which threads to run in which order using both the priorities assigned by the scheduling engine and the processor's local knowledge of resource availability.

After the image is read from the disk, the process 3500 determines (at 3525) whether any destinations need the image in the format in which it is stored on the disk. This will often be an encoded format, such that most destinations will need the image to be decoded, but if the image is stored as raw pixel data (which will generally be a very large file), then some destinations may want that raw pixel data with no format conversions necessary. In addition, some destinations might want the image in its encoded form. When any such destinations exist, the process sends (at 3530) the image to these destinations prior to decode, rather than decoding and then re-encoding the image in the same format.

Next, the process decodes (at 3535) the image. If the image is actually raw, unencoded pixel data, then the process will of course skip this operation. However, media is often stored in an encoded format, and therefore will need to be decoded for a destination to perform its operations on an image. As with the disk read operation, in some embodiments the decode operation is actually performed by the processor (or a separate decoder hardware), and the scheduling engine of the media-editing application schedules this operation. While FIG. 35 illustrates a linear flow for each image in the media file, some embodiments will issue a disk read operation for one image when a previous image has not yet been decoded and sent to the requested destinations, in order to keep a buffer of images at each operation and avoid wasted time.

With an image decoded, the process 3500 can begin to send the image to its destinations. The process selects (at 3540) a destination from the received set of destinations to which the media file should be sent. In some embodiments, the media-editing application stores an ordered list of all its possible destinations, and sends the image to these destinations in the order specified by the list. Some embodiments prioritize playback ahead of other destinations, as the playback is dependent on the images arriving at a particular rate, whereas other destinations can handle delays.

The process then generates (at 3545) an image for the selected destination. This image will be in the format required by the destination, as identified at operation 3510. Generating the image may involve performing colorspace conversions on the pixel data, resampling the pixels at a different resolution, etc. In some embodiments, resampling the pixels uses one or more pixel transforms to scale the image data to the correct size, as described in detail below in Section V. The image generation may also involve additional graphics processing operations such as blends between multiple images, compositing multiple images together, etc. In this case, the scheduling engine may need to schedule multiple disk reads and decodes to generate a single composite image for the destinations. In general, these sorts of operations are necessary for post-import destinations such as background rendering, display, etc., rather than for import destinations such as transcoding or single-file analysis.

In some embodiments, as with the disk read and decode, the format conversion operations are scheduled by the scheduling engine and performed by a processor. Depending on the conversion operation and the destination, some embodiments may use a graphics processor of the device rather than a central processor. Some embodiments use both types of processor (CPU or GPU) depending on the operation to perform.

With the image generated in the appropriate format for the currently selected destination, the process sends (at 3550) the image to the selected destination. That is, in some embodiments, the scheduling destination instructs the format conversion operation to send its output to the appropriate destination. In some embodiments, the image data is stored in a cache on the processor or in volatile storage (e.g., RAM), and the scheduling engine instructs the destination to perform its operation on the image data stored in that particular location.

The process also determines (at 3555) whether any additional destinations need the image in this same format. In some cases, for example, multiple analysis operations might all want to use the same data (e.g., color balancing and person detection). When additional destinations required the image, the process sends (at 3560) the image to the additional destinations. In some embodiments, this involves instructing multiple destination operations as to the location (e.g., in a cache, in RAM, etc.) of the image data. In some embodiments, the instructions also indicate that other destinations are using the image data, and therefore the data should not be overwritten until all necessary destinations have accessed the data.

After sending the particular format image to all of its destinations, the process determines (at 3565) whether any additional destinations remain for the current image that need the image in a different format. If additional destinations remain, the process returns to 3540 to select another destination, and will cycle through operations 3540-3565 until all of the necessary format conversions are performed and all destinations have received the image in the appropriate format.

Once the process 3500 has sent the image to all of the destinations, the process determines (at 3570) whether more images from the media file are needed. When performing one or more transcode or analysis operations, the process will generally analyze each image in the media file. However, when a user is playing back or skimming a clip, not all of the images may be needed. A user might pause playback, only play a portion of the media file represented by the clip, skim through a short section of the media file, etc. If additional images are required, the process returns to 3515 to select a next image. Once no more images are needed, the process ends.

While operations 3540-3565 illustrate a linear flow that cycles through the destinations based on the required input format of the destinations, some embodiments actually use a tree structure to realize additional efficiencies in the format conversion. When two destinations require images of the same size, but in different colorspaces, the scheduling engine may schedule a size conversion first, then two different colorspace conversions (or only one, if the image values are already in one of the required colorspaces), as opposed to completely separating the processing for each destination. This tree structure for the operations will be described in detail by reference FIGS. 36 and 37.

Figure 36:
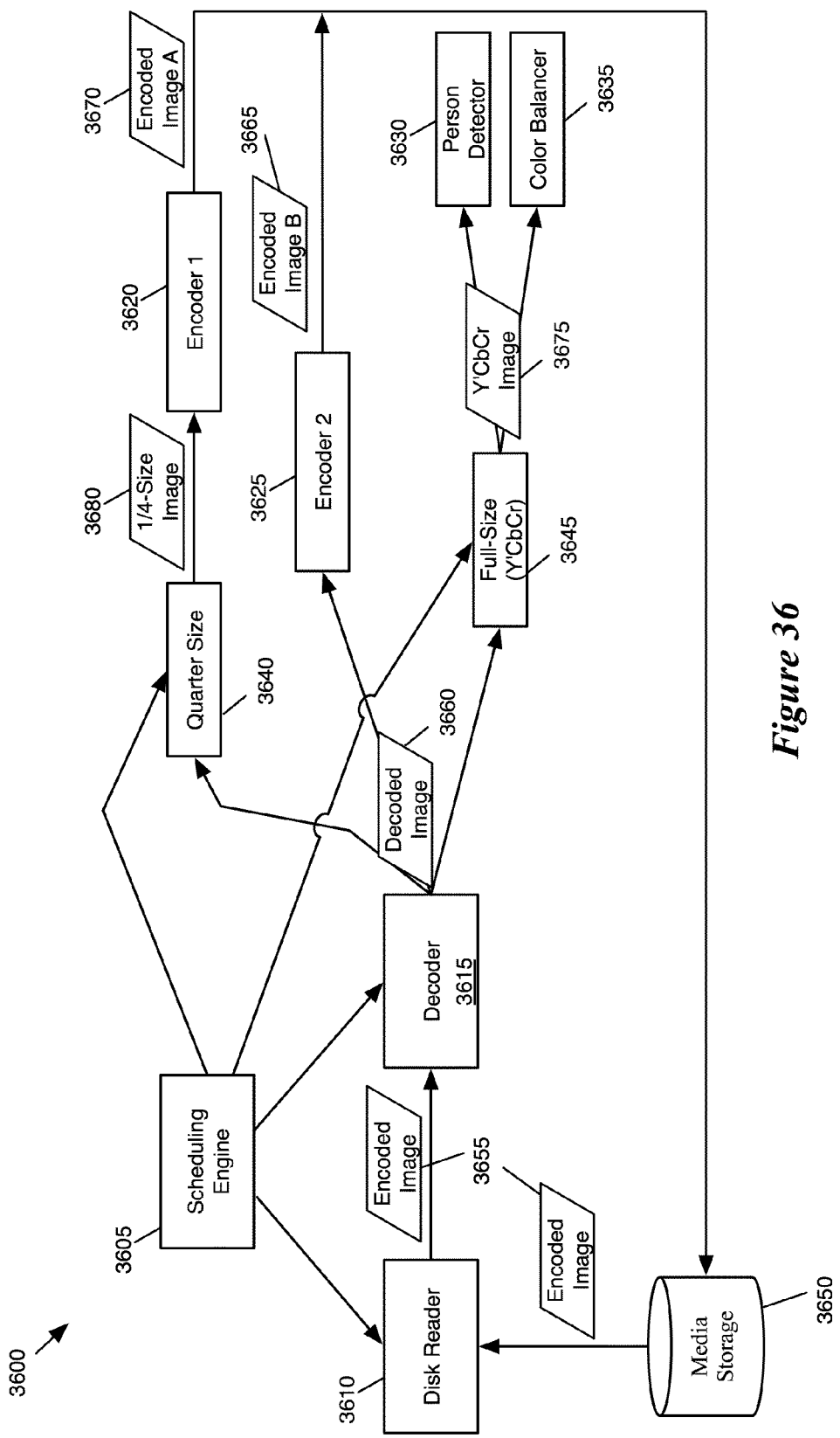
FIGS. 36 and 37 conceptually illustrate the software architecture of a system of some embodiments.
Figure 37:
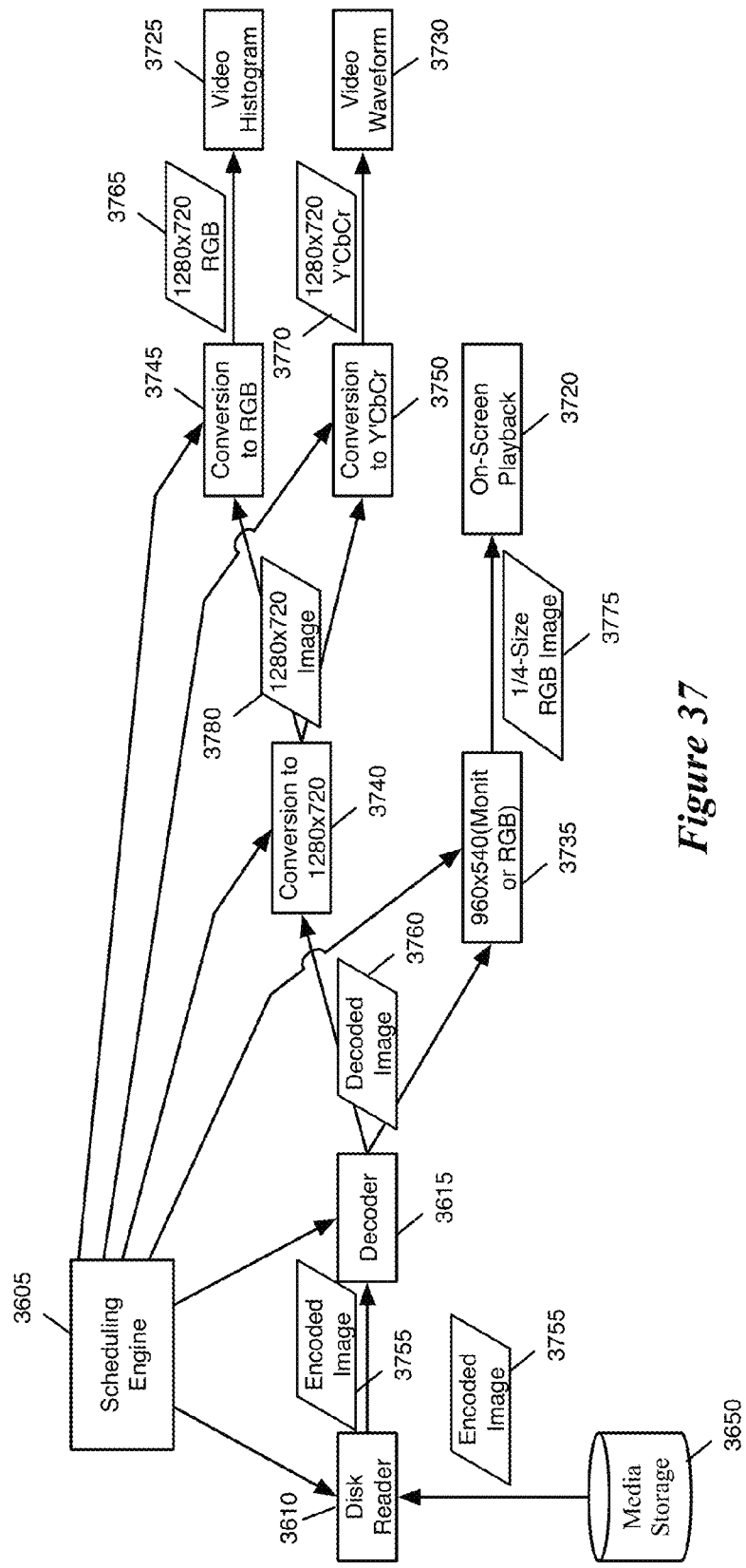

FIG. 36 conceptually illustrates the software architecture of a system 3600, and may involve operations performed both by the operating system of a device (e.g., a disk read operation) as well as by the media-editing application of some embodiments that runs on the device (e.g., the scheduling operations). Some of the modules and operations shown in system 3600 are similar to those shown in FIG. 1, specifically the scheduling engine 3605, disk reader 3610, and decoder 3615. The system 3600 also includes four output destinations and two image processing operations. One of ordinary skill will recognize that these destinations and image processing operations are not the only operations that such a system would necessarily include, but rather represent one set of operations that might be performed in parallel. FIG. 37, described below, illustrates the system 3600 with different operations for different destinations. Which operations are performed by the system depends on which actions are performed/requested by a user of the media-editing application.

In this figure, the four destinations include a first encoder 3620, a second encoder 3625, a person detector 3630, and a color balancer 3635. This represents a set of operations that the media-editing application might perform during import of a set of media files (e.g., from a camera), though the operations could also be performed at a later time after import (e.g., upon returning from the field to a computer with higher processing power after importing the files while on a laptop). The two encoder destinations 3620 and 3625 encode different size images. In some embodiments, the two encoders are actually the same destination (i.e., perform the same encoding algorithm), but receive two different size images. Other embodiments use different encoding algorithms (e.g., ProRes 422 and ProRes Proxy encoding) and may even use different encoders (e.g., different encoder hardware). The person detector 3630 and color balancer 3635 are analysis destinations that generate analysis data about a received image.

The two image processing operations 3640 and 3645 are performed by the CPU and/or GPU of the device on which the media-editing application operates in accordance with scheduler instructions in some embodiments. The operation 3640 is an operation to modify the resolution of a received image to one-fourth the size (e.g., from 1920×1080 pixels to 960×540 pixels), while the operation 3645 converts an image to full size (e.g., 1920×1080 pixels) if the image is not already that size, and converts the image colorspace to Y'CbCr (as the image will often be received in the RGB colorspace of the device that captured and recorded the image).

The disk reader 3610 and decoder 3615 are described in detail above by reference to FIG. 1 and FIG. 10. In short, the disk reader 3610 retrieves image data for an image from a media file stored on a physical storage device, such as an internal or external hard drive. The decoder 3615 performs a decode operation to convert the image data from an encoded form to a pixel buffer (i.e., an ordered set of pixel values). The media storage 3650 stores the media files used by the media-editing application. The media storage 3650 may represent a single physical storage device (and even a single organized set of file folders on the physical storage device), or multiple storage devices (e.g., internal and external hard drives, network drives, etc.).

The operation of the system 3600 will now be described. When the scheduling engine 3605 determines that an image is needed, the engine 3605 schedules a disk read operation with the disk reader 3610. The scheduling engine 3605 of some embodiments has a clock (either a real-time clock or a value clocked by non-real-time destinations, as described below by reference to FIGS. 39-42), and uses this clock to determine when to schedule various different operations. In addition, the scheduling engine may receive input (e.g., from a user interface as shown above in FIG. 10) that indicates which images should be sent to the various destinations.

FIG. 36 illustrates that an encoded image 3655 is read from the media storage 3650 by the disk reader 3610. The disk reader sends this encoded image 3655 to the decoder 3615. In some embodiments, a processor performs the disk read operation and the encoded image data is stored in the cache of the processor, from which the decoder will read the data.

The operation of the decoder 3615 is also scheduled by the scheduling engine 3605, based on the same factors that the engine 3605 uses to schedule the disk read operations in some embodiments. As with the disk read operation, the decode operation is performed by the processor in some embodiments. In some cases, the operating system of the device running the media-editing application includes various codecs for decoding images in various formats, and the appropriate codec is used to decode the encoded image 3655. In some embodiments, specific decoder hardware is used to perform the decode operation.

The output of the decoder 3615 is a decoded image 3660. In some embodiments, this is an ordered set of pixel data (e.g., values indicating each pixel's color in a colorspace). As with the encoded image 3655 output by the disk read operation, the decoded image 3660 may be stored to a cache on the processor, volatile storage such as RAM, or a different storage in different embodiments.

As shown, the decoded image 3660 is sent to multiple different operations. The image is sent directly to the second encoder 3625, which uses the decoded data without any intermediate operations. As shown, this encoder outputs an encoded image 3665 that is stored in the media storage. This encoded image will generally be in a different form than the encoded image 3655, as otherwise the transcoding operation will be a waste of time. In some embodiments, the full-size encoder uses ProRes 422 encoding.

The other destinations (the first encoder 3620, the person detector 3630, and the color balancer 3635) all require the system to perform one or more image processing operations on the decoded image before sending the decoded image to the destination. For instance, operation 3640 is performed on the image 3660 to reduce its size by one-fourth. In some embodiments, this involves resampling the pixels in such a way as to determine the ideal pixel values for each of the new pixels (which encompasses four of the pixel values in image 3660). The output of this operation 3640 is a quarter-resolution image 3680 that is sent to the first encoder 3620. The first encoder 3620 outputs an encoded image 3670 that is stored in the media storage. In some embodiments, the first encoder uses ProRes Proxy encoding.

In addition, operation 3645 is performed on the image 3660 to transform the color space of the image into the Y'CbCr colorspace. If the decoded image 3660 is not at full-size, the operation 3645 also performs a scaling operation, similar to that of operation 3640. In some embodiments, a full-size image is a 1920×1080 image. The output Y'CbCr image 3675 is sent to the person detector 3630 and color balancer 3635 for analysis. The function of these operations is described above in Section I.

As shown, the scheduling engine 3605 also manages the image processing operations 3640 and 3645 in some embodiments. The scheduling engine of some embodiments schedules the image processing operations required to convert a decoded image into the proper format for display. These operations may be performed by a CPU or a GPU in some embodiments. In some embodiments, the image processing operations are performed by a rendering engine that is specifically designed for image rendering operations, and each of the operations is a node in a render graph for the operation.

FIG. 37 conceptually illustrates a different set of operations performed by the system 3600. As in FIG. 36, the scheduling engine 3605 manages the disk reader 3610 and decoder 3615 to read an image 3755 from the media storage 3650 and decode the image in order to generate a decoded image 3760 (i.e., raw pixel data).

FIG. 37 illustrates a scenario for system 3600 in which the media-editing application is playing back a media file on the display (the on-screen playback destination 3720) as well as generating and displaying a video histogram 3725 and a video waveform 3730. Each of these destinations requires a different image format, but that does not completely prevent the realization of efficiencies in the post-decode graphics processing.

The on-screen playback 3720 (e.g., playback in the preview display area) needs a 960×540 image in this case (due to the size of the playback area), in the RGB colorspace of the display device (display devices may have slight differences in their colorspaces). As such, the decoded image is sent to operation 3735, which performs a scaling operation to reduce the size of the image by one-fourth (similar to operation 3640) and transforms the colorspace of the image. This operation outputs an image 3775, which is sent to the on-screen playback destination 3720 for display (e.g., in the user interface of the media-editing application). In some embodiments, the image will be displayed in multiple locations within the user interface (e.g., the preview display area and a thumbnail filmstrip). In this case, a single colorspace conversion may be performed, followed by two different scaling operations.

The video histogram 3725 and video waveform 3730 both use a 1280×720 image, but require the image to be in different colorspaces. As such, the decoded image is sent to the size conversion operation 3740, which outputs a 1280×720 image. This resized image is sent to a pair of colorspace conversions 3745 and 3750 for the different destinations 3725 and 3730. The conversion operation 3740 is similar to the scaling operation performed at 3735. All of the scaling operations shown in these two figures keep the pixel aspect ratio at 1:1 and do not modify the image aspect ratio. However, in some cases a conform operation will be needed that changes the image aspect ratio and/or pixel aspect ratio (e.g., converting a 1920×1080 HD image with 16:9 image aspect ratio to an 720×480 SD image with 4:3 image aspect ratio).

The image processing operations 3745 and 3750 take the 1280×720 image 3780 and convert the image to the appropriate colorspace for the video histogram 3725 and the video waveform 3730, respectively. The video histogram, in some embodiments, displays a histogram of RGB values for an image (i.e., the number of pixels having each R, G, and B value). The video waveform, in some embodiments, shows luma and/or chroma values at each x-coordinate of an image. As such, the histogram requires an image 3765 in RGB colorspace, while the waveform requires an image 3770 in Y'CbCr colorspace.

FIGS. 36 and 37 each illustrate a particular set of operations performed by the system 3600 of some embodiments. One of ordinary skill in the art will recognize that in different embodiments, the various destinations will require images with different sizes and different colorspaces. For instance, the person detector and color balancer might not both operate on a Y'CbCr image in some embodiments, and the video histogram and waveform might always operate on an image the same size as the on-screen playback in some embodiments. However, regardless of the particular image conversions shown in these figures, the scheduling engine of some embodiments will generally identify destinations requiring similar image formats and fan-out the image processing as late as possible in order to maximize the efficiency of the image processing. In addition, one of ordinary skill will recognize that the examples shown in FIGS. 36 and 37 are only two examples of many possible sets of destination operations and intermediate processing operations that might be required by a media-editing application. For example, the system shown in FIG. 36 might also include a shake detection operation, which in some embodiments requires multiple images at a time for comparison. The real-time operations shown in FIG. 37 might need graphics processing operations in the render graph that transform and/or composite multiple images into a single image (e.g., a picture-in-picture image).

B. Clocking the Scheduling Engine

As mentioned in the above discussion, the scheduling engine of the media-editing application of some embodiments uses different clocking mechanisms depending on whether any of the image destinations is a real-time destination (i.e., video playback). Video playback will require particular video images at particular times, and therefore the scheduling engine will skip images if necessary. On the other hand, when there is no destination that has a required rate at which to receive and output the images, the scheduling engine will not skip images, and will provide images to accommodate whatever rate the destinations are processing the images.

Figure 38:
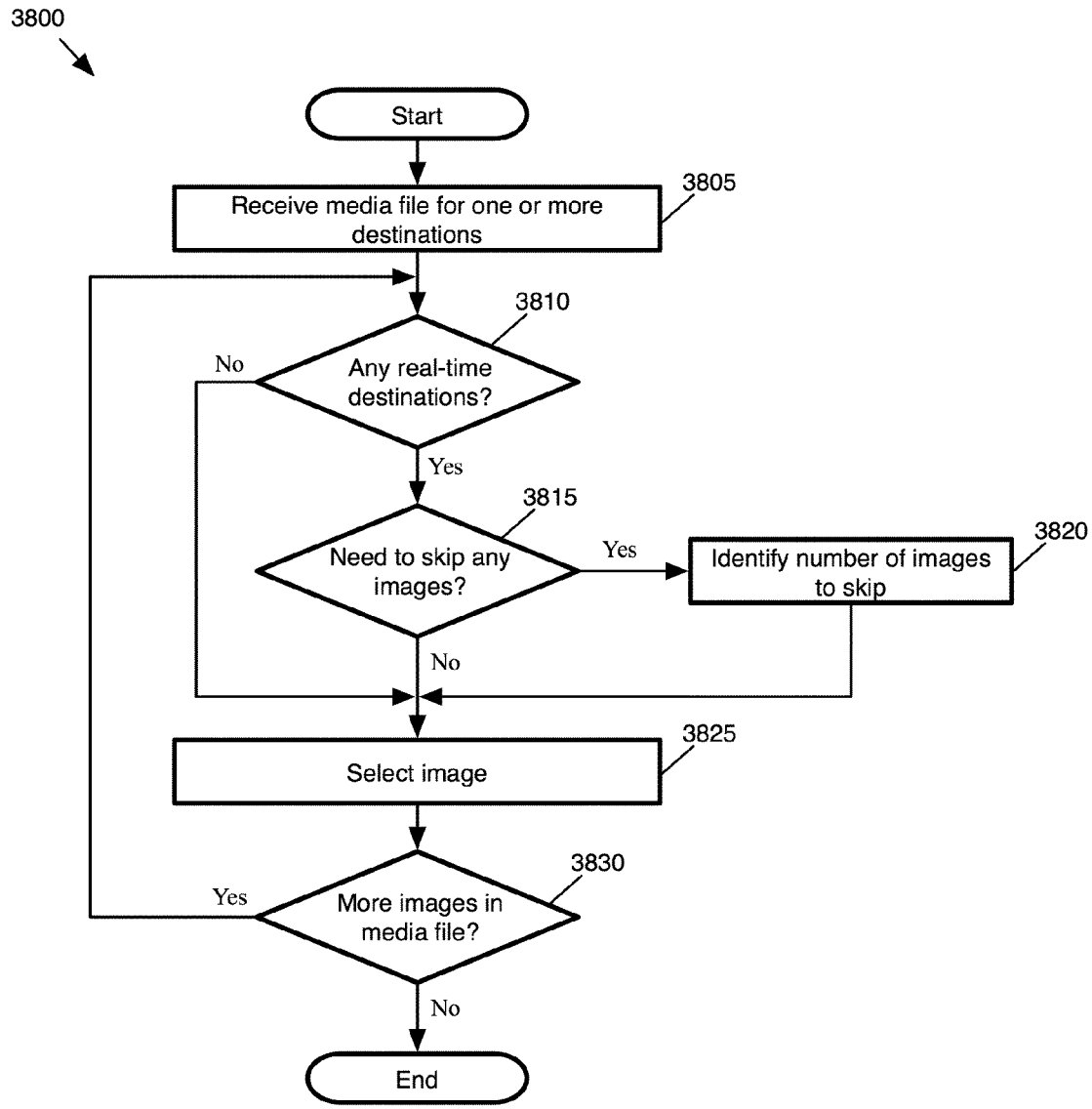
FIG. 38 conceptually illustrates a process for determining which image of a media file to display.

FIG. 38 conceptually illustrates a process 3800 for determining which image of a media file to display. In some embodiments, the scheduling engine of a media-editing application performs the process 3800. As shown, the process begins (at 3805) by receiving a media file for one or more destinations. The scheduling engine does not actually receive the media file itself in some embodiments, but rather data indicating the file (or portion of a file) that the application needs to display, analyze, transcode, etc. The destinations, as described above, are the transcoding, analysis, and output destinations.

The process 3800 then determines (at 3810) whether any of the destinations are real-time destinations. These include on-screen video playback, as mentioned, as well as data that accompanies such playback in real-time, such as the video histogram, waveform, or vectorscope. The histogram and waveform are described in the preceding subsection, and the vectorscope is a color wheel that indicates the distribution of color in a particular image.

When there are no real-time destinations, the process proceeds to 3825, described below. If none of the destinations are real-time, then the scheduling engine does not need to worry about skipping images, because there is no urgency to the display of a particular image at a particular time. To the contrary, many analysis destinations (e.g., the color balancer, people finder, etc.) and encoders will need to analyze each image in a media file.

On the other hand, when at least one of the destinations is a real-time destination, the process 3800 determines (at 3815) whether there is a need to skip any of the images in the media file (as opposed to simply playing the images in sequential order). If the user is skimming through a media clip, then the application will not be able to display all of the images and will choose which image to play based on real-time updates from the user interface indicating the location within a media clip to display. In addition, when playing back video at real-time, the scheduling engine will compare the progress of the playback to a real-time clock and determine whether any images should be skipped. The usage of a clock by the scheduling engine will be described in further detail below by reference to FIGS. 41 and 42.

When the scheduling engine needs to skip at least one image, the process identifies (at 3820) the number of images to skip. This may be based on the location of a playhead over a media clip representation through which a user is skimming, or a combination of clock information and information about the progress of a playback operation.

The process 3800 then selects (at 3825) an image based on the determined information. When there are no real-time destinations or the real-time destinations are keeping up with the real-time clock (i.e., displaying images at a required frame rate), the selected image is the next image. On the other hand, when the scheduling engine is skipping images, the selected image is based on the most recently selected image and the number of images to skip identified at 3820.

After selecting the image, the process determines (at 3830) whether additional images remain in the media file. When more images remain, the process returns to 3810 to identify the next image to select. On the other hand, when no more images remain (or the user has ceased skimming through the clip representation in the media-editing application GUI), the process 3800 ends.

In some embodiments, the non-real-time destinations include a background rendering operation that generates render files for segments of a timeline (e.g., portions between edit points in the timeline). The background rendering operation generates an output image for each frame in the timeline in some embodiments. When performing real-time operations such as playback and its associated operations, some embodiments read from the previously-generated render files rather than re-generating output images, which helps ensure that the real-time playback skips images minimally.

Figure 39:
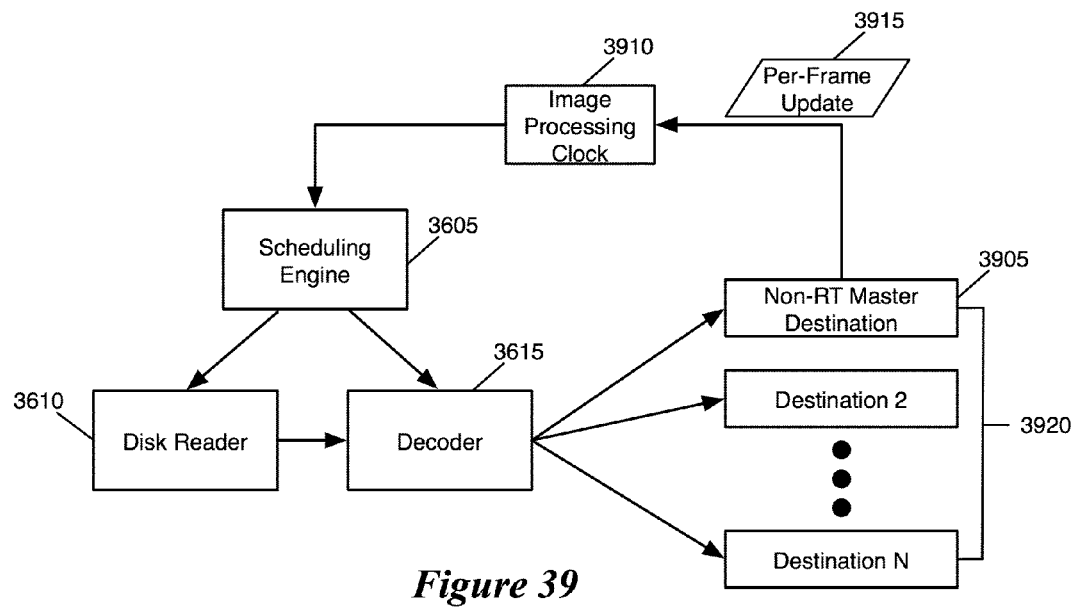
FIGS. 39 illustrates different clock mechanisms that are used by the scheduling engine of some embodiments, depending on whether one or more of the image destinations is a real-time destination or not.
Figure 41:
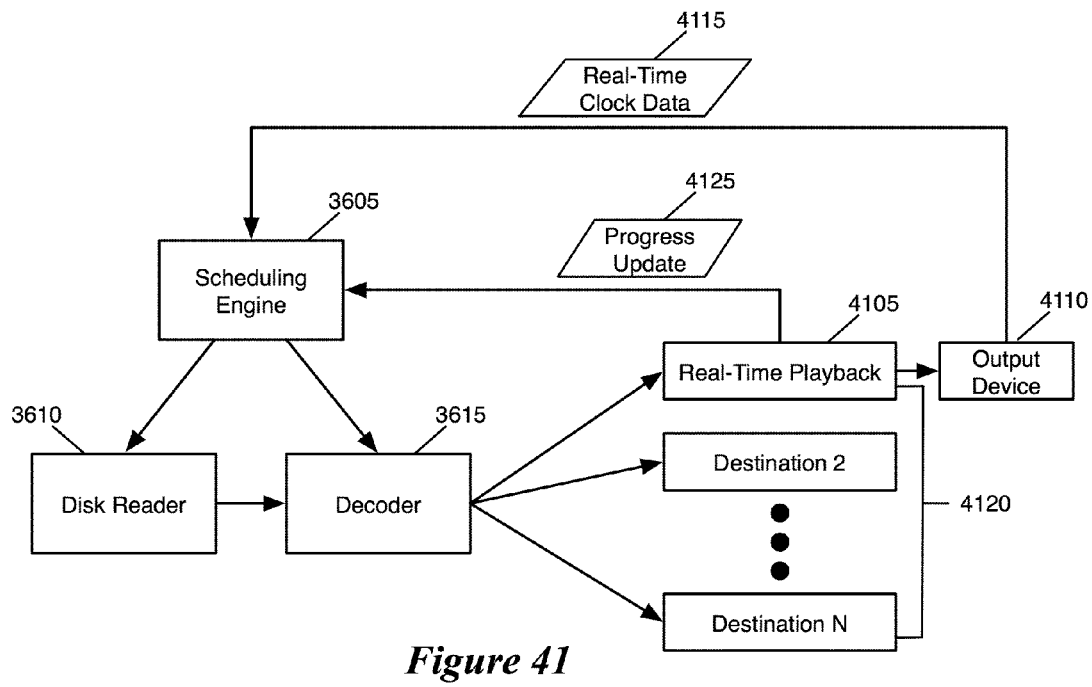
FIG. 41 illustrates different clock mechanisms that are used by the scheduling engine of some embodiments, depending on whether one or more of the image destinations is a real-time destination or not.

The discussion of FIG. 38 indicates that the scheduling engine may behave differently when scheduling image processing for a real-time destination (e.g., playback) as compared to when scheduling image processing solely for analysis destinations. FIGS. 39 and 41 illustrate different clock mechanisms that are used by the scheduling engine 3605, depending on whether one or more of the image destinations is a real-time destination or not. While these are shown as separate figures, the figures represent a single scheduling engine that is operable in either of the two modes.

FIG. 39 illustrates scheduling engine 3605, which manages disk reader 3610 and decoder 3615. For simplicity, the graphics processing operations (e.g., colorspace conversion, size conversion, etc.) are omitted from these diagrams. FIG. 39 also illustrates a set of destinations 3920 including a master destination 3905, as well as additional destinations, and an image-processing clock 3910. The master destination 3905 is a non-real-time destination, as are all of the other destinations. These destinations may be analysis destinations such as people detection, color balancing, shake detection, encoding destinations, background rendering, etc., so long as the destinations are not required to output images in real-time.

The master destination 3905 is in charge of updating the scheduling engine with its progress. In some embodiments, the destination expected to perform its operations the slowest is designated as the master destination by the scheduling engine. Some embodiments include a set hierarchy of operations stored for the engine, and the highest operation on this hierarchy is designated as the master destination. Other embodiments designate a master destination in other ways.

The image-processing clock 3910 is part of the scheduling engine in some embodiments, while in other embodiments provides data to the scheduling engine as shown in this figure. The image-processing clock is used specifically when there are no real-time destinations in some embodiments, and does not actually correspond to a real clock. Instead, each time the master destination 3905 completes the processing of a frame, the master destination 3905 sends an update 3915 to the image-processing clock. This causes the image-processing clock to increment itself by one.

The scheduling engine uses the image-processing clock to schedule its disk reads, decodes, and graphics processing operations in order to generate the images required by the destinations 3920. In some embodiments, the scheduling engine initially schedules a particular number of images to be sent to the destinations (e.g., five, ten, twenty-five, etc.). The number of such images may be dependent on the expected processing time for the master destination (e.g., the amount of time expected for the person detector to detect people in an average image) or the slowest of the destinations. This expected processing time may be a function of the particular destination, the processor speed and number of processors of the device performing the operations, as well as other factors.

Once the initial set of images are scheduled by scheduling engine 3605, the engine schedules a disk read for the next image once the image completion update 3915 is received by the image processing clock 3910. In some embodiments, the image-processing clock 3910 instructs the playback engine that the processing for the next image should be scheduled, and the scheduling engine then schedules the disk read operation for that next image. In other embodiments, the scheduling engine periodically checks the image-processing clock to determine whether an image has been completed by the master destination.

Figure 40:
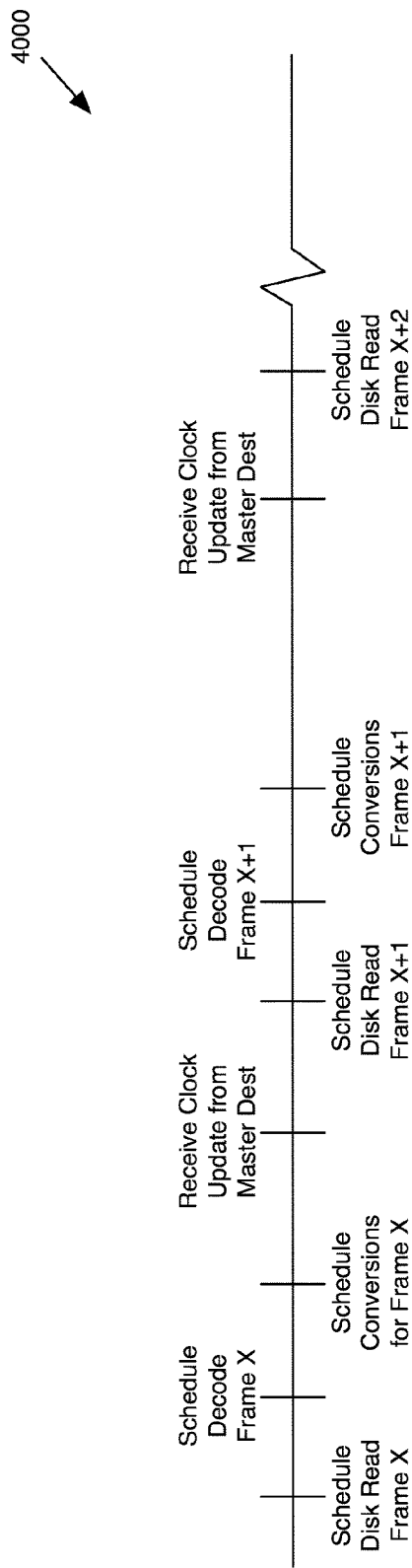
FIG. 40 illustrates a timeline for the scheduling engine of some embodiments when the engine is scheduling operations for non-real-time destinations.

FIG. 40 illustrates a timeline 4000 for the scheduling engine of some embodiments when the engine is scheduling operations for non-real-time destinations. As shown, the engine initially schedules a disk read, decode, and format conversions for frame X. In this figure, it is assumed that frame X is not in the initial set of images, but rather is somewhere in the middle of the set of images being processed. After a particular period of time, the scheduling engine receives an update from the master destination indicating that the destination has completed a frame. As a result of this update, the scheduling engine schedules a disk read, decode, and format conversions for the next image, frame X+1. After a second particular period of time, which is noticeably longer than the period of time after the frame X conversion, the engine receives its next clock update from the master destination. Despite the delay, the engine schedules the next image, frame X+2, upon receiving the update.

The delay could be caused by a different application, that runs on the same device as the media-editing application, making use of the processor for a period of time, thereby slowing down the media-editing application times. In addition, some embodiments prioritize different operations, with the analysis, encoding, and background rendering operations taking place in the background and being prioritized behind user interface and playback operations. Some embodiments pause the analysis operations and the disk read, decode, and graphics processing that feeds those operations when a user interacts with the media-editing application GUI or the application is playing back video and/or audio. In addition, some embodiments allow the user to pause these operations (for instance, to enable a different application to perform its operations without having to fight with the media-editing application for resources).

For non-real-time destinations, some embodiments try to keep the same number of images in the buffer at all times, and thus start the image preparation for a new image each time an update is received that the master destination has finished operations on a previous image. In the case that the non-real-time destinations are operating faster than the scheduler can prepare images, then these destinations may have to wait. However, generally the non-real-time destinations take longer to perform their operations than to prepare images for these operations. On the other hand, because the real-time destinations are less process-intensive, but often require more image preparation (e.g., compositing, etc.), it may be more difficult for the scheduling engine to keep up with the real-time requirement of these destinations.

FIG. 41, as mentioned, illustrates the scheduling engine 3605 in the situation in which at least one of the destinations is a real-time destination (in this case, real-time playback). Like FIG. 39, this figure illustrates the scheduling engine 3605 that manages disk reader 3610 and decoder 3615, and omits the conversion operations. FIG. 41 also illustrates a set of destinations 4120, including a real-time playback destination 4105. The real-time playback destination 4105 requires images at a particular rate (i.e., the frame rate of the media file, often 24 fps or 30 (29.97) fps). The additional destinations will often be additional real-time destinations. In some embodiments, because analysis and encoding operations on a media file are very processor-intensive and take significantly longer to complete than playback of the media file, the scheduling engine will schedule these operations separately from the real-time destinations even when analyzing the same media file that is also playing in real-time.

The real-time playback destination, as shown, outputs to an output device 4110. This may be a monitor with a refresh rate (e.g., 100 Hz), an audio output device with a sampling rate (e.g., 48 kHz), etc. These physical devices have their own internal clocks that operate at real-time (to handle the refresh rate, sampling rate, etc.). In some embodiments, one such output device sends its real-time clock information 4115 to the scheduling engine 3605 (or a clock module that is either a separate module such as image processing clock 3910, or part of the scheduling engine 3605) at regular intervals. Whereas image-processing clock 3910 is used specifically for non-real-time destinations only, the real-time clocking function is used only when at least one destination requires images in real time. In many cases the other destinations are operations that output information corresponding to the image displayed as part of the real-time playback (e.g., a color waveform or color histogram).

In addition, as shown, the real-time playback destination 4105 sends progress updates 4125 to the scheduling engine 3605. These progress updates 4125 indicate to the scheduling engine the status of the playback. In some embodiments, the progress updates simply state which images have been output; in other embodiments, the progress updates also include additional information such as the number of images stored in an output buffer of the playback destination.

The scheduling engine of some embodiments uses the real-time clock information and the progress updates from the playback destination to schedule its disk read, decode, and graphics processing operations in order to generate the images required by the destinations 4120. In some embodiments, the scheduling engine initially schedules a particular number of images to be sent to the destinations (e.g., five, ten, twenty-five, etc.). In some embodiments, this number is dependent on the buffer size of the playback destination.

Disk reads and subsequent operations are then scheduled based on the updates received by the scheduling engine. In some embodiments, there may be a number of reasons for the scheduling engine to drop frames. When the system is operating properly, the scheduling engine sends images to the playback destination at the requested rate, and the playback engine outputs the images at this rate. However, in some cases, the disk read, decode, and format conversion operations take too long (e.g., because the application is operating on a device without enough processing capability or whose processing resources are being used by other processes). In this case, the buffer of the real-time playback will become empty and it will not have images to output. In other cases, the real-time playback itself will run behind, even if the scheduling engine is preparing images at the needed rate.

Figure 42:
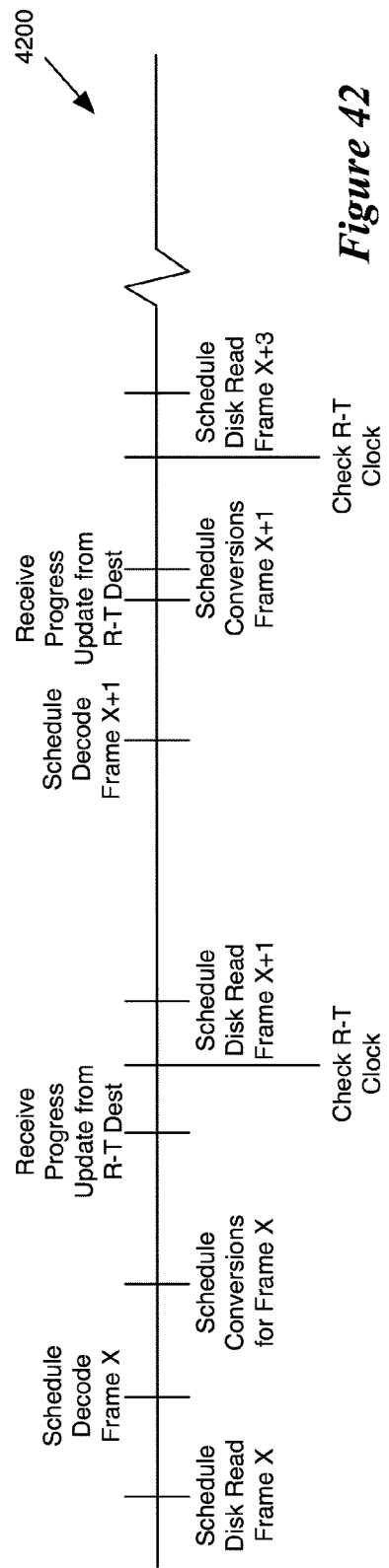
FIG. 42 illustrates a timeline for the scheduling engine of some embodiments when the engine is scheduling operations for real-time destinations.

FIG. 42 illustrates a timeline 4200 for the first of these failure modes. As shown, for the first image, frame X, the engine schedules a disk read, decode, and format conversions. As with timeline 4000, this figure assumes that frame X is not in the initial set of images that are scheduled in order to initially fill the playback buffer, but instead are somewhere in the middle of the playback of the set of media images. The engine receives a progress update from the real-time destination, indicating its playback state, and then checks the real-time clock before starting the next image. At this point, the operations are being performed in time, so no images are skipped and the engine can begin scheduling the disk read for the frame X+1.

However, in this case, the disk read for frame X+1 takes significantly longer to perform, and thus the scheduling engine cannot schedule the decode for frame X+1 as quickly as it would ideally. The decode also takes longer for frame X+1 than for the previous frame X, so that it has already received a progress update from the real-time destination before scheduling the conversions for frame X+1. At this point, the scheduling engine checks the real-time clock and determines that its scheduling is running behind the real-time requirement of the playback destination. As such, the engine next schedules a disk read for frame X+3, thus skipping an image in its processing. As noted, this illustrates the situation in which the disk read, decode, and graphics processing operations are unable to output images at the rate needed for playback, and thus images (in this case, frame X+2) are skipped (i.e., dropped). In many cases, for instance due to a spike in processor use by a different application, the scheduling engine will be required to skip numerous images, rather than just one image.

These timelines indicate a linear flow through the processing operations, in which all of the operations for a particular image are performed before moving onto the next image. In some embodiments, the scheduling engine actually schedules operations for later frames well before all of the processing operations for earlier frames have completed. As one example, the engine might schedule a disk read for frame 500, and then next schedule a decode for frame 475 and format conversion for frame 400. In addition, the scheduling engine may be scheduling disk reads and decodes from multiple different source files in order to create a single output image (e.g., when playing back a composited image). In such a case, the engine of some embodiments schedules separate disk reads and decodes for the source files based on an order indicated by a render graph for the output image. The render graph may indicate a compositing order (i.e., blend images A and B, then composite the blend with image C) for the various images, and the scheduling engine schedules the preparation of the images according to the compositing order.

III. Real-Time Editing and Playback

As described in the previous section, the scheduling engine of some embodiments determines which image of a media file should be output and schedules various operations to perform on the image in order to prepare the image for its output. These operations include reading the image in its encoded form from a disk, decoding the image, and performing graphics processing on the image (e.g., scaling the image, conforming the image, changing the colorspace, etc.).

Some embodiments include the ability, during playback, to dynamically respond to changes in a timeline that the media-editing application is playing back. As one example, a user might start the playback of a project (i.e., a composite presentation having multiple media clips) and then modify the project during the course of the playback. As the playhead moves through the timeline, the media-editing application plays the portion of the media file indicated by the project data at that time. In some embodiments, the application will work ahead and have images prepared for the upcoming media. However, if the user modifies that timeline during the course of the playback, the scheduling engine of some embodiments will schedule new operations so as to play the most updated version of the timeline. In some cases, as a user moves an anchored clip along a timeline such that the movement of the anchored clip intersects the playhead, the application will begin playing the anchored clip as soon as it intersects the playhead. When a clip is anchored above the primary timeline (also called the spine), the anchored clip will take precedence over clips at the same time in the primary timeline. Thus, when the playhead intersects an anchored clip, it will play the anchored clip. This assumes the anchored clip fills the output image and has not been transformed to take up only a portion of the output image, as well as that the anchored clip is opaque (i.e., does not have any transparency). In such a case, the application will play the composite image.

Figure 43:
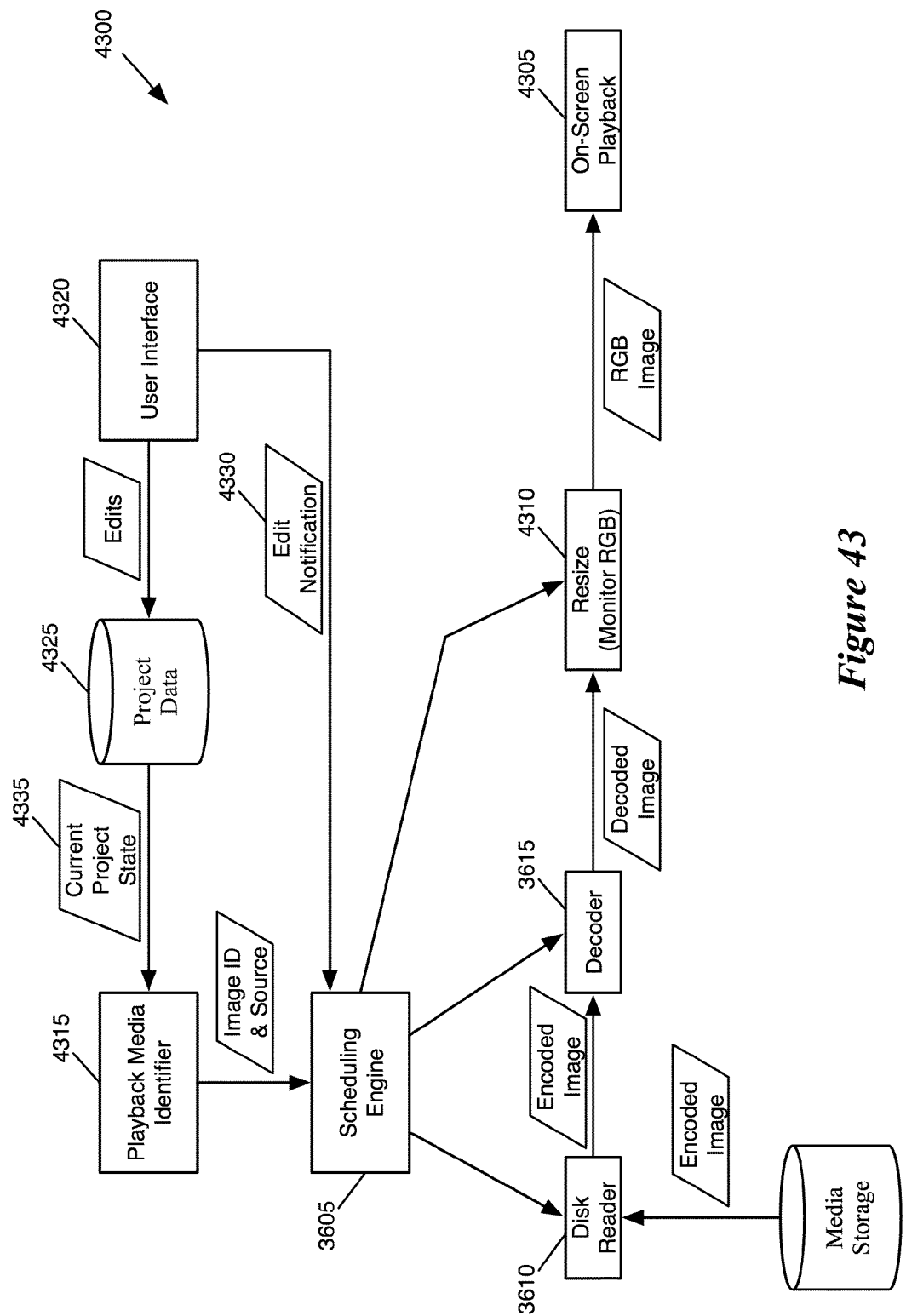
FIG. 43 conceptually illustrates the software architecture of a system that enables dynamic modification of the output.

FIG. 43 conceptually illustrates the software architecture of a system 4300 that enables such dynamic modification of the output. As with FIGS. 36 and 37 above, the system includes scheduling engine 3605, disk reader 3610, and decoder 3615, the operation of which has been described in detail above. FIG. 43 illustrates only one destination for simplicity, the on-screen playback 4305, for which a resize and conversion to the display device RGB colorspace is performed by operation 4310 (which may actually be separate operations in some embodiments).

The system 4300 also includes a playback media identifier 4315, a user interface 4320, and project data 4325. The project data 4325 is the data stored by the media-editing application about one or more projects, including a project being played back in the timeline. In some embodiments, the application stores the data for a particular project using the clip object data structures that are described above in Section I.E, which indicate all of the media used in the project as well as the hierarchy, compositing, timing, effect, etc. information about these clips that indicate how the clips are put together to create the project.

Through the user interface 4320, the user makes modifications to the project displayed in the timeline. The user interface processes user interaction, displays the results of the user interactions, and modifies the project data 4325 in accordance with the user interactions. These user interactions might include adding clips to the timeline, moving clips in the timeline, removing clips from the timeline, trimming clips, adding effects to clips in the timeline, transforming clips, etc.

The playback media identifier 4315 reads the current project state from the project data 4325 and informs the scheduling engine as to which image it should be scheduling and the source file for that image. That is, the playback media identifier 4315 identifies the upcoming media clips in the timeline based on the current location of the playhead, and from these identifies the media assets referenced by the upcoming media clips. These media assets in turn reference media files, and the range information stored in the media clips determine which portions of the media files should be read. Thus, the playback media identifier 4315 can request specific images from specific source files (i.e., images having a particular timecode in the source file). In some embodiments, the playback media identifier 4315 is actually a part of the scheduling engine 3605, rather than a separate module as shown.

The operation of the system 4300 will now be described. When a user interacts with the user interface 4320 by modifying the timeline displayed in the GUI, the user interface modifies the project data 4325 of the project currently displayed in the timeline. In addition, the user interface 4320 sends an edit notification to the scheduling engine 3605. This informs the scheduling engine that it will need to re-check the project data 4325 because the data has changed. In some embodiments, the scheduling engine reviews the project data, using the playback media identifier 4315, and schedules the playback ahead of time.

Some embodiments render portions of the project shown in the timeline ahead of time as the playhead moves through the timeline (i.e., faster than real-time), or render the project shown in the timeline in the background when not performing other actions, then store these render files either in volatile memory (e.g., RAM) or in the application folder structure. When portions of a project have been rendered ahead, the stored render files may be used for output. However, when a user is modifying the project in the timeline, such files may not be available. An example case of such user modification occurs when a user moves an anchored (e.g., B-Roll) clip across the playhead.

Upon receiving the edit notification 4330 from the user interface, the scheduling engine 3605 asks the playback media identifier 4315 for an update to the images (and their source files) that it will now need to schedule. The playback media identifier retrieves the current playback state 4335 from the project data 4325 (which is modified as the edits are made) and identifies the upcoming images for the scheduling engine 3605. Using this information, the scheduling engine 3605 can schedule disk reads, decodes, and format conversions for upcoming images. In some embodiments, the engine is predictive, and recognizes that the user is moving the anchored clip towards the playhead. Based on that movement, the playback media identifier recognizes that the anchored clip is likely to intersect the playhead shortly, and thus the scheduling engine is able to start performing disk reads, decodes, etc. for the moving clip's underlying media in advance of the actual intersection in the GUI of the clip and the playhead. When the clip and playhead intersect, the images have already been prepared for output. In addition, when the moving clip completely overrides the clips in the primary lane (i.e., the anchored clip is not transformed or composited with the primary lane clips), some embodiments recognize that the output image is the same regardless of where the clip is moved, and therefore will use any previously-generated background rendered files for the moving clip to display the clip.

Figure 44:
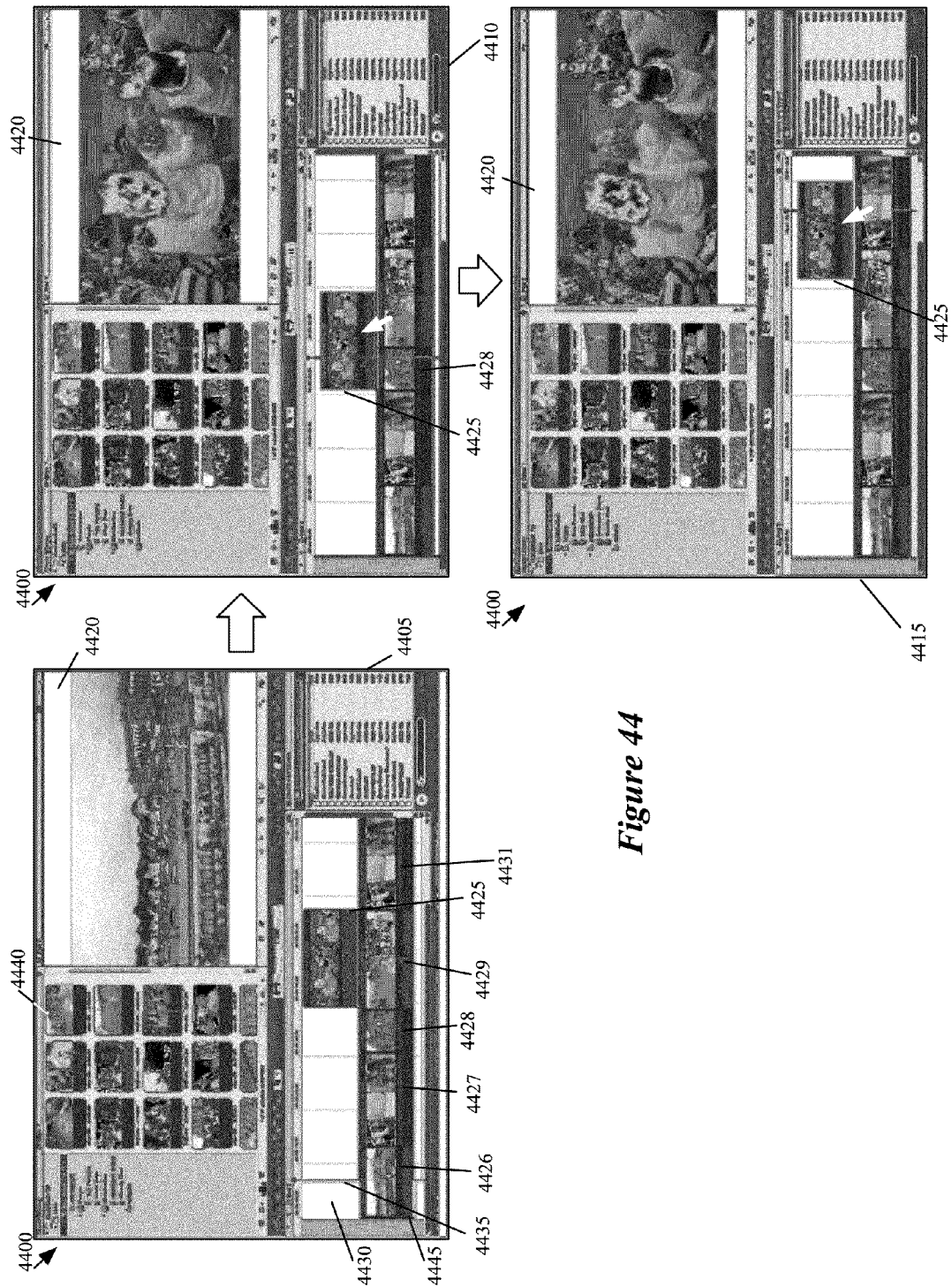
FIG. 44 conceptually illustrates a GUI of a media-editing application that displays results of editing operations in the preview display area as the editing operations are being performed.

FIG. 44 illustrates a GUI 4400 of a media-editing application that displays such results of editing operations in the preview display area as the user performs the editing operations. Specifically, FIG. 44 illustrates the GUI 4400 in three different stages 4405-4415 as a user moves an anchored clip 4425 along a timeline 4430 such that it intersects with the playhead 4435 that is moving through the timeline. The GUI 4400 includes similar features to those described above by reference to FIG. 3: a clip library and browser 4440, a preview display area 4420, and a timeline 4430.

The media-editing application of some embodiments allows the user to edit a media presentation by moving a media clip from one location to another location within a timeline or from an area out of the timeline into the timeline. For instance, the user can drag a media clip from the clip browser 4440 into a central compositing lane 4445 (i.e., the spine) or into an anchored lane. Some embodiments show the composite result of the editing operation performed by moving media clips as the operations are being performed. More specifically, the media-editing application of some embodiments displays in the preview display area 4420 a composite image represented by a point along the timeline 4430 as the playhead 4435 moves to the point and intersects with a media clip that is being moved.

As the playhead 4435 moves along the timeline 4430 (i.e., as the media-editing application plays back the media presentation), the media-editing application displays a composite frame of the media presentation represented by a point along the timeline 4430 at which the playhead 4435 is positioned at that moment. When any part of a media clip occupies a point along the timeline 4430 at the moment the playhead 4435 is passing the point, the media-editing application will factor that media clip into the composite image displayed for that point. When a media clip is in an anchor lane above the primary lane, the output image will be that of the anchor lane (unless there is a blend or other compositing operation defined between the two images).

In the first stage 4405, the timeline 4430 displays an anchored media clip 4425 and media clips 4426-4429 and 4431 within the primary compositing lane. At this point, the media-editing application is playing back the media presentation and thus the playhead 4435 is moving to the right through the timeline 4430. The playhead 4435 currently is in the middle of the media clip 4426, and thus the preview display area 4420 displays an image of the media clip 4426 that corresponds to the portion of the media clip at which the playhead is currently located.

In the second stage 4410, the user has selected the media clip 4425 and is dragging the media clip 4425 to the left such that the playhead that is moving to the right intersects with the media clip 4425. As the clip 4425 is in the anchor lane, the preview display area 4420 displays the image from this clip, rather than clip 4428. At this point, the playhead 4435 is continuing to move to the right to play the presentation. In some embodiments, as soon as the playhead intersects the front edge (in point) of clip 4425, the playback image displayed in the preview display area changes to that of the anchored clip 4425.

In the third stage 4415, the user is dragging the media clip 4425 to the right along with the playhead 4435. As with stage 4410, the media-editing application displays an image from the media file represented by clip 4425 in the preview display area 4420. This is a different image than shown at stage 4410, as the playhead is located over a different portion of the clip 4425. In theory, a user could drag the anchored clip to the right at the same rate as the playhead, and the application would display the same image in the preview display area the whole time.

Figure 45:
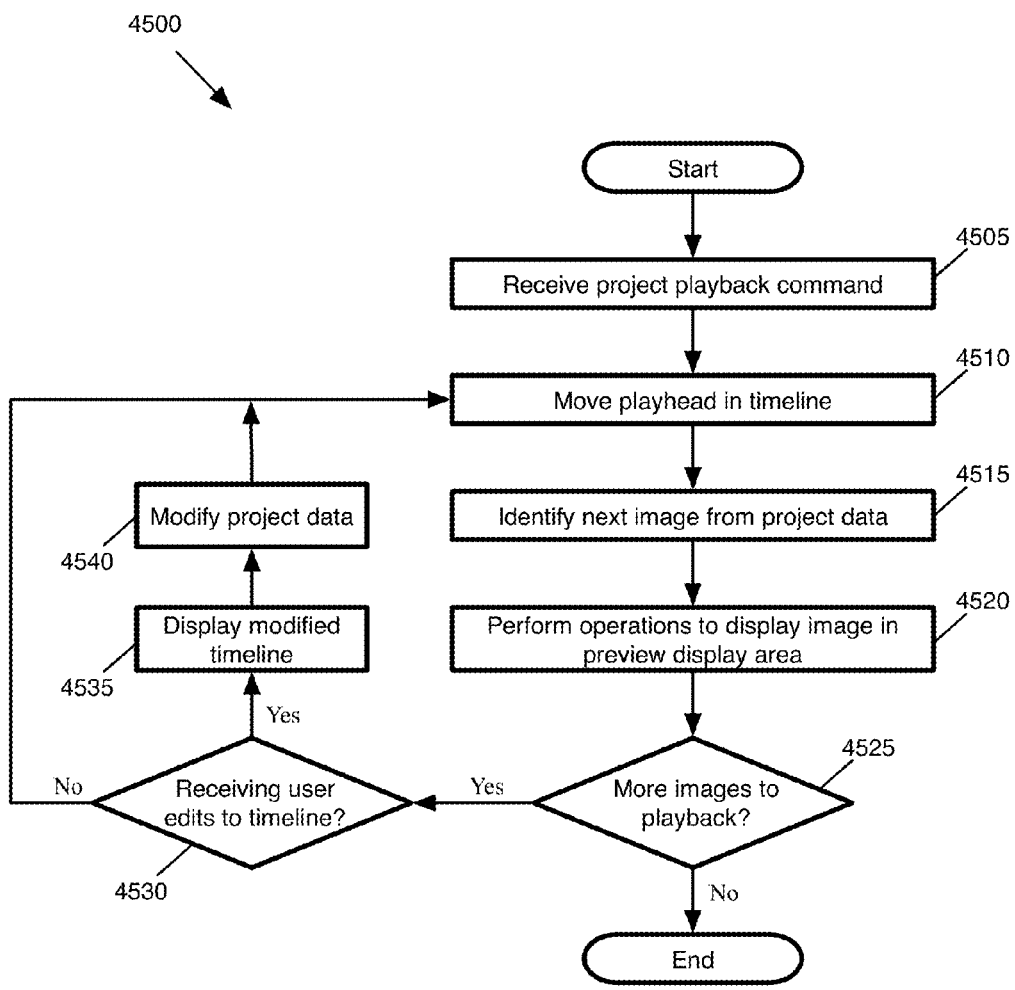
FIG. 45 conceptually illustrates a process for incorporating edits into playback of a video sequence in real-time.

FIG. 45 conceptually illustrates a process 4500 for incorporating edits into playback of a video sequence in real-time. In some embodiments, some or all of the process 4500 is performed by a media-editing application's scheduling engine, user interface, and associated functions. As shown, the process 4500 begins by receiving (at 4505) a project playback command. In some embodiments, the user commands the media-editing application to play back the contents of the timeline. The playback may start at the current location of the playhead in the timeline, or at the beginning of the project (i.e., time=0).

The process moves (at 4510) the playhead in the timeline. The media-editing application displays the movement of the playhead at a rate representative of real time. That is, in a particular amount of actual time, the playhead moves over a portion of the timeline representative of that particular amount of time. In this process, the operation 4510 indicates a movement of one image (i.e., $\frac{1}{24}^{th}$ of a second for 24 fps video) in the timeline.

The process also identifies (at 4515) the next image from the project data. In some embodiments, the project data is kept up to date with updates to the project as the user modifies the clips in the project. When playing back a project, the application makes sure that the image being displayed is the correct image for the most up-to-date version of the project data. In some embodiments, when the project data changes, the scheduling engine that manages the images for display receives an indication that this change has been made and retrieves the new project data (i.e., as shown in FIG. 43 above). These changes may include movement of clips in the timeline, adding clips to the timeline, removing clips from the timeline, adding effects to clips, etc.

With the image identified, the process 4500 performs (at 4520) operations required to display the image in the preview display area. This may involve a disk read operation, decode operation, any graphics processing operations to generate a proper format image or combine images, etc. In some embodiments, the image will have already been generated by a background rendering process or by pre-rendering during playback and at this stage the application just reads the generated image (e.g., from memory) and outputs the image.

The process then determines (at 4525) whether any more images need to be played back. If the user pauses the playback, then (at least temporarily) the application can cease outputting images. In addition, if the playhead reaches the end of the timeline, then playback will cease unless the user has set the application to playback the timeline in a continuous loop. When no more images remain, the process 4500 ends.

When additional images remain, the process determines (at 4530) whether any user edits to the timeline are being received. These edits may be the addition of effects, transitions, titles, etc., the movement of clips, trimming of clips, removal of clips, or other edits that affect the project displayed in the timeline.

When no such edits are received, the process returns directly to 4510 to move the playhead and identify the next image. However, when edits are received, the process displays (at 4535) a modified timeline and modifies (at 4540) the project data. The modified display may involve the movement of a clip, the indication of an effect, etc. With the modification performed, the process proceeds to 4510 to move the playhead and identify the next image.

IV. Project Library and Missing Media

As described in Section I.E above, the media-editing application of some embodiments stores a set of data structures that include assets stored in events and a hierarchy of clips that refer to those assets. In addition to the component clips (that directly refer to a single asset), some embodiments include compound clips. Compound clips are clips that appear as a single clip when inserted into a larger presentation, but actually contain multiple clips and can be edited in the same way as a presentation. Some embodiments use the same clip data structure for the compound clips as for component clips.

In addition, some embodiments allow the user to define projects. As described above, some embodiments store a project as a separate class of data structure, similar to an event but with only one sequence data structure for the project. Some embodiments store properties of the project in this data structure (e.g., the video properties such as frame rate, video format, etc.), though others assign these properties to the sequence data structure for the project. A project will have a specific designation as such, and some embodiments include a project library that allows users to view an overview of their projects, and switch between projects. FIGS. 46-51 illustrate the use of the project library for various tasks, including creating a new project and restoring missing references in a project.

Figure 46:
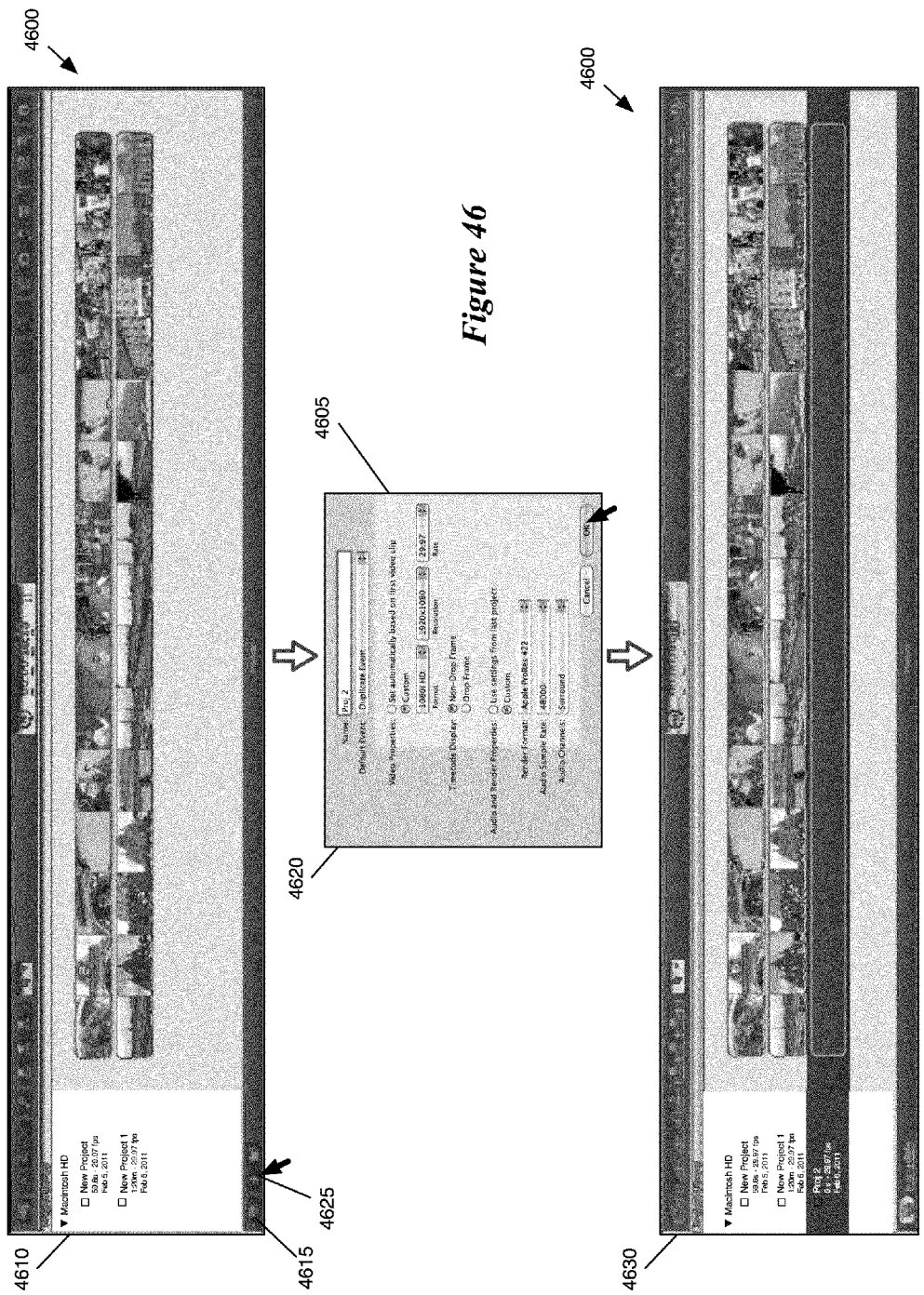
FIGS. 46-51 illustrate the use of the project library for various tasks, including creating a new project and restoring missing references in a project.

FIG. 46 illustrates the creation of a new project in the GUI of a media-editing application of some embodiments using the project library 4600 in three stages 4610-4630. Specifically, the stages illustrate the opening of a project creation dialog box 4605 and the use of that dialog box to create the new project.

The first stage 4610 illustrates the project library 4600, which occupies a portion of the media-editing application GUI (similar to the GUI 300 of FIG. 3). In some embodiments, the project library is interchangeable with the timeline (i.e., the application will either display the timeline or the project library in the bottom of the GUI). In this example, the GUI includes a project library toggle item 4615 that allows a user to toggle between the timeline and the project library in this section of the GUI and a new project user interface item 4625 the selection of which begins the process for creating a new project. Some embodiments provide these options as different types of selectable items, as menu selections, as hotkey selections, or a combination thereof.

The project library 4600 displays a list of projects at its left side. In this case, there are two projects that have been previously created. For each project, the library displays a filmstrip as a set of images for the project. In some embodiments, these images represent frames from the composite presentation that are evenly spaced throughout the project. As shown at stage 4610, the user has placed a cursor over the new project user interface item 4625 and selected this item, in order to create a new project.

The second stage 4620 illustrates a dialog box 4605 that appears when the user selects the item 4625. This dialog box allows the user to enter information about a new project. The user can enter a name for the project (in this case, "Proj 2"), select a default event for the project, and set video properties, render properties, and audio properties. The default event, in some embodiments, is the event to which the project automatically imports a media file when a user edits the media file into the project from a source other than an event. For instance, a user might drag and drop a video or audio file (e.g., from their desktop or other folder) into the timeline for a project. Doing so, in some embodiments, will cause the application to automatically import the file as an asset of the default event and create the requisite data structures for the media file (as opposed to prohibiting the action or querying the user for a desired event).

As shown, the user can also either select to use the video properties of the first clip added to the project as the video properties for the project, or choose custom properties. In this case, the user has chosen custom properties. The format field lets the user choose a format (e.g., 1080p, 1080i, 720p, various standard definition formats, etc.) for the project. The options presented in the resolution and rate fields are dependent on the selected format. For the selected 1080i, for example, the resolution options are 1920×1080, 1440×1080, and 1280×1080, and a variety of frame rates are available.

The audio and render properties include a render format (in this case, the user has chosen Apple ProRes 422, though other options are available). The render format, in some embodiments, is the encoding format used for cache files that are prepared to simplify playback (i.e., prepared ahead of time and used during playback). The audio properties include an audio sample rate, and the choice between surround and stereo for audio channels. The user can also choose to use the settings from the most recently created project.

The third stage 4630 illustrates the result of the user selecting OK in the dialog box 4605 in order to create the new project "Proj 2". The project library now shows a third project, the newly created "Proj 2". At this point, the user has not yet added any media clips to the project, so the filmstrip is blank.

Figure 47:
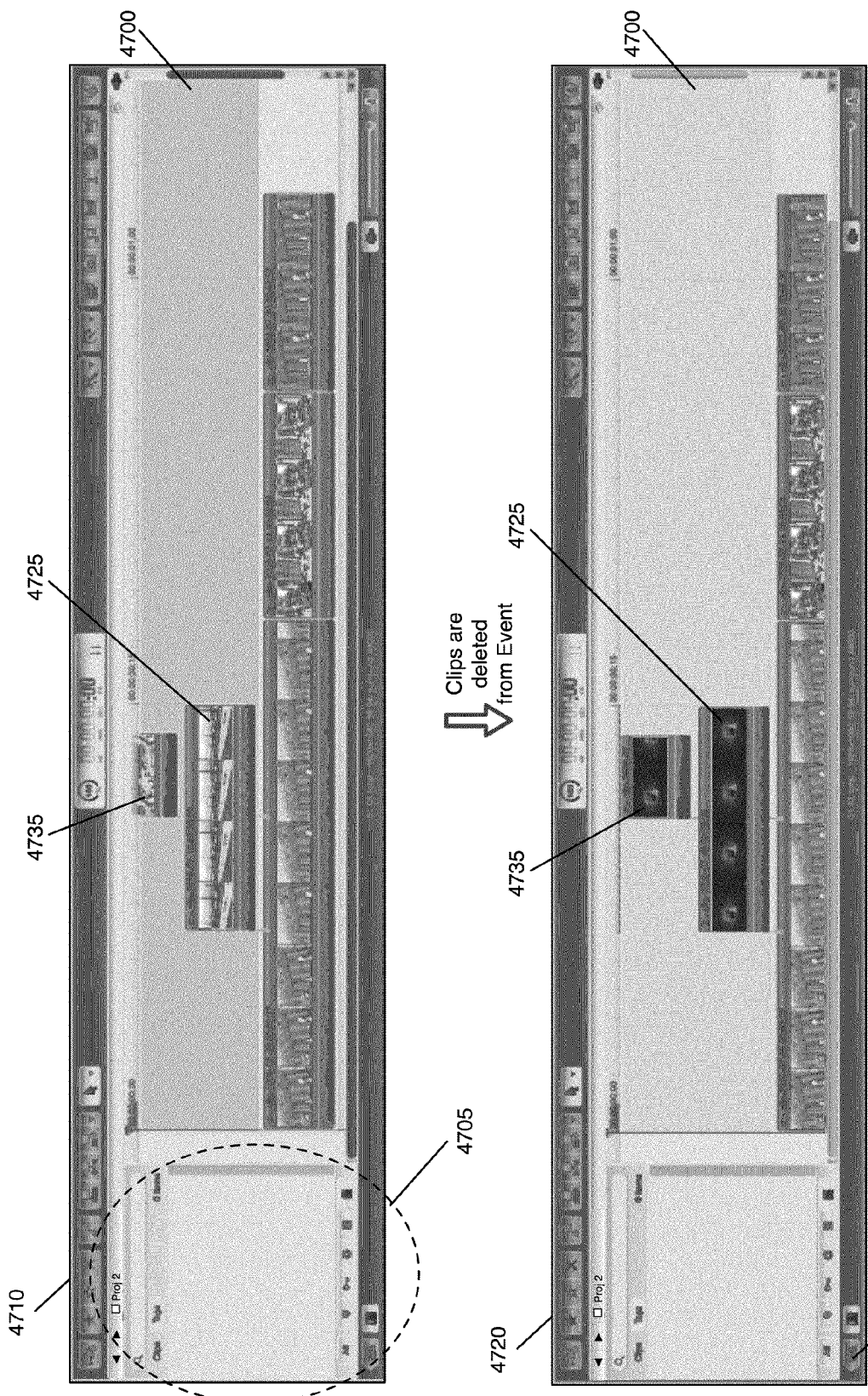

FIG. 47 illustrates two stages 4710 and 4720 of a timeline 4700 (similar to the timeline 315 of FIG. 3) showing the result of deleting clips from an event that are referenced by the project displayed in the timeline. As shown in project information display area 4705, the timeline is displaying "Proj 2". To arrive at the first stage 4710, the user could have selected the project library toggle item 4615 to close the project library and display the timeline 4700 in the same place in the media-editing application GUI as the project library was displayed, then added clips from the clip browser to the project. The user has added three clips to the primary compositing lane as well as two anchored clips 4725 and 4735.

The second stage 4720 illustrates the timeline 4700 at a later stage at which point the project is unable to find the assets associated with the two anchored clips 4725 and 4735. As described above, each clip includes an asset reference that stores an event ID and an asset ID. The clips will appear as missing when the event cannot be located (e.g., if the user has deleted the event), if the asset cannot be located (e.g., if the user has deleted the asset from the event (by deleting the clip containing the asset)), or if the particular file cannot be located (e.g., because the user has deleted the file or because the application is using low-resolution files and none has been created for the particular asset). In this case, a missing clip image is shown for the clips 4725 and 4735, because the user has deleted the assets that the clips reference.

Figure 48:
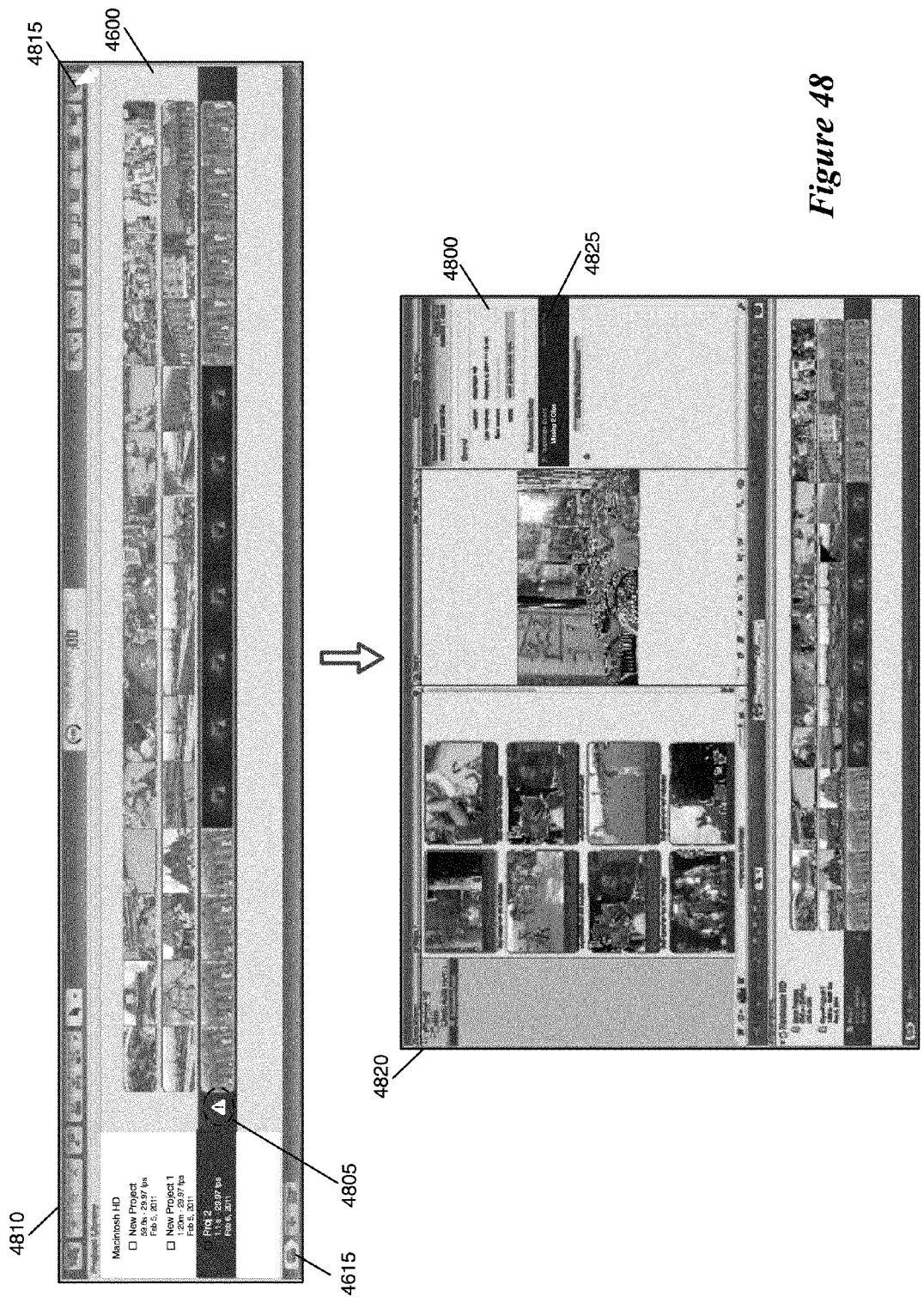

FIG. 48 illustrates two stages 4810 and 4820 of a GUI 4800 that includes the project library 4600. The first stage 4810 illustrates only the project library 4600, which a user may have accessed from stage 4720 by selecting the project library toggle item 4615. At the locations in the filmstrip that represent the times occupied by the missing anchored clips, the media-editing application displays the missing clip image to indicate that the required media is unavailable. In addition, the project library displays an exclamation icon 4805 to indicate that there is a problem in the project. The first stage 4810 illustrates that the user selects a toggle inspector item 4815. With the project "Proj 2" selected in the library, selecting the toggle inspector item brings up the project inspector in inspector display area 4825 of GUI 4800, as shown at stage 4820. The information displayed in this inspector will be described further by reference to FIG. 49.

Figure 49:
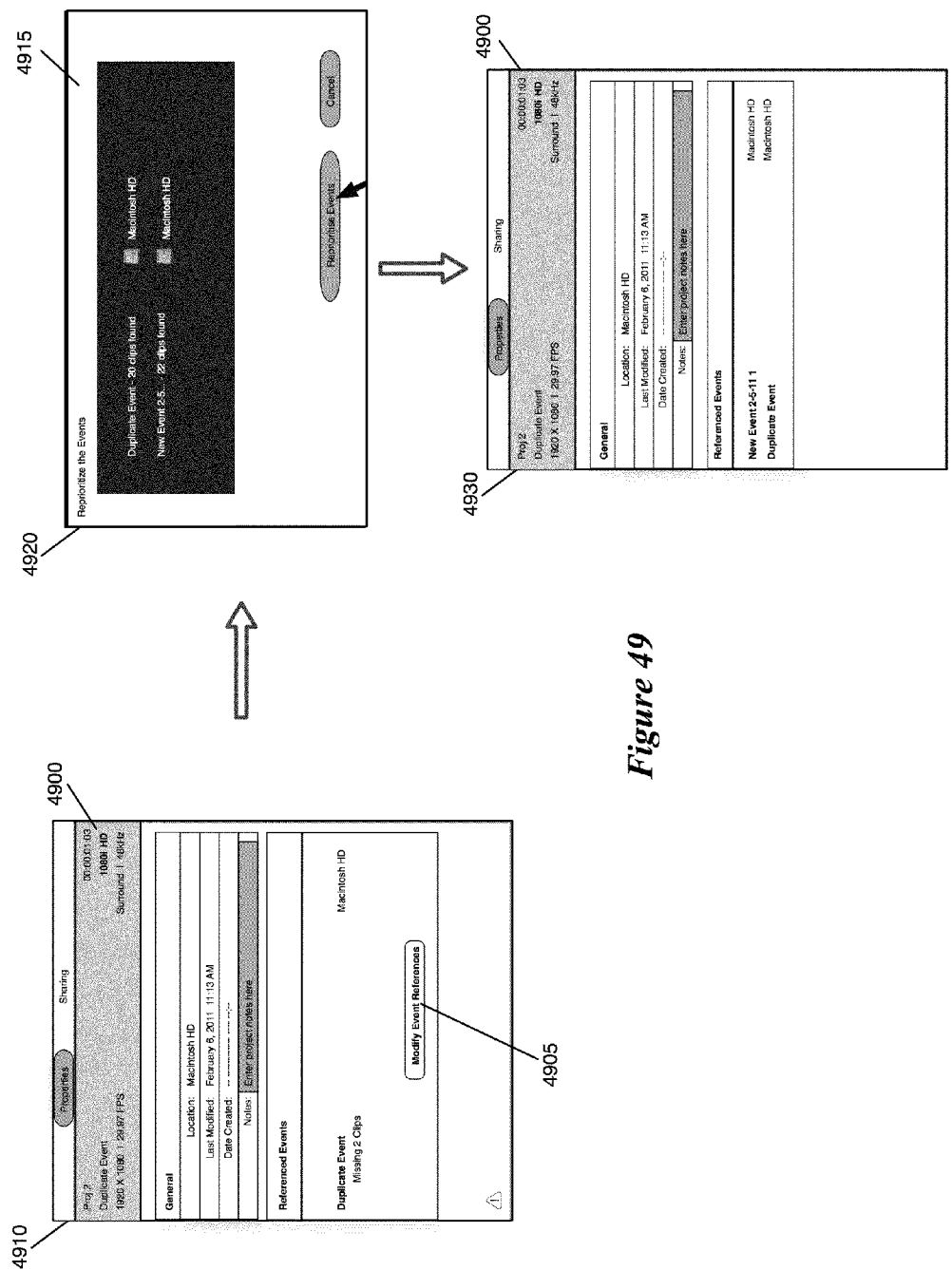

FIG. 49 illustrates a workflow used in some embodiments for restoring missing clips using the project inspector 4900, shown in three stages 4910-4930. The first stage 4910 illustrates the project inspector 4900, which displays various information about the selected project "Proj 2". The top displays the video and audio properties of the project, as well as the default event for the project. The middle section displays the drive on which the project data is stored, the creation date and last modification date of the project, and a field into which the user can enter notes about the project. The bottom section of the inspector displays a list of referenced events and any errors detected. In this case, the inspector indicates that all of the clips in the project are from the event "Duplicate Event" and that two clips in the event are missing.

As the inspector indicates specifically that clips are missing, this indicates that the application can find the event but not the clip. When trying to resolve a clip in a project, the application looks at the asset reference stored in the clip data structure, which stores an asset ID and an event ID. The application determines an event in which the asset should be located using the event ID, then searches within that event to find the asset using the asset ID. As this shows that the two clips are missing, the application has found the event "Duplicate Event", but two of the clips are not there (i.e., the assets are missing).

Returning to stage 4910 of FIG. 49, the inspector displays a selectable item 4905 labeled "Modify Event References" that provides the user with the capability to restore the missing references if suitable assets can be found in other events stored in the application. At this stage, the user is selecting the reference modification item 4905.

The second stage 4920 illustrates a reference modification dialog box 4915 of some embodiments displayed in response to the user selection of item 4905. The application detects additional events currently stored in the application's folder structure and lets the user prioritize the events. In some embodiments, each listed event is a selectable item that the user can drag up and down in order to set a priority for the events. The user can also remove events in order to exclude the use of those events by the project (e.g., if the user intends to delete one of the events, or knows that the event is unrelated to the project). As shown, the user is leaving "Duplicate Event" as the highest priority event, and "New Event 2-5-11 1" as the lower priority of the two. The application has found 20 clips in "Duplicate Event" and 22 clips in "New Event 2-5-11 1".

When the user selects "Reprioritize Events", the application searches for each asset referenced by the project. The application, in searching for a particular asset, first searches the highest priority event for that asset, then the second highest priority event, and so on down the list until the application finds the asset or all listed events are searched. When the asset is found, the asset reference for the media clip is modified to reference the asset ID of the newly identified asset and the event ID of the event to which that asset belongs. In this case, the two missing clips are both found in the event "New Event 2-5-11 1".

Figure 50:
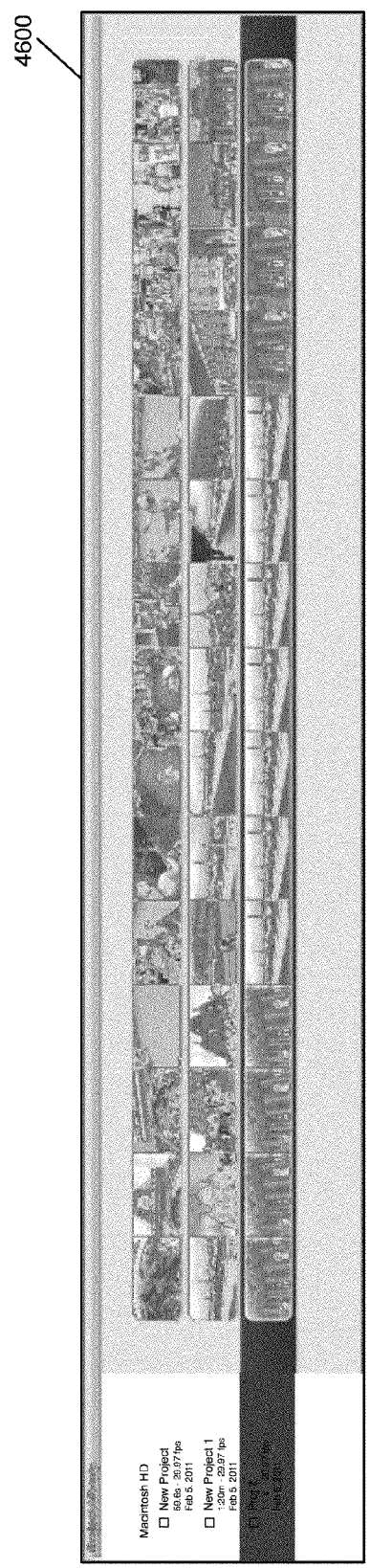

Thus, at the third stage 4930, the project inspector 4900 indicates that two events are referenced: "Duplicate Event" for the clips in the primary compositing lane, and "New Event 2-5-11 1" for the anchor clips. FIG. 50 illustrates the project library 4600 now that the missing assets have been restored. The filmstrip for "Proj 2" now displays images from the project through the middle, rather than displaying the missing clip image.

Figure 51:
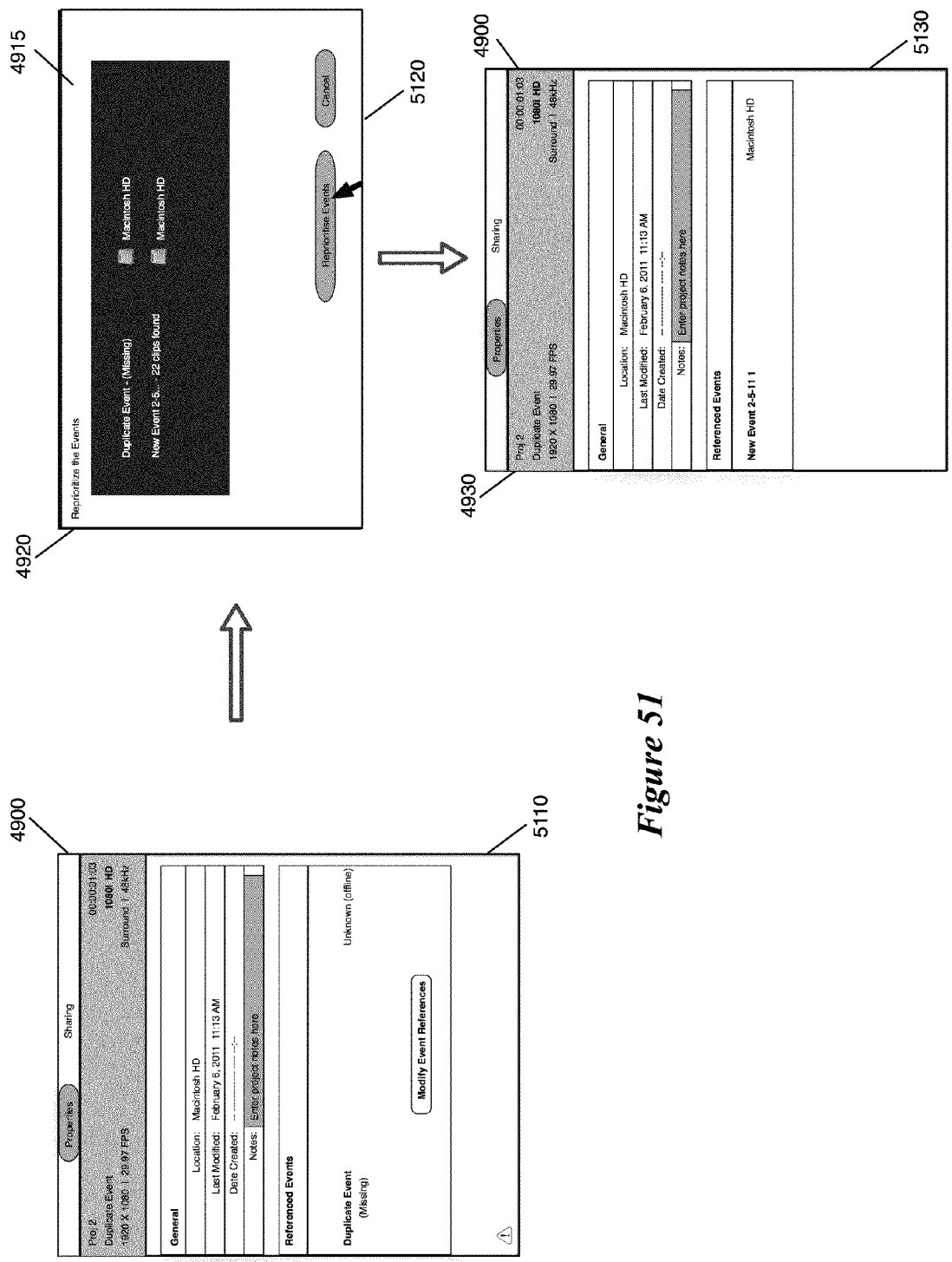

FIG. 51 illustrates a similar workflow of some embodiments for restoring clips that are missing due to a missing (e.g., deleted) event, in three stages 5110-5130, using the project inspector 4900. The first stage 5110 illustrates the same information as in the first stage 4910 of FIG. 49, except that rather than state that the referenced event for "Proj 2" is missing a particular number of clips, the inspector indicates that the event itself is missing. As in the case of FIG. 49, selecting the modify event references button brings up the reference modification dialog box 4915 in stage 5120. This time the dialog box includes the same two selectable items, but with the "Duplicate Event" listed as missing. The selection of "Reprioritize Events" by the user causes the application to search for the assets needed for the current project ("Proj 2") in the other events. In this case, the application finds all of the needed assets in the event "New Event 2-5-11", and thus stage 5130 shows that the project inspector 4900 lists this event.

Additional failure modes may occur when an asset can be found, but the underlying media file is unavailable. In some cases (shown below in Section V), this is because a particular size of transcoded media file is requested but unavailable. In some cases, the original media file was never copied to the application, and the media clip still references a file stored on a camera. When the camera is disconnected from the media-editing application, the application of some embodiments will indicate a missing camera failure mode.

V. Switching Between High- and Low-Resolution Editing

As shown above, the media asset data structures of some embodiments reference both high-resolution (i.e., original media or a full-resolution transcode) and low-resolution (i.e., a low-resolution transcode) versions of the underlying media. The media clips refer to these media asset data structures, but editing operations are performed on the clips irrespective of whether the actual media will be in full-resolution or low-resolution. The application generates a render graph for each image in a composite presentation based on the media clips that does not factor in which size images will be used. The asset then acts as a multiplexer to select one or the other source files based on the application settings. In some embodiments, this enables the media-editing application to seamlessly switch between using high-resolution and low-resolution images for playback during the editing process, without having to generate any new project data.

While this description, and much of this section, refers to an asset storing references to two sizes of transcoded media, in some embodiments the asset stores references to a variety of sizes (sometimes called representations). For example, some embodiments allow a user to specify the different media sizes that will be used, and can then switch between any different media sizes they have created for the media files used in a project (e.g., if the original media is captured by a cinema digital camera at a 4K resolution, the user might want to define a first proxy resolution of 1920×1080 and a second proxy resolution of 1280×720 and thus the asset would store references to media files for all three of these resolutions and the user could flexibly switch between them).

In some embodiments, regardless of the source file resolution used for playback, a project has video properties that define an output resolution (e.g., using the video properties for a project shown in FIG. 46). The user defines editing operations (e.g., blur operations, transform operations, etc.) at this resolution, and the application will produce output for the defined resolution. If, for example, the video properties define a resolution of 1920×1080, but the application uses a media file with images having 960×540 pixels, then some embodiments transform between the requested output image size and the source pixel size. To enable this, some embodiments use a pixel transform that defines a transform between an image space (i.e., having the requested output size) and a pixel space of an image. The pixel transform of some embodiments is described in detail in United States Patent Publication No. 2009/0244081, which is incorporated herein by reference.

A. Selection of High-Resolution and Low-Resolution Editing

Some embodiments provide a user interface feature that allows a user to quickly modify the playback quality used by the media-editing application. A user might want to switch to playing back video using a lower resolution source file when on a computer with less processing speed (e.g., a laptop) or while also performing various additional tasks on a faster computer. For instance, if performing various analysis tasks in the background (e.g., person detection, color balancing, etc.), the user might want to save processing and memory resources by switching to low-resolution editing.

Some embodiments provide a set of playback quality options from which a user can select a playback quality (i.e., switch between different resolution modes). As described above, some embodiments store up to three versions of each media file imported by the application: a copy of the original media file, a high-resolution transcoded of the media file, and a low-resolution transcode of the media file.

Figure 52:
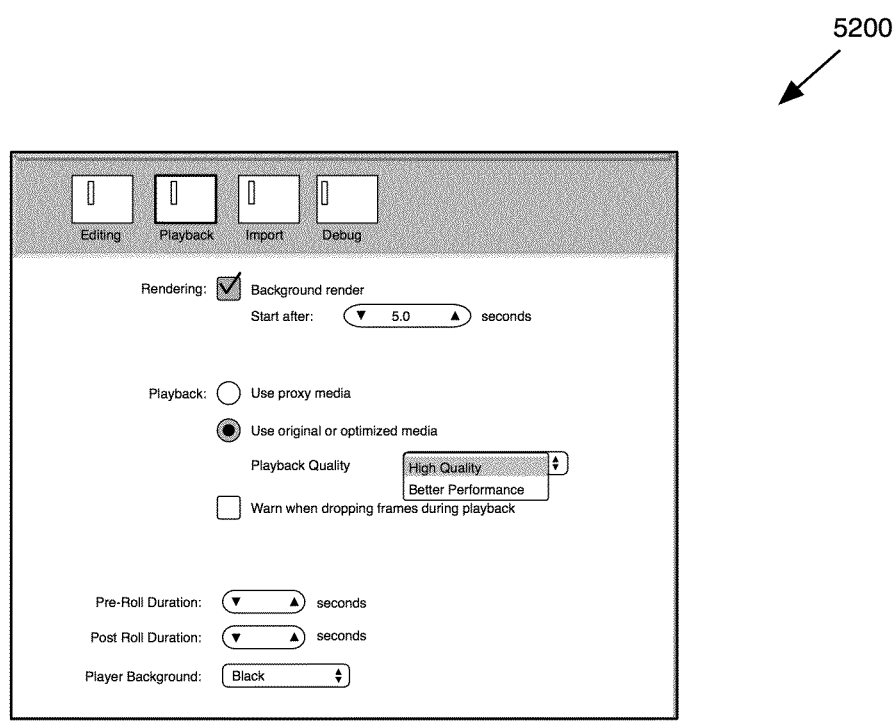
FIG. 52 illustrates the user interface selection options of some embodiments for different levels of playback in a menu.

FIG. 52 illustrates the user interface selection options of some embodiments in a menu 5200. In some embodiments, the user accesses the menu 5200 by selecting an option in the media-editing application GUI to modify the application preferences. As shown, the menu 5200 includes selectable items for editing preferences, playback preferences (currently selected), import preferences, and debug preferences.

Within the playback preferences menu 5200, options for different playback options are provided. Radio buttons allow a user to select between two different media sizes (low- and high-resolution). The proxy media of some embodiments is a low-resolution transcode (e.g., 960×540 pixels), while the original and optimized media may be at a higher resolution (often 1920×1080 pixels). The user might choose to use proxy media because that is the only media available to the user, the processing speed of the user's computer is better suited to handling low-resolution media, the user plans on performing various other resource-intensive tasks on the computer while also using the application, etc.

In addition to selecting which type of media should be used, some embodiments provide a playback quality selection option when using high-resolution media. In some embodiments, the media-editing application can either decode the encoded media at full resolution (e.g., 1920×1080) or at a lower resolution (e.g., 960×540). In this case, the high quality option corresponds to a full resolution decode and the better performance option corresponds to a lower resolution decode. Like using the low-resolution media, the low-resolution decode option is useful when working on a computer with lower processing speed, but no proxy media is available. Some embodiments provide a tool within the user interface (e.g., in the timeline or project library display area) that allows the user to toggle between low-resolution and high-resolution editing and playback. Such a user interface tool might be a toggle with two settings, or provide a choice of three settings. In some embodiments, a user can use hotkeys to switch between resolution settings.

While FIG. 52 illustrates a playback settings tool that sets the resolution used for any project edited with the application, in some embodiments the application stores modifiable data for each project indicating whether the project should be played back using high- or low-resolution images. For example, a user could have a first project for which the application always uses high-resolution media and a second project for which the application always uses low-resolution media. The user could switch this property of the low-resolution project, for instance, to use high-resolution media when additional computational resources are available.

Figure 53:
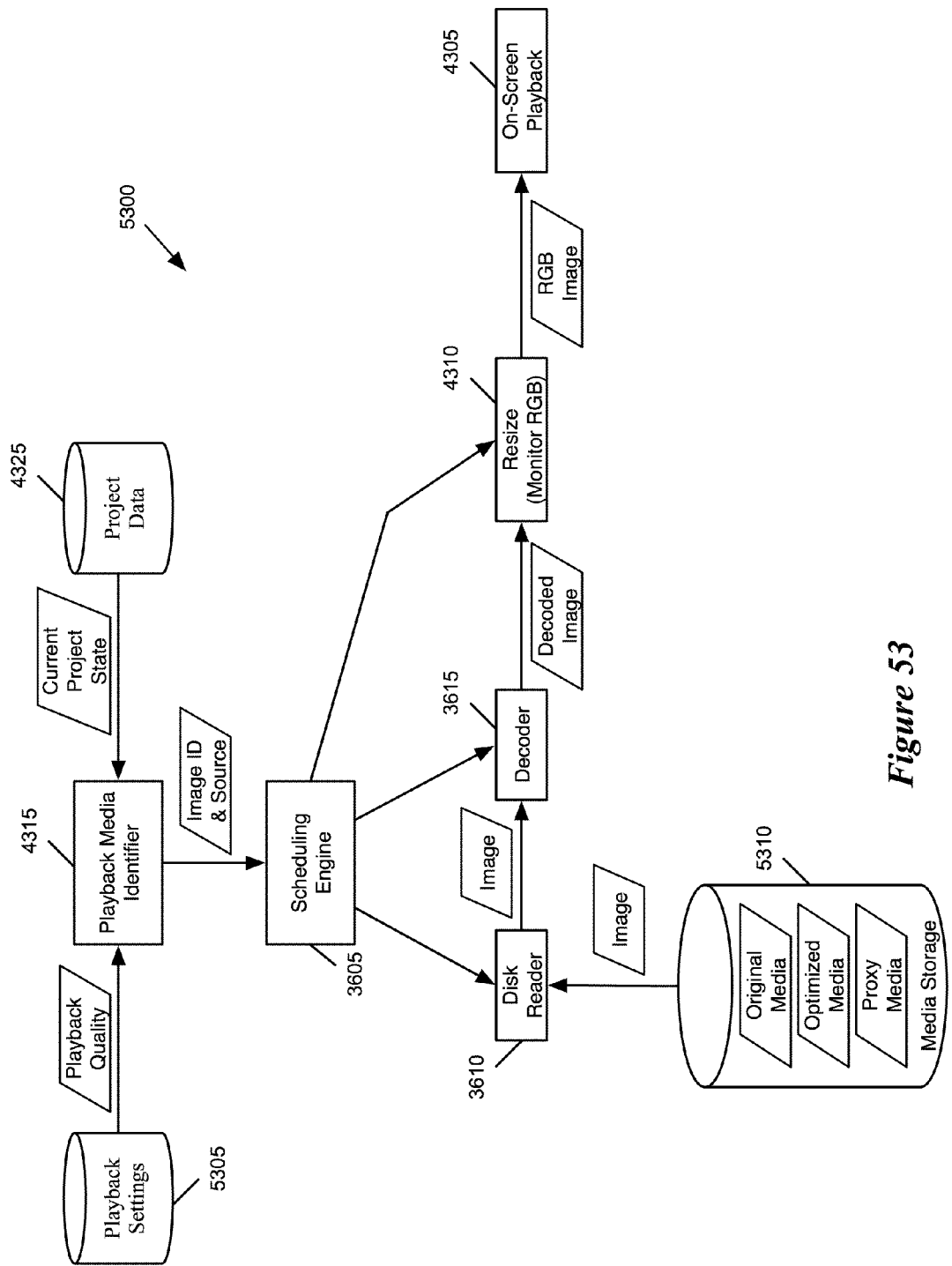
FIG. 53 conceptually illustrates the software architecture of a system that enables seamless transitioning between high- and low-resolution editing.

FIG. 53 conceptually illustrates the software architecture of a system 5300 that enables such seamless transitioning between high- and low-resolution editing. As with FIGS. 36, 37, and 43 above, the system includes a scheduling engine 3605, disk reader 3610, and decoder 3615, the operation of which has been described in detail above. As with FIG. 43, FIG. 53 illustrates only the on-screen playback destination 4305, for which a resize and conversion to the display device RGB colorspace is performed by the operation 4310.

The system 5300 also includes a playback media identifier 4315 and project data 4325, also described above by reference to FIG. 43. The playback media identifier 4315 reads the current project state from the project data 4325 and informs the scheduling engine as to which images it should schedule (i.e., which images are coming up in the playback) and the source file for that image (or multiple source files, if a composite image).

The playback settings 5305 indicate a playback quality to the media identifier 4315. In some embodiments, this indicates whether the media identifier 4315 should instruct the scheduling engine 3605 to use high-resolution or low-resolution media for playback. In addition, as shown in FIG. 53, it may also include information regarding whether a high-resolution or low-resolution decode should be used. The latter information allows the scheduling engine to schedule the correct decode operation.

The playback media identifier 4315 receives (i) a setting indicating whether the application should retrieve high- or low-resolution media and (ii) project data (i.e., a set of data structures) that indicate the media clips and times within those media clips that go into generating an output image for a particular time. In some embodiments, this also indicates how the application will composite the images if multiple source files are referenced. In some embodiments, each media clip refers to a particular asset, as shown in Section I.E above. As illustrated in FIG. 21, the asset may refer to multiple versions of a media file. When the playback setting indicates low-resolution media, the media identifier 4315 determines whether the asset includes a reference to such media, and if so selects this media for the scheduling engine 3605. When the playback setting indicates high-resolution media, some embodiments first determine whether the asset refers to a high-resolution transcoded version of the media. If this is unavailable, the playback media identifier 4315 selects the original media for the scheduling engine 3605, if the original media is available.

With the media file selected, the scheduling engine can schedule a disk read operation to read the image from the appropriate file in the media storage 5310. As shown in this figure, the media storage 5310 of some embodiments stores original media, high-resolution transcoded media (optimized), and low-resolution transcoded media (proxy). The image read from the disk can then be decoded by decoder 3615 using the specified decode and prepared for output to a display device.

B. Image Processing for High-Resolution and Low-Resolution Playback

The above subsection described the selection of a high-resolution or low-resolution image for playback based on setting from the user. The following subsection describes how the media-editing application of some embodiments performs image-processing operations on the selected image. In some embodiments, these image-processing operations (e.g., blending of two or more images, blurring images, scaling images, etc.) are defined irrespective of the actual source file image size that the operations will receive.

Figure 54:
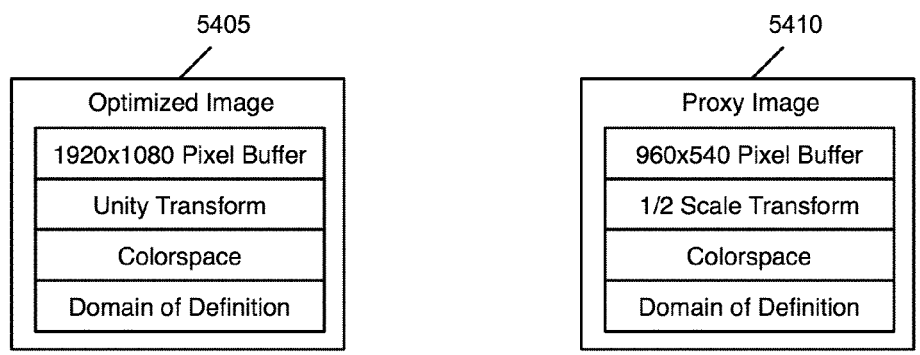
FIG. 54 conceptually illustrates data structures for two different images.

FIG. 54 conceptually illustrates data structures 5405 and 5410 for two different images. The first image represented by data structure 5405 is a full-resolution image and the second image represented by data structure 5410 is a quarter-resolution image. As shown, the images in some embodiments include a pixel buffer, a pixel transform, a colorspace, and a domain of definition. In some embodiments, the illustrated data structures are the structures used to send an image to a set of graphics processing operations defined by a render graph to generate an output image for a particular time in a composite presentation. The application of some embodiments retrieves image information from a source file and decodes this information to get a pixel buffer, then attaches the additional metadata (pixel transform, colorspace, and domain of definition). These images assume that full resolution in this case is 1920×1080—in some embodiments, the full resolution is defined by the asset, which gets its properties from the original media. If the full resolution for the media is different from the project, then a conforming transformation will be added to the render graph to adjust the clip to the size of the project.

The pixel buffer of some embodiments is essentially a bitmap. In the first image 5405, the pixel buffer is a full-size 1920×1080 buffer, while the second image 5410 only has a quarter-size (half-width and half-height) 960×540 pixel buffer. The pixel buffer stores an ordered set of pixel values, which are values in a colorspace (i.e., the colorspace stored in the image). For instance, in RGB space, each pixel is defined by a red value, a blue value, and a green value. Similarly, in Y'CbCr space, each pixel is defined by a luma value, a blue-difference value, and a red-difference value. The domain of definition, in some embodiments, is the portion of an image that will end up being used in an output image. This may be the entire pixel buffer, or a portion of the pixel buffer that cuts off the top and bottom or left and right portions.

The pixel transform, in some embodiments, is a transform that maps an image from image space to pixel space. In some embodiments, image space is a coordinate system in which an image is defined irrespective of pixels. For instance, when the video properties of a project specify a 1080p or 1080i format, the image space is 1920×1080. The media-editing application of some embodiments stores its data model in image space—thus, when a user defines video editing parameters (e.g., the size of a blur operation, the location of a small still image that is composited with a video, etc.), the application stores these parameters in image space. In some embodiments, the pixel transform is a 4×4 matrix. Some embodiments, however, store the parameters as a percentage of the image size, which also enables easy conversion to different image sizes, and enables easy copying of settings and effects from a first project with a first size to a second project with a second size.

The pixel transform for the optimized image 5405 is a unity transform. In some embodiments, this transform is a scale of 1 (because the image is a full-resolution image, it does not need to be scaled between the output image space and its pixel space) multiplied by a translation of (960, 540). This translation accommodates the fact that the convenient coordinates for image space place the origin in the center of the image while pixel space is defined with the origin at the lower left. In addition to scaling and translation, the pixel transform can accommodate other movements in two (or three) dimensions, such as rotations, stretching, etc.

The pixel transform for the proxy image 5410 is a transform including a scale by one-half as well as the same origin translation as mentioned above. Because the pixel transform is a transform from a 1920×1080 image space to a 960×540 pixel space, the transform is a scale by one-half in the x and y directions. If the translation is performed before the scaling, then it is a translation of (960, 540). On the other hand, if the translation is performed after the scaling, then it is a translation of (480, 270). That is, the operations do not commute.

A simple example of the use of the pixel transform is for resampling a proxy image up to full-size in order to render a full-size version of the image. For example, during playback, some embodiments will render images ahead of time according to the render graph defined based on the edits in the timeline, and store the rendered images in memory (or to disk) for use during playback. These rendered images are stored at the size requested by the project data structure (i.e., the size stored in the project video properties) in some embodiments, so when the project has a resolution of 1920×1080, the images are rendered at this size. When displaying the image in the preview display area, the images are downscaled to the size of the preview display.

Figure 55:
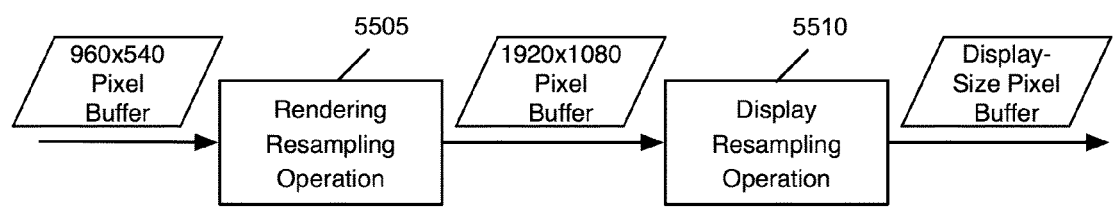
FIG. 55 conceptually illustrates a process by which images are rendered at a first resolution then resampled for display at a different resolution.

FIG. 55 conceptually illustrates this process, assuming that there are no graphics processing operations necessary to prepare an output image. In this figure, a 960×540 pixel buffer is re-sampled by rendering resampling operation 5505 into a 1920×1080 pixel buffer. In some embodiments, this pixel buffer is stored in memory (e.g., RAM), or as a render file in non-volatile storage (e.g., the boot disk of the device on which the media-editing application is operating). This 1920×1080 pixel buffer is then resampled for display into a pixel buffer having the size of the display area in which the image will be displayed. For instance, if the preview display area is 320×180 pixels, then the display resampling operation 5510 will resample the 1920×1080 pixel buffer into a 320×180 pixel buffer that can be displayed on the screen. In some embodiments, the graphics card of the device performs this resampling as the graphics card outputs the pixels to the display.

Figure 56:
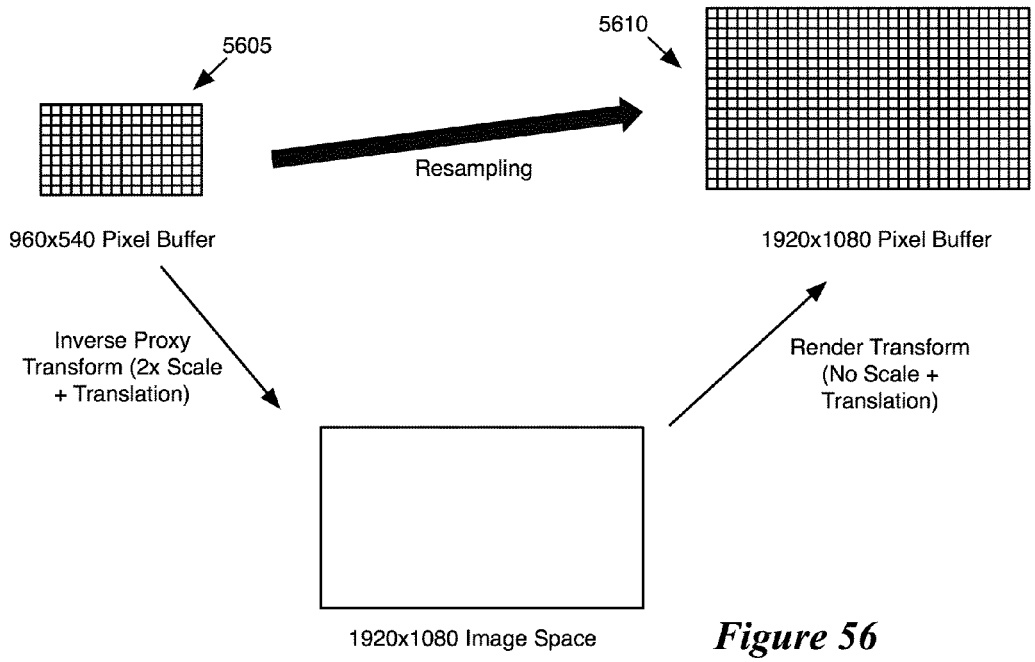
FIG. 56 conceptually illustrates a first resampling operation.

FIG. 56 conceptually illustrates the first of these resampling operations. Specifically, this figure illustrates a 960×540 pixel buffer 5605 that is resampled to create a 1920×1080 pixel buffer 5610. To generate this operation, the media-editing application of some embodiments applies an inverse of the proxy pixel transform stored in the image to the pixel buffer in order to conceptually transform the set of pixels from pixel space to image space, then applies the pixel transform associated with a full-size image to conceptually transform the set of pixels from image space to pixel space. As shown, the inverse proxy transform involves a scale by two (and a translation) and the render transform involves no scale (and a reverse of the translation).

To perform this operation, some embodiments define a node in a render graph for the image that uses as input the matrix $PT_R PT_P^{-1}$ (i.e., the inverse proxy pixel transform followed by the render transform, applying matrix multiplication right to left as written, as is convention). The operation then uses this matrix to scale up the pixel buffer, and also performs pixel blending operations (i.e., so that the four pixels in the bottom left corner of the output pixel buffer do not just have the exact same values as the bottom left pixel in the input pixel buffer).

Figure 57:
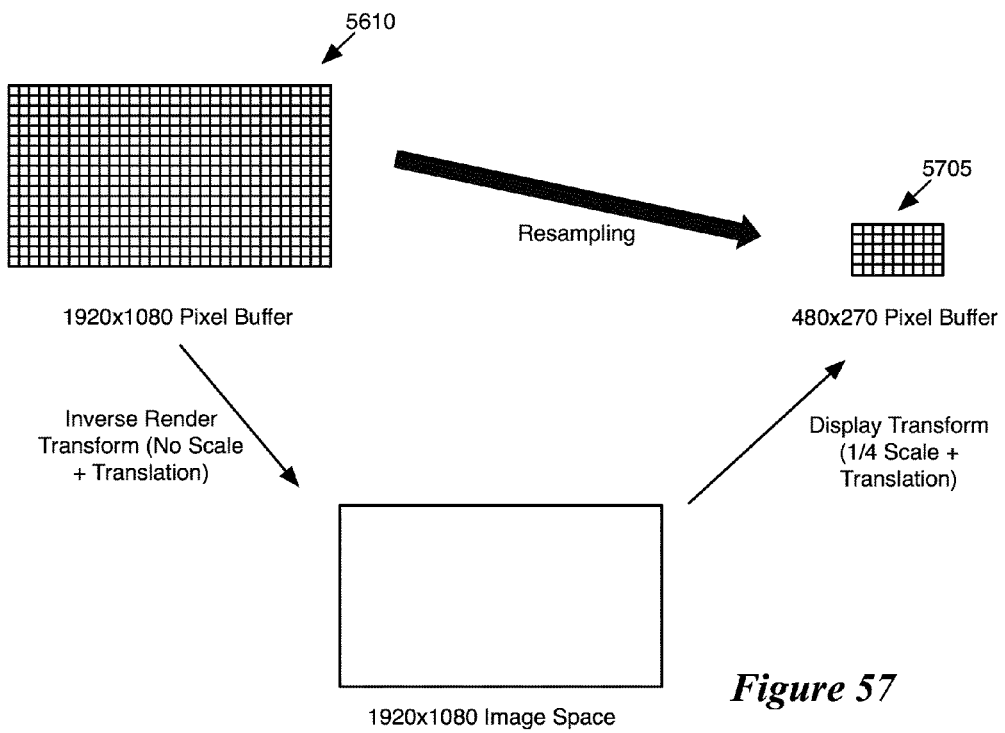
FIG. 57 conceptually illustrates a second resampling operation.

FIG. 57 conceptually illustrates the second resampling operation, in which the 1920×1080 pixel buffer 5610 is resampled to create a 480×270 pixel buffer 5705 for display in a preview display area of the media-editing application. As with the operation shown in the previous figure, the application applies an inverse render transform (which has no scale) and a display transform (which in this case has a one-fourth scale). As shown, the resampling operation reduces the size of the pixel buffer by a factor of four for display. In some embodiments, this operation (which involves blending of the pixel values) is performed by the graphics card of the device as the graphics card is outputting the pixels to the display.

While in the illustrated case it may appear easier to just do a single operation (i.e., from the 960×540 pixel buffer to the 480×270 pixel buffer) without the intermediate rendered image, in many cases there are numerous additional graphics processing operations that go into creating the rendered image 5610. These operations may include color space conversions, blending images, rotating images, compositing two images based on a color mask, etc.

Some embodiments, instead of rendering an image at full size (i.e., the size defined by a project's video properties) and then downscaling that image for display, define image space during playback to be the size of the image actually displayed in the video. In this case, the images will be rendered and stored in memory at the smaller size, and no downscaling will be needed. However, if the user modifies the display size (e.g., by enlarging the preview display area) during playback, then the application will have to either re-render the output images or scale the rendered images for output (as shown in FIG. 57).

As mentioned, some embodiments store the data model of the media-editing application in image space. The data model of some embodiments includes the data structures described above in Section I.E. As mentioned in that section, many of the clip objects store effects stacks that specify effects to apply to the clip objects. These effects may include transforms, pixel value modification operations, etc., and the values of the variables for the effects are stored in the output image space for the clip object in some embodiments. Thus, when the video properties for a sequence specify a 1920×1080 image space, parameters for the image processing operations assume that the operations apply to a 1920×1080 pixel buffer. However, using the pixel transform for a particular image, these operations can be modified and performed on a pixel buffer of a different size.

Figure 58:
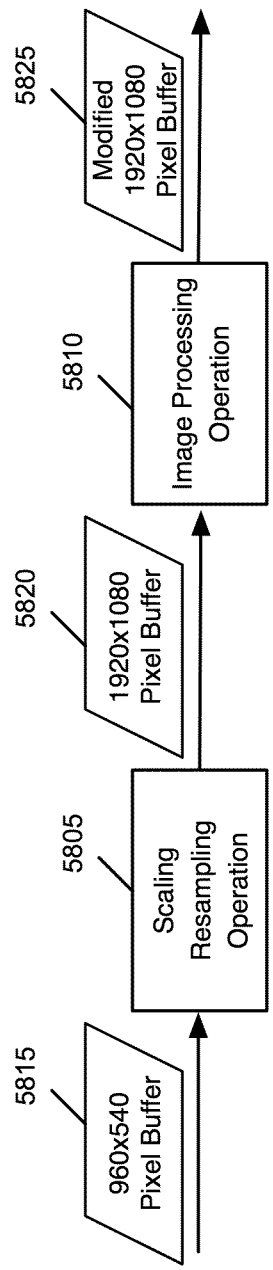
FIGS. 58 and 59 conceptually illustrate two different processes for rendering an image at full-size 1920×1080 when the image has an image-processing operation applied to it.
Figure 59:
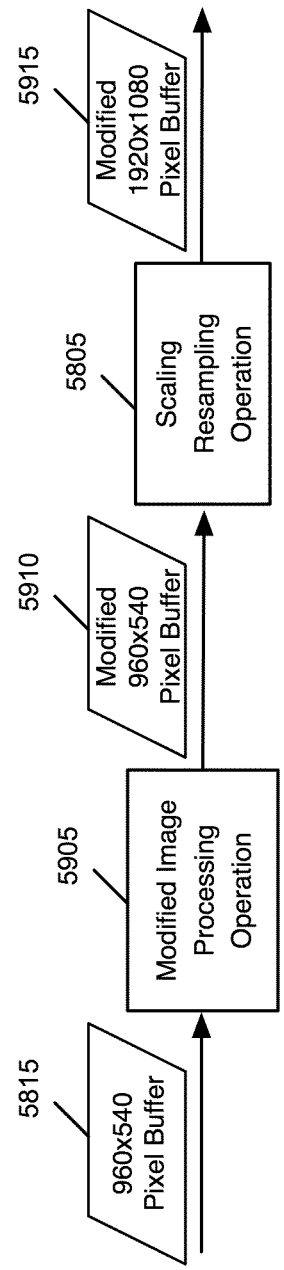

FIGS. 58 and 59 conceptually illustrate two different processes for rendering an image at full-size 1920×1080 in which the application applies an image-processing operation to the pixel buffer. In both cases, the input pixel buffer (e.g., the output of a decode operation) is a 960×540 pixel buffer. The two rendering processes will be described using a blur operation as an example image-processing operation, but the principles described could apply to any such operation (e.g., a different effect, a transition, etc.).

FIG. 58 illustrates the case in which the media-editing application performs the scaling operation 5805 first, followed by the image processing operation 5810. As shown, initially the application applies the scaling operation to a 960×540 pixel buffer 5815 to scale the pixel buffer up to a 1920×1080 output buffer 5820. This may be the same operation as shown in FIG. 56, that uses the inverse of the proxy transform stored in the data structure of the quarter-resolution image followed by the unity transform for a full-size image. To the 1920×1080 pixel buffer 5820, the application applies an image-processing operation 5810 (specifically, an effect, transition, or other operation not represented by a pixel transform).

The media-editing application defines this operation with parameters (that may be user-entered) in image space. In the case of the blur operation of some embodiments, the user defines a radius value (e.g., 100) for the operation. When performing the operation on a full-size image, the application does not need to scale the parameters of the image-processing operation. However, if the parameters specify a location (e.g., for an iris in or iris out transition, a center for the circle must be defined), then the application applies the translation aspect of the unity pixel transform to the coordinates for this location to handle the move of the origin from the center of the image to the bottom left of the pixel buffer. As shown, the output of this operation is a modified 1920×1080 pixel buffer 5825.

FIG. 59 illustrates the case in which the application performs a modified image processing operation 5905 first, followed by the scaling operation 5805. As shown, the same pixel buffer 5815 is input to the operation 5905. In this case, the application scales the parameters of the image-processing operation in accordance with the pixel transform stored in the data structure with the pixel buffer 5815, which specifies a scale factor of one-half as well as the usual origin translation. Thus, the application modifies the blur operation with a radius of 100 into a blur operation with a radius of 50 (the original radius in image space multiplied by the pixel transform). The output of this blur operation is a modified 960×540 pixel buffer 5910. The application then applies scaling operation 5805 to this modified pixel buffer 5910 to generate the output 1920×1080 pixel buffer 5915. The scaling resampling operation 5805 is the same operation as applied in FIG. 58, but to a different pixel buffer. In some cases, the pixel buffer 5915 will be the same as the pixel buffer 5825, depending on the image processing operation that is applied, and whether it commutes with the scaling operation. For example, applying the blur before scaling will generally have a slightly different result than applying the scaling first. While the difference might not be noticeable to the human eye, the pixel values will be slightly different.

Figure 60:
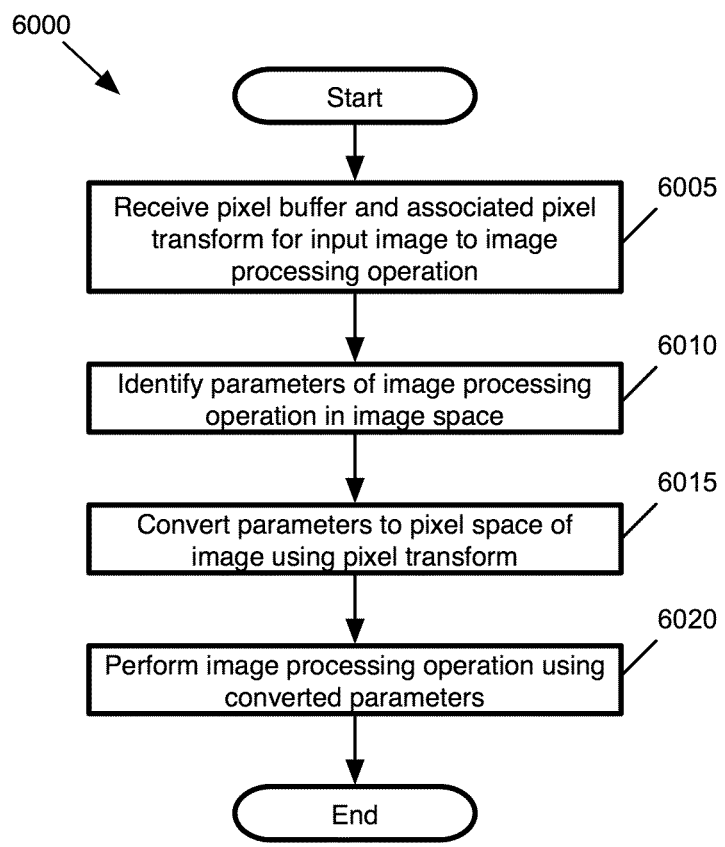
FIG. 60 conceptually illustrates a process of some embodiments for applying an image processing operation to an image.

FIG. 60 conceptually illustrates a process 6000 of some embodiments for applying an image processing operation to an image. The process 6000 receives (at 6005) a pixel buffer and associated pixel transform for an input image to an image processing operation. The image processing operation may be an effect (e.g., a blur, filter, etc.), a transition, etc., that modifies the pixel values of the input image.

The process then identifies (at 6010) the parameters of the image processing operation in image space. As stated, the image space of some embodiments is the size of the requested output image, and the application stores the parameters of the operation in this image space. The process 6000 converts (at 6015) the identified parameters to the pixel space of the image using the pixel transform of the image. As the pixel transform defines a conversion from image space into pixel space, the parameters will be translated, rotated, scaled, stretched, etc. to the dimensions of the pixel buffer by the pixel transform. As mentioned, some embodiments actually store the parameters as percentages of the image size, in which case the parameters may be converted to whole numbers based on the actual size of the image.

The process then performs (at 6020) the image processing operation using the converted parameters. In some embodiments, the operations 6005-6015 are performed for each image processing operation in an editing pipeline in order to define a render graph, and then the media-editing application performs these operations in sequential order to render the image.

Within the editing pipeline, some embodiments use representational images rather than passing a pixel buffer to every node in the pipeline. When a node in the pipeline actually needs the pixels (e.g., to render the image), the application actually retrieves the image from the disk. The representational image of some embodiments stores a description of how to generate an image. For instance, the representational image references a particular file on a particular disk from which the image will be retrieved, and includes a pixel transform for each node in the editing pipeline. In some cases, this allows inverse operations to cancel each other out, thereby saving on processing resources. For instance, if one node calls for a scale by four, and a second node calls for a scale of one-half, then the media-editing application can simply apply a scale of two when the image is actually retrieved. In some embodiments, the node modifies the pixel transform of an image rather than performing an actual transformation of the image. When possible, the pixels are actually transformed only once, rather than at each node in the graph.

Figure 61:
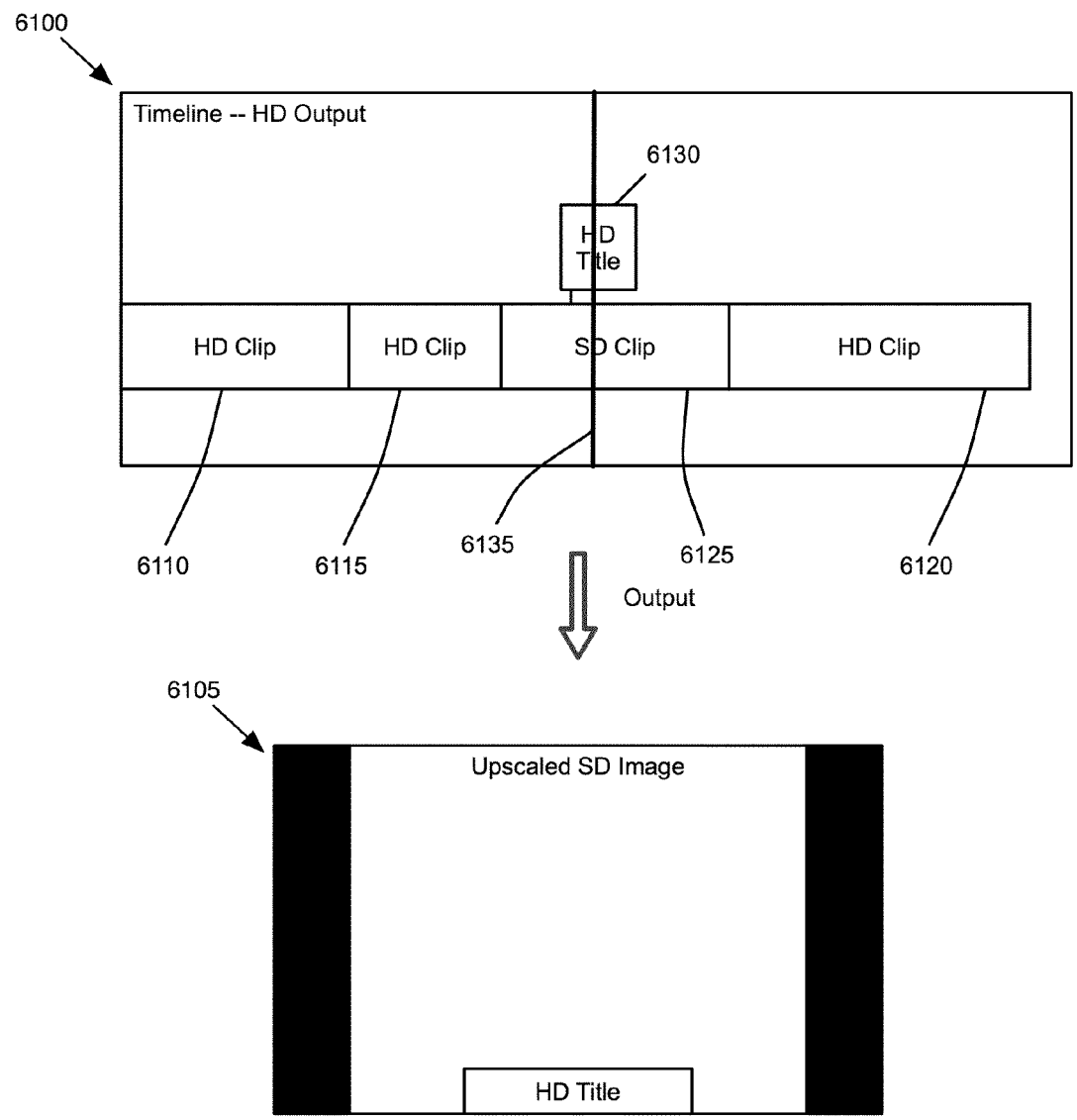
FIG. 61 illustrates a timeline as well as an output image.

One result of the use of the pixel transform at each stage in the render graph is that the media-editing application can avoid downscaling images and then subsequently scaling the images back up, which would cause a loss in resolution (i.e., an image originally defined in HD will look better than an image defined in SD and upconverted to HD). FIG. 61 illustrates a timeline 6100 for a composite presentation as well as an output image 6105. The timeline 6100 is a sequence with video properties specifying HD (1920×1080) output. Within the primary lane of the collection structure stored in the sequence, the user has edited three HD clips 6110-6120 and a SD clip 6125. Anchored off the SD clip is a HD title 6130 that is cropped to occupy only a portion of the bottom of the output image.

The playhead 6135 shows that the current image for the application to display is an image from the SD clip 6125 with the HD title 6130 displayed over top. Because the timeline requests HD output, the output image is an upscaled version of the SD image from the SD clip, with the title pixels occupying a section at the bottom of the image. Because the SD image has a 4:3 aspect ratio and the HD output has a 16:9 aspect ratio, the output image is pillar boxed. Some embodiments will fill the 1920×1080 output image and cut off the top/bottom of the image, or stretch the image instead of using the pillar box.

As shown, the application never downscales the HD title to SD, but instead outputs the title at its original HD resolution. Following strict compositing order, the HD title would be composited with the SD image at the SD resolution, then the resultant image would be scaled up to HD for output. In some embodiments, the rendering engine recognizes that the requested output is HD (based on the output pixel transform for the primary sequence in the timeline), and therefore never downscales the title, as doing so would incur a needless loss of resolution. Instead, the application scales up the SD image to the HD size before compositing the images.

Figure 62:
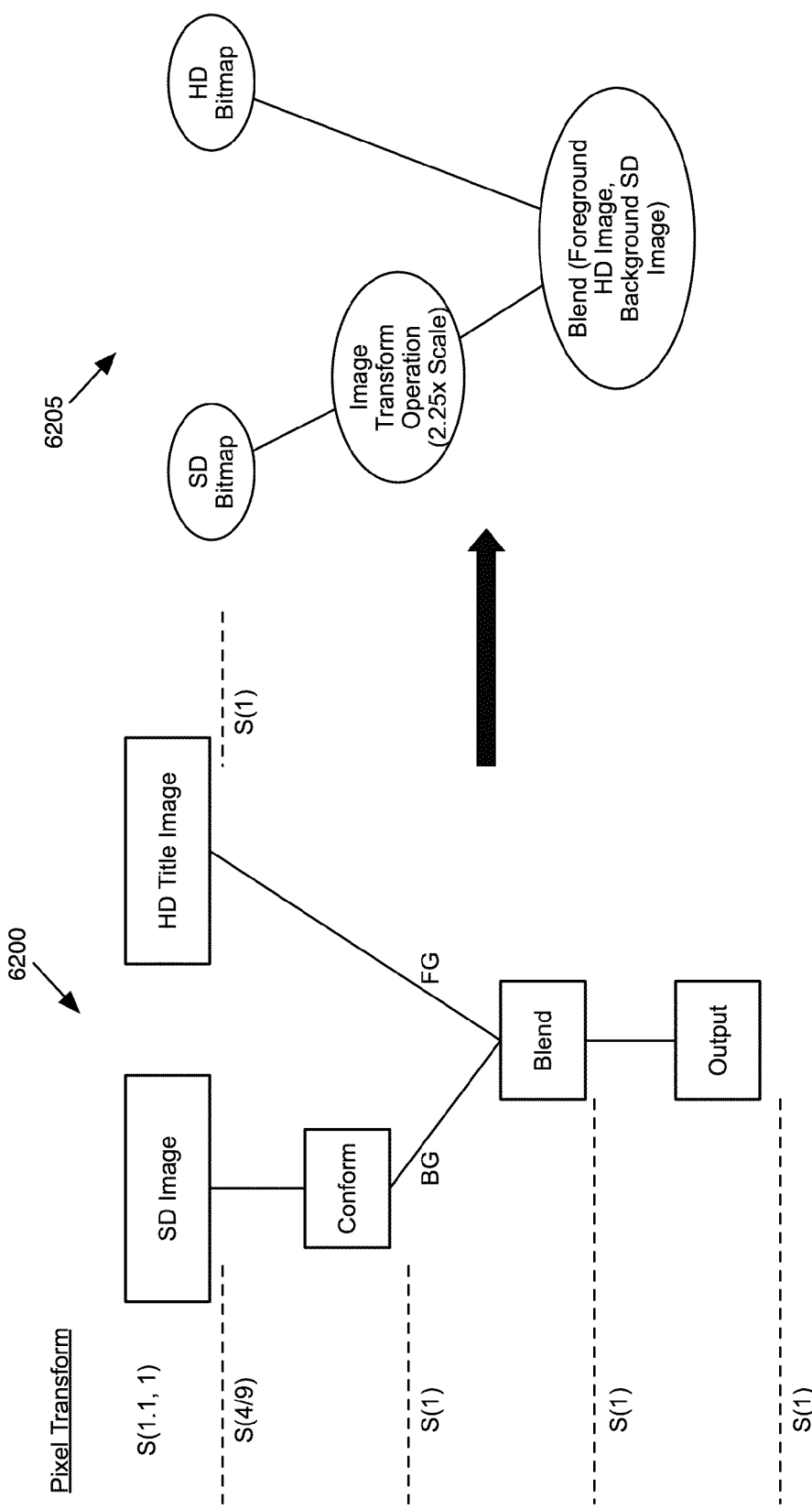
FIG. 62 conceptually illustrates a scene graph that is converted to a render graph in order to render the image in FIG. 61.

FIG. 62 conceptually illustrates a scene graph 6200 that the rendering engine converts to a render graph 6205 in order to render the image 6105. The scene graph 6200 also indicates pixel transforms at each operation. For simplicity, the translations between the image space origin and the pixel space origin in the pixel transforms are omitted. The output pixel transform in the scene graph 6200 has a scale of 1 (i.e., it is outputting an image at the requested HD resolution). The pixel transform for the blend operation (that blends the HD title in the foreground with the SD image in the background) also has a scale of 1, so as this matches with the pixel transform of the conform operation and the pixel transform of the HD title image, no render graph node needs to be defined to change the size of the image.

However, a blend render graph node is defined that takes as input the foreground HD image and the upscaled background SD image to output a composite image. The HD title will often be defined as a full 1920×1080 image that is mostly transparent (except for the actual title).

Continuing to traverse up the scene graph 6200, the foreground image (the title) has a pixel transform that matches the blend pixel transform, so no processing is needed between these nodes—the HD bitmap is shown as an input to the blend node in the render graph 6205. The conform effect also has a pixel transform with a scale of 1, because the output of the conform is a 1920×1080 image. The conform effect, in some embodiments, scales an image to fit a particular size (i.e., 1920×1080 in this case).

The input of the conform effect has a pixel transform with a scale of 4/9 (480/1080), while the output of the SD image has a pixel transform that accounts for a pixel aspect ratio of 1.1:1, but has a scale of 1 otherwise. As it is a bitmap, its image space is not 1920×1080. When generating the render graph 6205, the media-editing application notices the difference in the pixel transforms and defines a node to scale the SD bitmap (the Image Transform Operation node). This is a node that performs an operation like that shown in FIG. 56 (i.e., an inverse of the 4/9 scale transform followed by the unity transform). Thus, the render graph 6205 is defined. The rendering engine can then use this render graph to generate an output image for the particular point in the timeline 6100.

C. Missing Proxy Files

Section IV above describes certain cases when the media-editing application is unable to identify a file needed for output (e.g., to the preview display area, as part of a filmstrip view of a media clip, etc.). When a user switches from high-resolution playback to low-resolution playback (or vice versa), in some cases the media-editing application may not be able to access the needed file. For example, the user might not have created a low-resolution (proxy) transcode of the original media, but the application of some embodiments will not access the original media because the original media is at a higher resolution than is requested.

Figure 63:
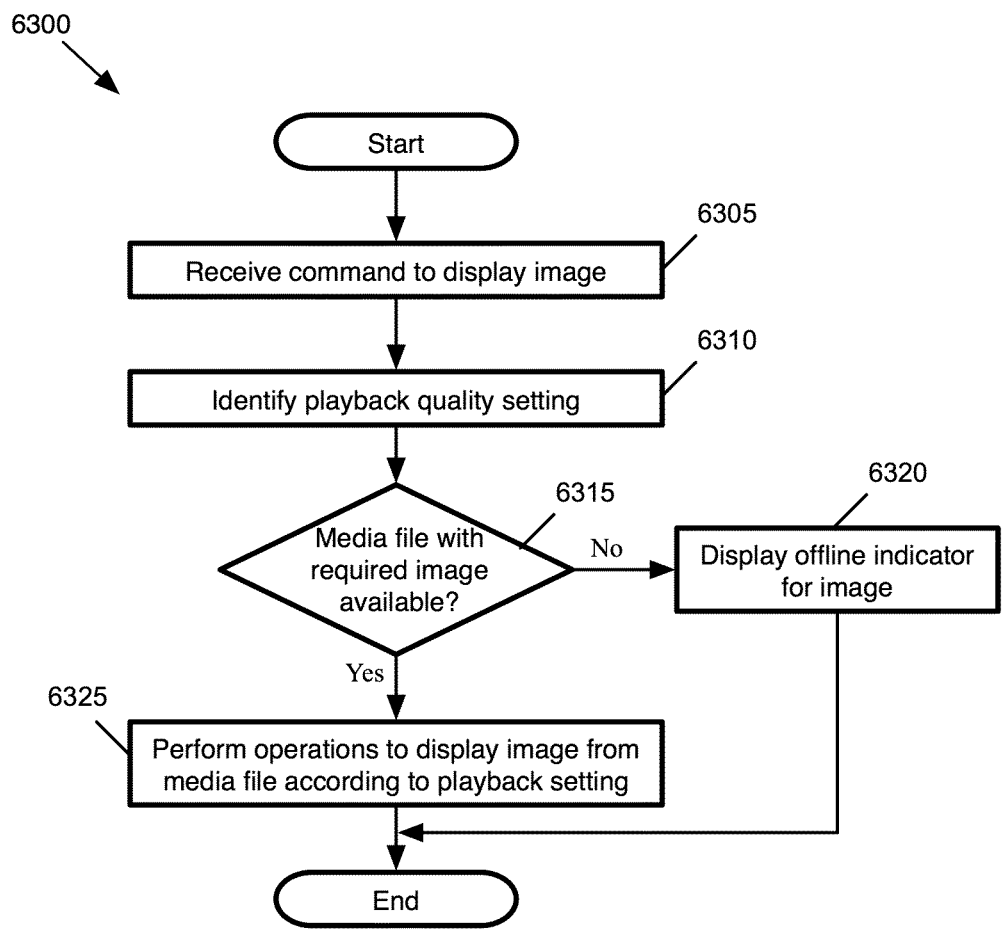
FIG. 63 conceptually illustrates a process of some embodiments for displaying an image.

FIG. 63 conceptually illustrates a process 6300 of some embodiments for displaying an image (e.g., in a clip in the clip browser, in a clip in the timeline, in the preview display, etc.). The process begins (at 6305) by receiving a command to display an image. Specifically, the process receives a command to display an image from a particular time in a media clip, which references a particular time in an asset. As stated, this might be an image for display in the preview display area, within a filmstrip, etc. The command might also be a request for an image for an operation such as the color waveform, color histogram, etc.

The process next identifies (at 6310) a playback quality setting. The playback setting may be set by a user of the media-editing application in some embodiments, as shown above in FIG. 52. In some embodiments, the user may toggle the playback quality setting during the editing process (e.g., to reduce the use of computational resources). From the playback quality setting, the process determines the particular size media file to display (e.g., high-resolution, low-resolution).

The process then determines (at 6315) whether the media file with the required image is available. For instance, if the application is requesting a low-resolution image for a particular media clip, the process determines whether the asset referenced by that media clip refers to a low-resolution transcoded file, and whether that transcoded file currently exists. In some embodiments, when the application requests a high-resolution image, the process determines whether the asset referenced by the media clip refers to a high-resolution transcoded file and whether the transcoded file currently exists. If the high-resolution transcode is unavailable, then the process attempts to find the original media. When the asset does not refer to a file at the requested resolution and/or the file does not exist, the process displays (at 6320) an offline indicator for the image that indicates that the image is not available.

On the other hand, when the image can be found, the process performs (at 6325) operations to display the image from the media file according to the playback setting. Some embodiments perform disk read, decode, and image processing operations as described in the above sections.

Figure 64:
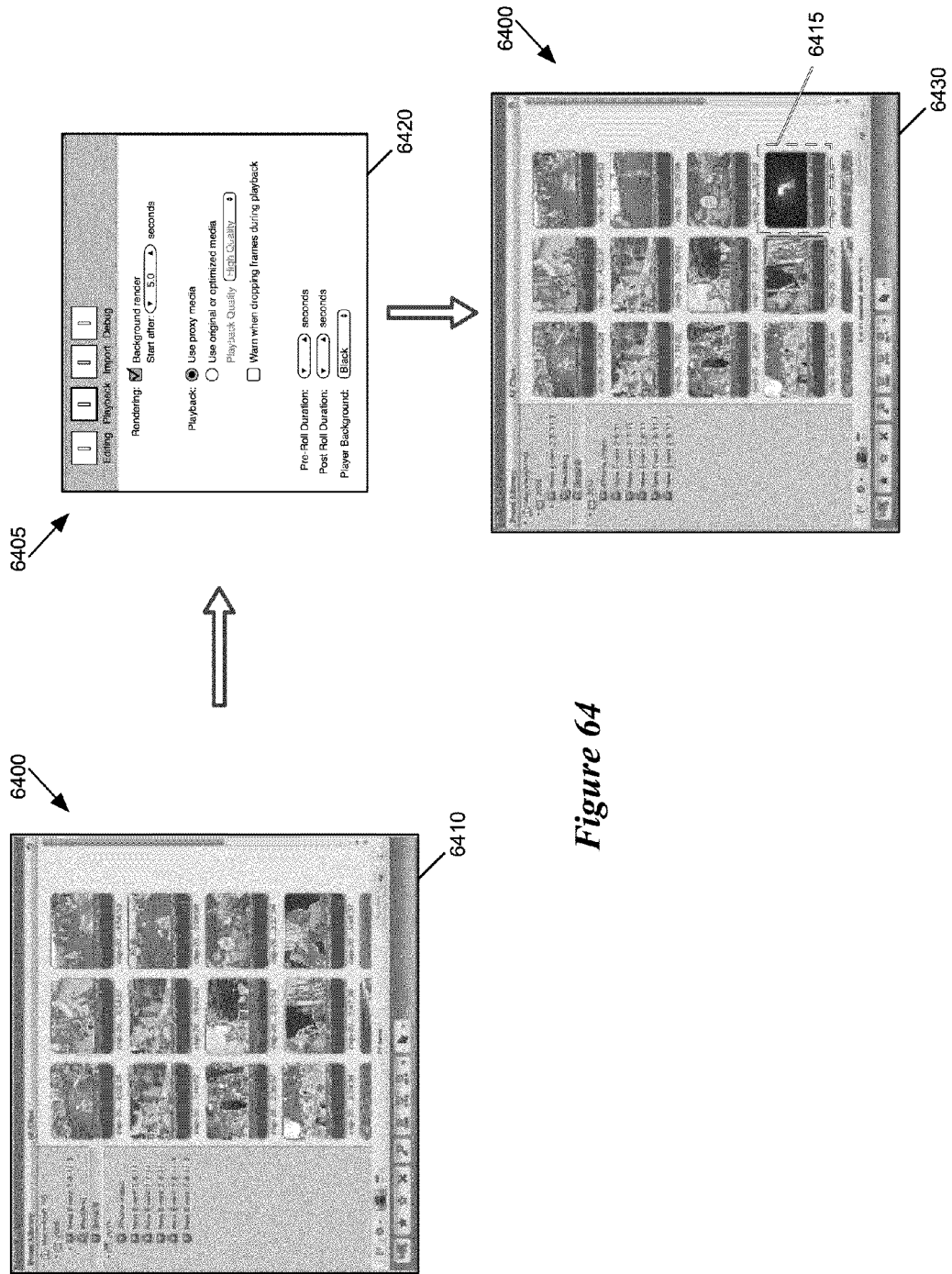
FIGS. 64 and 65 illustrate a workflow of some embodiments in which a user modifies the playback settings to use low-resolution media, and then generates the low-resolution media so that it is available.
Figure 65:
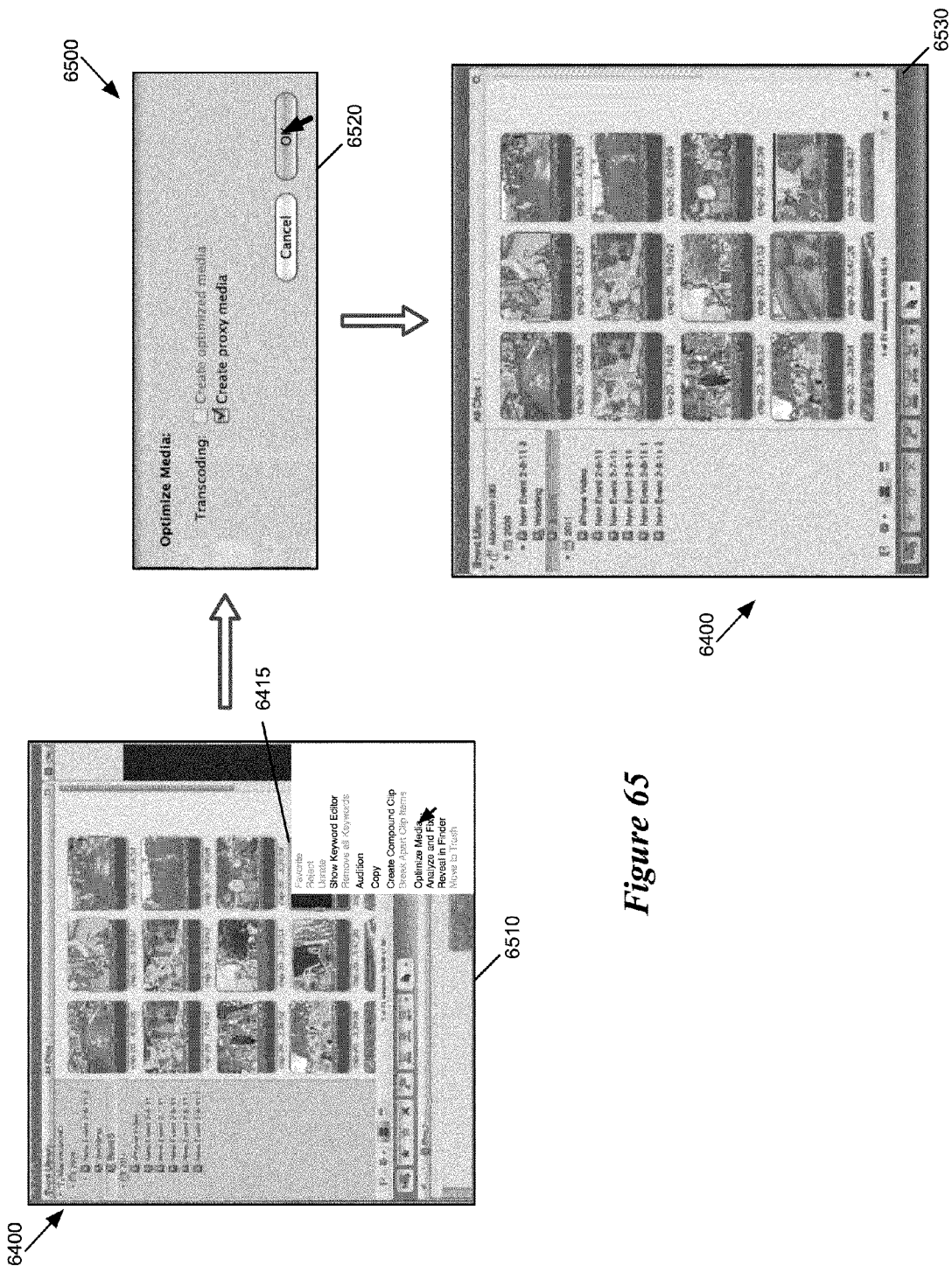

FIGS. 64 and 65 illustrate a workflow of some embodiments in which a user modifies the playback settings to use low-resolution media, then generates the low-resolution media so that the requested media is available to the application. FIG. 64 illustrates the effect of modifying the playback setting when no low-resolution media is available for at least one clip, in three stages 6410-6430. The first stage 6410 illustrates a clip library and clip browser 6400. At this stage, the playback setting calls for high-resolution media, and the media-editing application displays thumbnail images for all of the clips in the clip browser.

At stage 6420, the user has brought up the playback preferences HUD 6405 of some embodiments, and switched the playback setting to use proxy (low-resolution) media. In some embodiments, the user selects a preferences menu option of the media-editing application and then selects the playback tab. The user then selects the "Use Proxy Media" radio button. Shown at stage 6430, this causes the clip library to display a missing clip/file image in the thumbnail for clip 6415. Some embodiments use a same image regardless of why the file is missing, while other embodiments display different images for missing proxy files, missing high-resolution files, missing events, missing clips, etc. (although when displayed in the clip browser, the event and clip would generally not be missing).

FIG. 65 illustrates the generation of low-resolution media for the clip, which resolves the broken file reference, over three stages 6510-6530. The first stage 6510 illustrates the clip library and browser 6400. The user has selected the clip 6415 and opened a pop-up menu for the clip that includes a selectable option of "Optimize Media", which is an option to create transcoded versions of the media. In some embodiments, the user brings up the pop-up menu with a particular type of selection input (e.g., right-clicking, two-finger-tapping on a touchscreen, etc.).

Selection of this option brings up the dialog box 6500 shown in stage 6520. The dialog box includes an option to create optimized media that is grayed out, and a selected option to create proxy media. The high-resolution transcode option may be grayed out because a high-resolution transcode already exists, or because the original media is already in a format suitable for editing (e.g., without any temporal compression).

Selecting the low-resolution transcode instructs the application to generate a low-resolution transcode file, as described above. As shown at stage 6530, after the generation of such a file, the clip 6415 displays a thumbnail image from its newly generated low-resolution transcode file rather than the missing proxy image.

VI. Background Tasks

The above sections describe the performance of a number of tasks by the media-editing application of some embodiments. These tasks include importing media, transcoding media, analyzing media, rendering media (e.g., for playback), etc. The media-editing application performs some of these operations in the background in some embodiments, pausing the tasks to free up processing resources for other operations needed in real-time, such as media playback.

Figure 66:
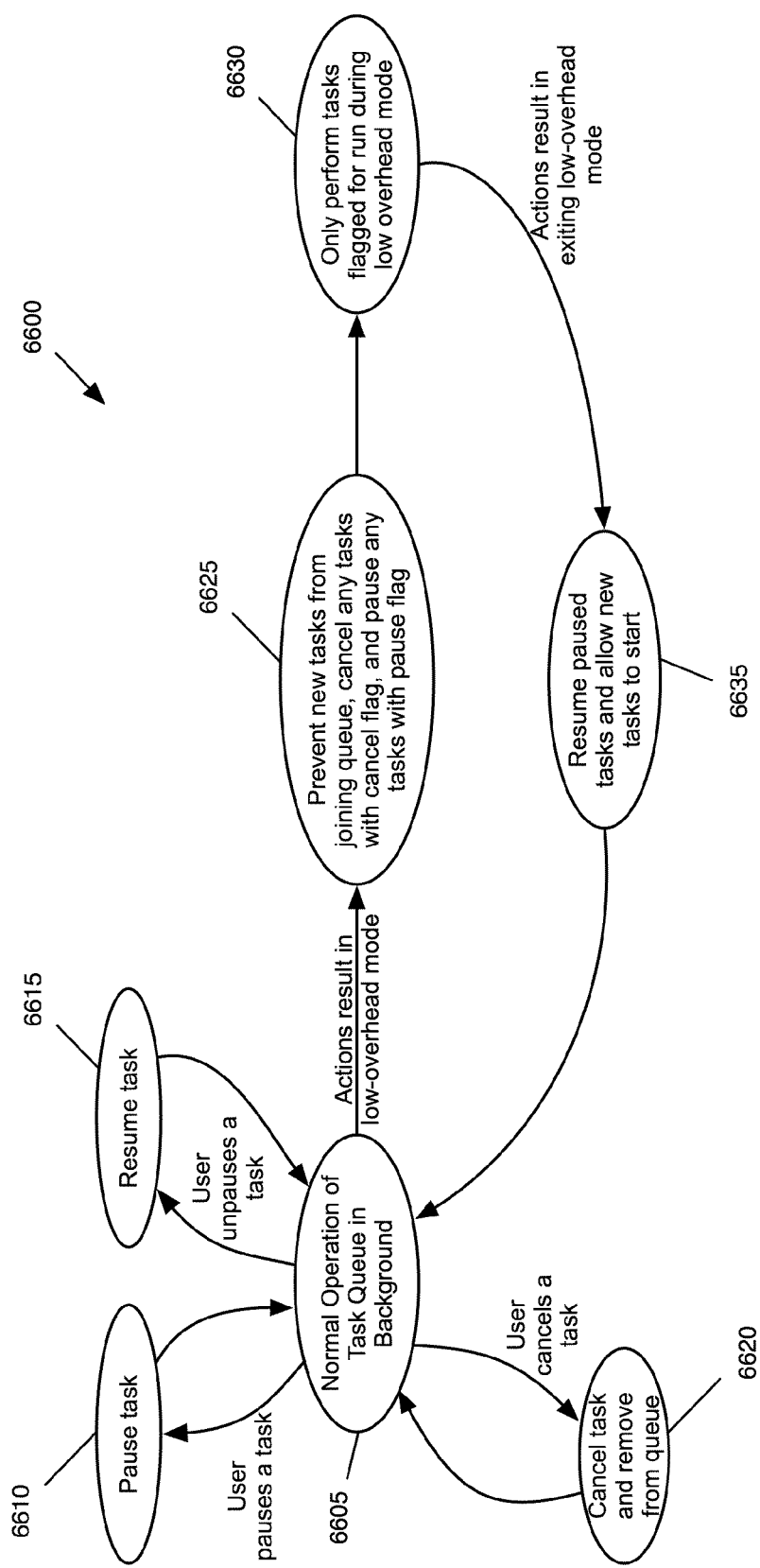
FIG. 66 conceptually illustrates a state diagram of some embodiments relating to the operation of background tasks for a media-editing application.

FIG. 66 conceptually illustrates a state diagram 6600 of some embodiments relating to the operation of background tasks for a media-editing application. One of ordinary skill will recognize that the media-editing application may perform a multitude of other actions and that the states shown in this diagram are only those relating to the performance of background tasks. In some embodiments, the application stores a background task queue that keeps track of the tasks to perform. The task queue may be managed either by the media-editing application or by an operating system of the device on which the application operates.

Figure 69:
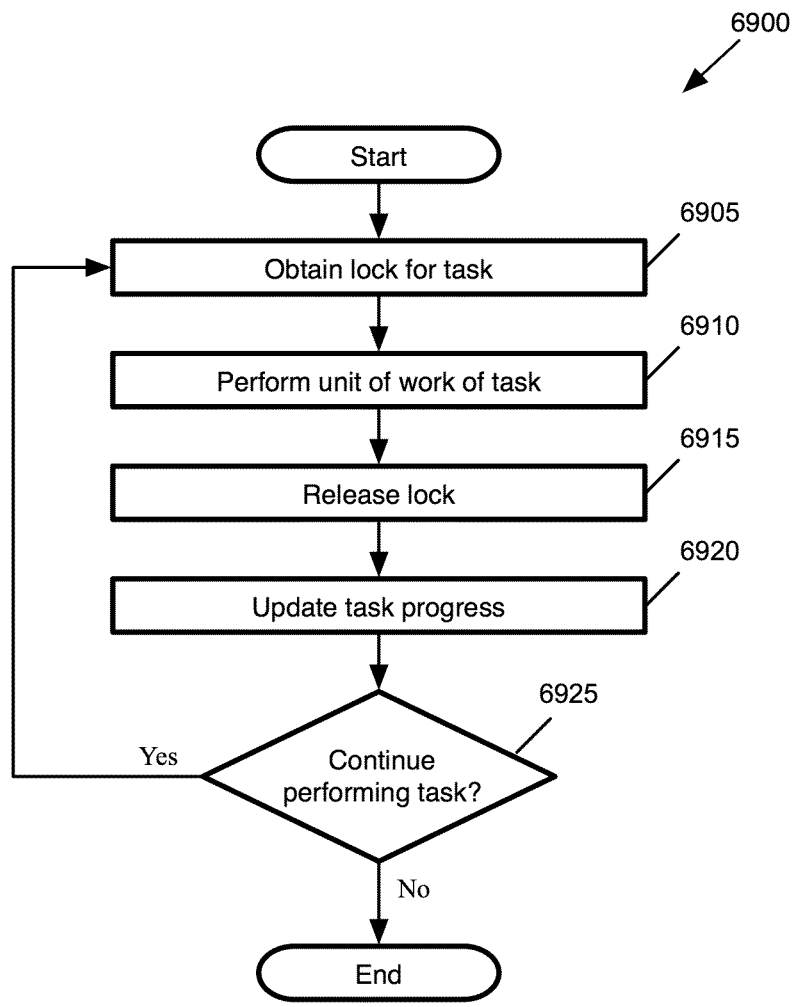
FIG. 69 conceptually illustrates a process of some embodiments for normal operation of a task within the background task queue.

As shown, during normal operation of the task queue in the background, the application is at state 6605. At this stage, the background task queue performs operation in a normal fashion. FIG. 69, described below, illustrates normal operation performance according to some embodiments. In some embodiments, the application supports task serialization within the queue, which allows for the use of rules that prevent contention from multiple tasks over shared resources (e.g., processor time) or locks. There may be multiple operations in the task queue, including import operations (e.g., copying files from an external device or folder to the application media storage), encoding operations (e.g., both high-resolution and low-resolution encodes), analysis operations (e.g., face detection, audio enhancement, shake detection, color balancing, etc.), background rendering (i.e., generating timeline output for later use according to the current setup of the composite presentation), media management (e.g., deletion of media that is not used for a project, copying of used media, etc.), and sharing (e.g., exporting to another format for distribution).

Figure 67:
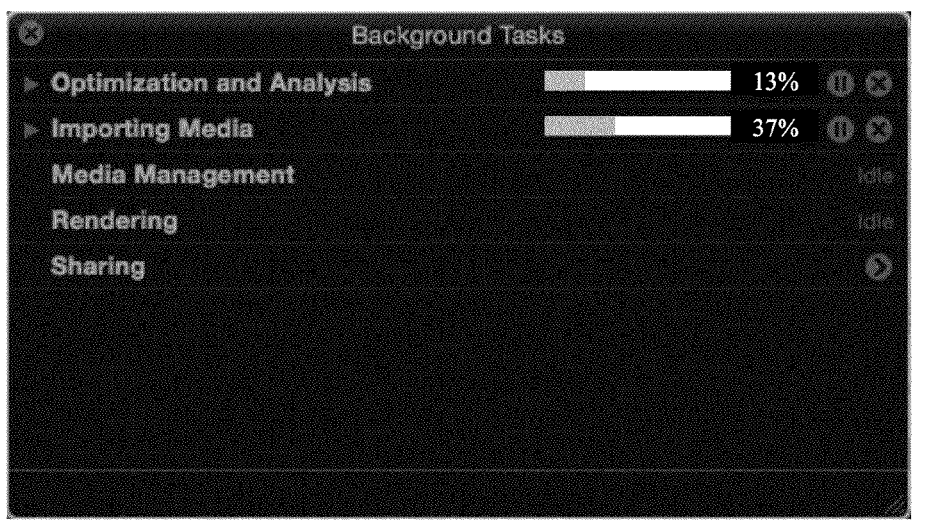
FIGS. 67 and 68 illustrate a user interface window that enables the user to view the progress of background tasks, pause and restart tasks, etc.
Figure 68:
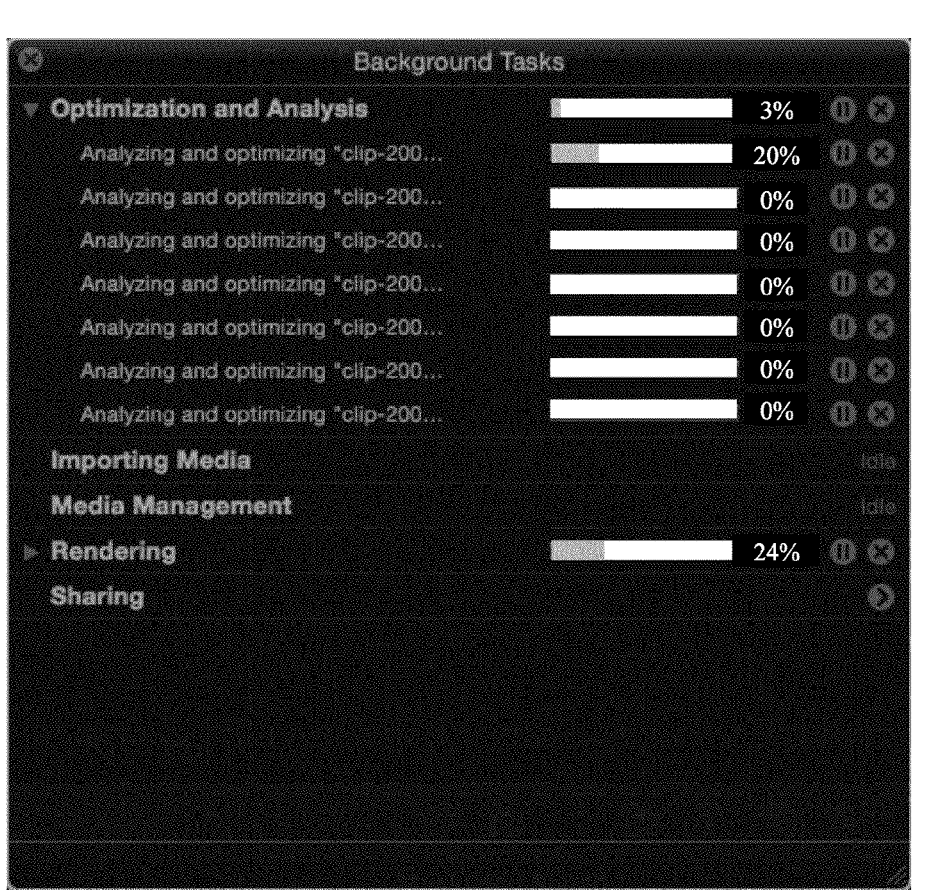

Some embodiments provide a user interface window that enables the user to view the progress of such tasks, pause and restart such tasks, etc. FIG. 67 illustrates an example of such a GUI window 6700. As can be seen, the window 6700 includes status information for optimization and analysis, media import, media management, rendering, and sharing. The optimization and analysis and media import are currently in progress (e.g., because the user is transcoding media upon import), and therefore the window 6700 shows status bars along with pause and stop buttons for these tasks. In addition, because the tasks are in progress, a user can select the item to see the progress for individual clip. FIG. 68 illustrates a background task GUI window 6800 while the application performs both encoding and/or analysis as well as background rendering. In this case, the user has opened the optimization and analysis tab to review the status of the different clips. As shown, the application has only started performing the encoding and analysis operations on one of the media clips, which is 20% complete.

During the course of this normal operation, users may pause and resume tasks in some embodiments (e.g., through the user interface). As shown in FIG. 66, when a user pauses a task, the application transitions to state 6610 to pause the task, then returns to normal operation (at state 6605) for any other ongoing tasks. When the user unpauses a paused task, the application transitions to state 6615 to resume the task, then returns to normal operation (at state 6605) for the resumed task as well as any other ongoing tasks.

Users may also cancel tasks, which clears the canceled task from the queue. As shown, when a user cancels a task, the application transitions to state 6620 to cancel the task and remove the task from the background task queue, then returns to normal operation (at state 6605) for any other ongoing tasks. In some embodiments, the user can pause or cancel the background tasks through a user interface such as that shown in FIG. 68.

In some embodiments, the media-editing application performs background tasks when processing and memory resources are available, but stops these tasks when resources are needed for other operations. As shown, when user actions result in a transition to low-overhead mode, the application transitions to state 6625. The application may transition to this mode when instructed to play back a clip or set of clips, when a user skims through a clip, when a user performs editing operations such as trimming a clip or adding effects, etc. In low-overhead mode, the application prevents new tasks from entering the background task queue, and attempts to cancel or pause the remaining tasks. In some embodiments, each task has a value set that indicates whether the task should be paused, canceled, or allowed to continue running when the application enters low-overhead mode. For instance, the application pauses image analysis tasks in some embodiments, while continuing to run the analysis of which parts of a timeline need to be rendered.

The application then transitions to state 6630, at which point the only background tasks performed by the application are those flagged to run during low-overhead mode. In addition, the application may be performing whatever additional tasks required the entrance of low-overhead mode in the first place (e.g., playing back a sequence). When actions result in exiting low-overhead mode, the application transitions to 6635. At this state, the application resumes any paused tasks and allows new tasks to join the queue. In some embodiments, the application may exit low-overhead mode when playback is finished, the user has released a selection of the playhead, or has not interacted with a clip for skimming for a predetermined period of time (e.g., two seconds). The application then transitions to 6605 to resume normal operation of the task queue in the background.

In some embodiments, the tasks will also pause, implement, or cancel themselves at an appropriate time (e.g., when not holding resources, so as to avoid deadlock situations). For instance, as shown in FIG. 68, some embodiments perform all transcoding and analysis operations on a first clip before beginning to perform these operations on a second clip. In some embodiments, some of the background tasks may implement the pause/resume and cancel in a task-specific manner by mapping a pause or cancel request into an appropriate call to the scheduling engine (e.g., a pause request that causes the scheduling engine to stop generating new frames and sending them to the task), while other tasks implement pause/resume/cancel by using a shared infrastructure that provides simplified support for pausing and cancelling (e.g., methods of a superclass that can be used by the various different tasks in order to handle the pausing). Some embodiments use the playback engine to pause operations that require the playback engine for image data and have a defined start and end, while using the shared infrastructure for iterative tasks that continue unless paused.

As mentioned, FIG. 69 conceptually illustrates a process 6900 of some embodiments for normal operation of a task within the background task queue. The process 6900 starts when a task begins. This process assumes that the task application at least starts performing the task, as opposed to the task entering the queue and being paused before even starting. As shown, the process obtains (at 6905) a lock for the task. In some embodiments, this lock is a mutex that prevents data used by the task from being changed by a different task (e.g., being performed by a different processor thread). This data may be a frame of image data, a thumbnail, a data structure that is part of a project, etc. For example, in order for a render task to generate a particular thumbnail, the process would obtain a lock for the task that prevents the modification of the project data (i.e., the clips) that define which images to use for the thumbnail as well as the image data that goes into the thumbnail.

Next, the process performs (at 6910) a unit of work of the task. As the tasks may run the gamut of media-editing application operations, a unit of work may also be varied. For example, it may involve performing an operation on an image (e.g., encoding an image, analyzing an image, resizing an image, etc.), performing an operation on a part of an image, modifying a file or a portion of a file, etc. With the unit of work performed, the process releases (at 6915) the lock, making the data used by the task available for modification by other tasks.

The process 6900 then updates (at 6920) the task progress. In some embodiments, the task queue keeps track of all of the work that needs to be performed by each task, and the process updates this queue to indicate that the particular task performed is now one unit closer to completion. The process then determines (at 6925) whether to continue performing the task. In some embodiments, this determination is based on whether the task has been completed, as well as whether the task has been paused or canceled (e.g., because of a higher priority task being performed). When the process 6900 will continue performing the task, the process returns to 6905 to obtain another lock for the task. Otherwise, the process ends.

VII. Software Architecture

Figure 70:
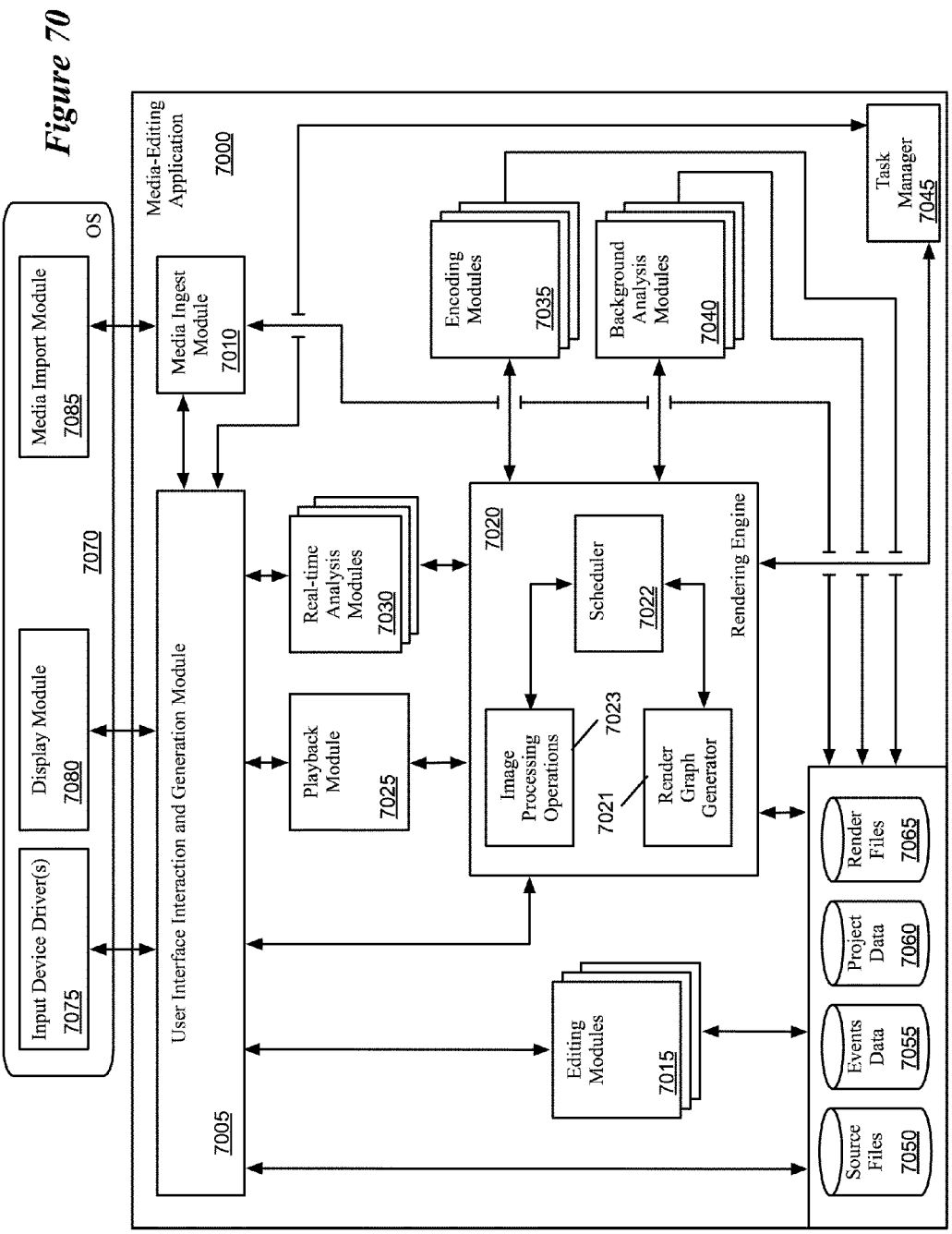
FIG. 70 conceptually illustrates the software architecture of a media editing application of some embodiments.

In some embodiments, the processes described above are implemented as software running on a particular machine, such as a computer or a handheld device, or stored in a machine-readable medium. FIG. 70 conceptually illustrates the software architecture of a media editing application 7000 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 7000 includes a user interface (UI) interaction and generation module 7005, a media ingest module 7010, editing modules 7015, rendering engine 7020, playback module 7025, real-time analysis modules 7030, encoding modules 7035, background analysis modules 7040, and task manager 7045.

The figure also illustrates stored data associated with the media-editing application: source files 7050, events data 7055, project data 7060, and render files 7065. In some embodiments, the source files 7050 store media files (e.g., video files, audio files, combined video and audio files, etc.) imported into the application. The source files 7050 of some embodiments also store transcoded versions of the imported files as well as analysis data (e.g., people detection data, shake detection data, color balance data, etc.). The events data 7055 stores the events information used by some embodiments to populate the clip library and clip browser. The events data may be a set of clip object data structures stored as one or more SQLite database files (or other format) in some embodiments. The project data 7060 stores the project information used by some embodiments to specify a composite presentation in the timeline. The project data may also be a set of clip object data structures stored as one or more SQLite database files (or other format) in some embodiments. The render files 7065 of some embodiments may include thumbnail-sized images for display in the clip browser or timeline, audio waveform displays for media clips, as well as rendered segments of a timeline sequence for use in playback. In some embodiments, the four sets of data 7050-7065 are stored in one physical storage (e.g., an internal hard drive, external hard drive, etc.). In some embodiments, the data may be split between multiple physical storages. For instance, the source files might be stored on an external hard drive with the events data, project data, and render files on an internal drive. Some embodiments store events data with their associated source files and render files in one set of folders, and the project data with associated render files in a separate set of folders.

FIG. 70 also illustrates an operating system 7070 that includes input device driver(s) 7075, display module 7080, and media import module 7085. In some embodiments, as illustrated, the device drivers 7075, display module 7080, and media import module 7085 are part of the operating system even when the media editing application 7000 is an application separate from the operating system.

The input device drivers 7075 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 7005.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 7080 translates the output of a user interface for a display device. That is, the display module 7080 receives signals (e.g., from the UI interaction and generation module 7005) describing what should be displayed and translates these signals into pixel information that is sent to the display device. The display device may be an LCD, plasma screen, CRT monitor, touchscreen, etc.

The media import module 7085 receives media files (e.g., audio files, video files, etc.) from storage devices (e.g., external drives, recording devices, etc.) through one or more ports (e.g., a USB port, Firewire port, etc.) of the device on which the application 7000 operates and translates this media data for the media-editing application or stores the data directly onto a storage of the device.

The UI interaction and generation module 7005 of the media editing application 7000 interprets the user input data received from the input device drivers and passes it to various modules, including the media ingest module 7010, the editing modules 7015, the rendering engine 7020, the playback module 7025, the real-time analysis modules 7030, and the task manager 7045. The UI interaction module also manages the display of the UI, and outputs this display information to the display module 7080. This UI display information may be based on information from the editing modules 7025, the playback module 7025, the real-time analysis modules 7030, the task manager, and the data 7050-7065. In addition, the module 7005 may generate portions of the UI based solely on user input—e.g., when a user moves an item in the UI that only affects the display, not any of the other modules, such as moving a window (e.g., the background tasks window) from one side of the UI to the other. In some embodiments, the UI interaction and generation module 7005 generates a basic GUI and populates the GUI with information from the other modules and stored data.

The media ingest module 7010 manages the import of source media into the media-editing application 7000. Some embodiments, as shown, receive source media from the media import module 7085 of the operating system 7070. The media ingest module 7010 receives instructions through the UI module 7005 as to which files should be imported, then instructs the media import module 7085 to enable this import (e.g., from an external drive, from a camera, etc.). The media ingest module 7010 stores these source files 7050 in specific file folders associated with the application. In some embodiments, the media ingest module 7010 also manages the creation of event data structures upon import of source files and the creation of the clip and asset data structures contained in the events.

The editing modules 7015 include a variety of modules for editing media in the clip browser as well as in the timeline. The editing modules 7015 handle the creation of projects, addition and subtraction of clips from projects, trimming or other editing processes within the timeline, application of effects and transitions, or other editing processes. In some embodiments, the editing modules 7015 create and modify project and clip data structures in both the event data 7055 and the project data 7060.

The rendering engine 7020 handles the rendering of images for the media-editing application. As shown, the rendering engine 7020 of some embodiments includes a render graph generator 7021, a scheduler 7022, and image processing operations 7023. The rendering engine manages the creation of images for the media-editing application. When an image is requested by a destination within the application (e.g., the playback module 7025, a real-time analysis module 7030, an encoding modules 7035, or a background analysis module 7040), the rendering engine outputs the requested image according to the project or event data. The rendering engine retrieves the project data or event data that identifies how to create the requested image and the render graph generator 7021 generates a render graph that is a series of nodes indicating either images to retrieve from the source files 7050 or operations to perform on the source files. The scheduler 7022 schedules the retrieval of the necessary images through disk read operations and the decoding of those images. The image processing operations 7023 are the various operations performed on the images to generate an output image. In some embodiments, these operations include blend operations, effects (e.g., blur or other pixel value modification operations), color space conversions, resolution transforms, etc. The image processing operations 7023 in some embodiments are actually part of the operating system and are performed by a GPU or CPU of the device on which the application 7000 operates. The output of the rendering engine (a rendered image) may be stored in the render files 7065 or sent to a destination for additional processing or output.

The playback module 7025 handles the playback of images (e.g., in a preview display area of the user interface). Some embodiments do not include a playback module and the rendering engine directly outputs its images to the UI module 7010 for integration into the GUI, or directly to the display module 7080 for display at a particular portion of the display device.

The real-time analysis modules 7030 include modules for generating a color waveform, color histogram, vectorscope, etc. These modules analyze images being output in real-time and generate their own output. The real-time analysis modules 7030 send this output to the UI interaction and generation module 7005 for integration into the UI output. In some embodiments, these modules use the same images being output by the rendering engine for playback, though may require the images in a different resolution or colorspace than the playback module 7025.

The encoding modules 7035 and background analysis modules 7040 perform background processes on images output by the rendering engine. The encoding modules 7035 perform at least two different types of encoding on source media (e.g., a high-resolution encode and a low-resolution encode). Some embodiments store the encoded media in the source files 7050 along with the original media. The background analysis modules 7040 perform various non-real-time analysis processes on the images and store data files indicating the results in the source files 7050 in some embodiments. These processes may include person detection (e.g., through face detection), color balancing, and shake detection.

The task manager 7045 of some embodiments manages background tasks and their queue. As described above, the background tasks may include background rendering, encoding, analysis, etc. The task manager 7045 receives tasks to perform (e.g., from the UI module 7005) or other modules and manages the performance of these tasks. The task manager may inform the rendering engine 7020 when it should be rendering images for these background tasks, when it should pause the tasks, etc. Though not shown, in some embodiments, the task manager also communicates with the background analysis modules 7040 and the encoding modules 7035.

While many of the features of media-editing application 7000 have been described as being performed by one module (e.g., the UI interaction and generation module 7005, the media ingest manager 7010, etc.), one of ordinary skill in the art will recognize that the functions described herein might be split up into multiple modules. Similarly, functions described as being performed by multiple different modules might be performed by a single module in some embodiments (e.g., the playback module 7025 might be part of the UI interaction and generation module 7005).

VIII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 71:
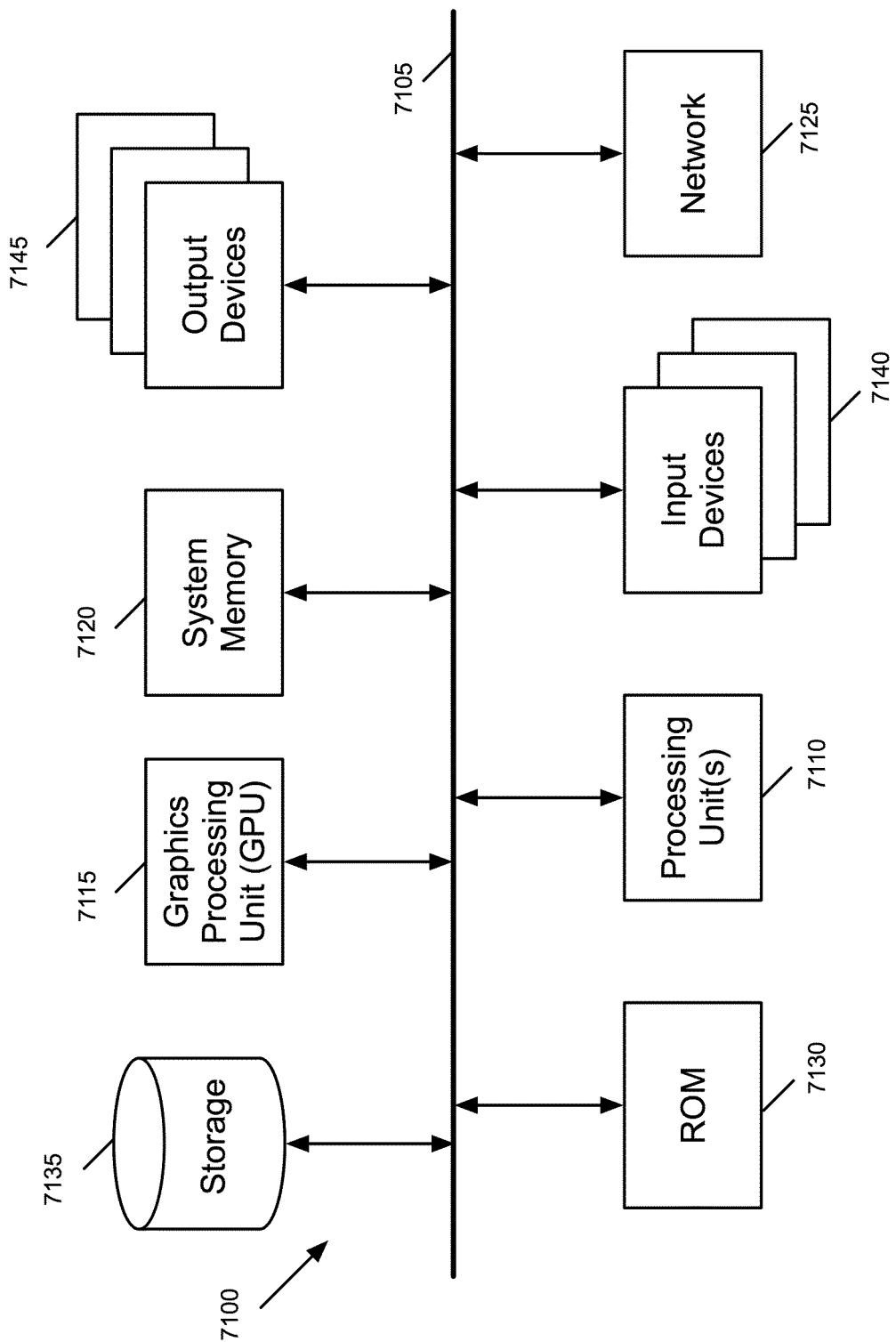
FIG. 71 conceptually illustrates an electronic system with which some embodiments of the invention are implemented.

FIG. 71 conceptually illustrates an electronic system 7100 with which some embodiments of the invention are implemented. The electronic system 7100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 7100 includes a bus 7105, processing unit(s) 7110, a graphics processing unit (GPU) 7115, a system memory 7120, a network 7125, a read-only memory 7130, a permanent storage device 7135, input devices 7140, and output devices 7145.

The bus 7105 collectively represents all system, peripheral, and chipset buses that communicatively connect the numerous internal devices of the electronic system 7100. For instance, the bus 7105 communicatively connects the processing unit(s) 7110 with the read-only memory 7130, the GPU 7115, the system memory 7120, and the permanent storage device 7135.

From these various memory units, the processing unit(s) 7110 retrieves instructions to execute and data to process in order to execute the processes of the invention. The processing unit(s) may be a single processor or a multi-core processor in different embodiments. Some instructions are passed to and executed by the GPU 7115. The GPU 7115 can offload various computations or complement the image processing provided by the processing unit(s) 7110. In some embodiments, such functionality can be provided using CoreImage's kernel shading language.

The read-only-memory (ROM) 7130 stores static data and instructions that are needed by the processing unit(s) 7110 and other modules of the electronic system. The permanent storage device 7135, on the other hand, is a read-and-write memory device. This device is a non-volatile memory unit that stores instructions and data even when the electronic system 7100 is off. Some embodiments of the invention use a mass-storage device (such as a magnetic or optical disk and its corresponding disk drive) as the permanent storage device 7135.

Other embodiments use a removable storage device (such as a floppy disk, flash memory device, etc., and its corresponding drive) as the permanent storage device. Like the permanent storage device 7135, the system memory 7120 is a read-and-write memory device. However, unlike storage device 7135, the system memory 7120 is a volatile read-and-write memory, such a random access memory. The system memory 7120 stores some of the instructions and data that the processor needs at runtime. In some embodiments, the invention's processes are stored in the system memory 7120, the permanent storage device 7135, and/or the read-only memory 7130. For example, the various memory units include instructions for processing multimedia clips in accordance with some embodiments. From these various memory units, the processing unit(s) 7110 retrieves instructions to execute and data to process in order to execute the processes of some embodiments.

The bus 7105 also connects to the input and output devices 7140 and 7145. The input devices 7140 enable the user to communicate information and select commands to the electronic system. The input devices 7140 include alphanumeric keyboards and pointing devices (also called "cursor control devices"), cameras (e.g., webcams), microphones or similar devices for receiving voice commands, etc. The output devices 7145 display images generated by the electronic system or otherwise output data. The output devices 7145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 71, bus 7105 also couples electronic system 7100 to a network 7125 through a network adapter (not shown). In this manner, the computer can be a part of a network of computers (such as a local area network ("LAN"), a wide area network ("WAN"), or an Intranet, or a network of networks, such as the Internet. Any or all components of electronic system 7100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 8, 20, 22, 29, 30, 35, 38, 45, 60, 63, and 69) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A machine readable medium storing a video editing application for execution by a processing unit of an electronic device, the video editing application comprising:
    a plurality of image processing destinations for a plurality of video images, each destination for performing on the electronic device, in parallel with other destinations on the electronic device, a different operation on the video images; and
    a scheduling engine for scheduling, upon receiving a selection of a set of destinations, image retrieval operations from a media storage, decode operations, and graphics processing operations to perform on the images to prepare the images for the selected set of destinations, wherein the scheduling engine sends the same image data of at least one image that is retrieved from the media storage to two or more different destinations in the set, the scheduling engine comprising:
        a first set of instructions for:
            designating a particular one of the plurality of destinations as a master destination when none of the destinations in the selected set of destinations require the images in real-time, wherein the master destination has a slowest processing speed in performing its operation on the images among the destinations that do not require images in real-time; and
            scheduling, based on the processing speed of the master destination, images to send to the set of destinations; and
        a second set of instructions for scheduling images based on a real-time clock when at least one destination in the set of destinations requires images in real-time.

2. The machine readable medium of claim 1, wherein when at least one destination in the set of destinations requires images in real-time, the speed for scheduling the images is based on a requested output frame rate.

3. The machine readable medium of claim 1, wherein when at least one destination in the set of destinations requires images in real-time, the speed for scheduling the images is based on a user skimming through a media clip in a graphical user interface of the media-editing application.

4. The machine readable medium of claim 1, wherein the destinations that do not require images in real-time comprise an image analysis destination.

5. The machine readable medium of claim 1, wherein the destinations that do not require images in real-time comprise an image transcoding destination.

6. The machine readable medium of claim 1, wherein the destinations that do not require images in real-time comprise a background rendering destination.

7. The machine readable medium of claim 1, wherein the destination that requires images in real-time is a media playback destination.

8. The machine readable medium of claim 1, wherein when a plurality of non-real-time destinations are performing operations on a particular media file, the scheduling engine performs only one image retrieval from the storage and one decode operation per image in the media file for the plurality of non-real-time destinations.

9. The machine readable medium of claim 1, wherein when a plurality of real-time destinations are performing operations on a particular media file, the scheduling engine performs only one image retrieval from the storage and one decode operation per image in the media file for the plurality of real-time destinations.

10. A machine readable medium storing a video editing program which when executed by a processing unit of an electronic device renders images, the video editing program comprising sets of instructions for:
    receiving a selection of a set of destinations that perform different operations on video images;
    receiving a command to provide a sequence of video images to the selected set of destinations on the electronic device, wherein the same image data of at least one image in the sequence is provided to two or more different destinations that perform parallel operations on the image data;
    when at least one of the destinations in the set of destinations requires images from the sequence at a particular rate, providing images to the set of destinations according to a real-time clock; and
    when none of the destinations in the set of destinations require images from the sequence at a particular rate, providing images to the set of destinations according to updates from a particular one of the destinations, wherein the particular destination is a slowest destination in performing operations among the destinations of the set.

11. The machine readable medium of claim 10, wherein the video editing program further comprises a set of instructions for receiving clock updates from an output device when at least one of the destinations requires images from the sequence at a particular rate.

12. The machine readable medium of claim 10, wherein the set of instructions for providing images according to updates from the particular destination comprises a set of instructions for providing a new image each time an update is received from the particular destination indicating that the destination has completed processing of an image.

13. The machine readable medium of claim 10, wherein the video editing program further comprises a set of instructions for initially providing a plurality of the images of the sequence to a buffer irrespective of whether the destinations require images at a particular rate.

14. The machine readable medium of claim 10, wherein the set of instructions for providing the sequence of images according to a real-time clock comprises a set of instructions for skipping one or more images in the sequence when required to keep up with the particular rate.

15. The machine readable medium of claim 10, wherein no image in the sequence of images is skipped when none of the destinations require images from the sequence at a particular rate.

16. For a video editing application, a method for rendering images, the method comprising:
   receiving a selection of a set of destinations that perform different operations on video images;
   receiving a command to provide a sequence of video images to the selected set of destinations on the electronic device, wherein the same image data of at least one image in the sequence is provided to two or more different destinations that perform parallel operations on the image data;
   when at least one of the destinations in the set of destinations requires images from the sequence at a particular rate, providing images to the set of destinations according to a real-time clock; and
   when none of the destinations in the set of destinations require images from the sequence at a particular rate, providing images to the set of destinations according to updates from a particular one of the destinations, wherein the particular destination is a slowest destination in performing operations among the destinations of the set.

17. The method of claim 16, wherein the method further comprises receiving clock updates from an output device when at least one of the destinations requires images from the sequence at a particular rate.

18. The method of claim 16, wherein providing images according to updates from the particular destination comprises providing a new image each time an update is received from the particular destination indicating that the destination has completed processing of an image.

19. The method of claim 16 further comprising initially providing a plurality of the images of the sequence to a buffer irrespective of whether the destinations require images at a particular rate.

20. The method of claim 16, wherein providing images according to a real-time clock comprises skipping one or more images in the sequence when required to keep up with the particular rate.

21. The method of claim 16, wherein no image in the sequence of images is skipped when none of the destinations requires images from the sequence at a particular rate.

22. The method of claim 16, wherein the destinations that do not require images at a particular rate comprise an image analysis destination.

23. The method of claim 16, wherein the destinations that do not require images at a particular rate comprise an image transcoding destination.

24. The method of claim 16, wherein the destinations that do not require images at a particular rate comprise a background rendering destination.

* * * * *